(12) United States Patent
Angelidis

(10) Patent No.: US 10,282,885 B2
(45) Date of Patent: May 7, 2019

(54) COMPUTER GRAPHIC SYSTEM AND METHOD OF MULTI-SCALE SIMULATION OF SMOKE

(71) Applicant: PIXAR, Emeryville, CA (US)

(72) Inventor: Alexis Angelidis, Albany, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 15/858,206

(22) Filed: Dec. 29, 2017

(65) Prior Publication Data

US 2018/0189999 A1    Jul. 5, 2018

Related U.S. Application Data

(60) Provisional application No. 62/440,067, filed on Dec. 29, 2016.

(51) Int. Cl.
G06T 13/60 (2011.01)
G06T 15/08 (2011.01)
G06T 15/20 (2011.01)
G06T 15/50 (2011.01)
G06T 17/00 (2006.01)

(52) U.S. Cl.
CPC .............. *G06T 13/60* (2013.01); *G06T 15/08* (2013.01); *G06T 15/20* (2013.01); *G06T 15/506* (2013.01); *G06T 17/005* (2013.01); *G06T 15/503* (2013.01); *G06T 2210/24* (2013.01); *G06T 2210/36* (2013.01); *G06T 2210/56* (2013.01); *G06T 2215/12* (2013.01)

(58) Field of Classification Search
None
See application file for complete search history.

(56) References Cited

U.S. PATENT DOCUMENTS

2006/0087509 A1* 4/2006 Ebert ..................... G06T 13/60
345/473

* cited by examiner

*Primary Examiner* — Yingchun He
(74) *Attorney, Agent, or Firm* — Kilpatrick Townsend & Stockton LLP

(57) ABSTRACT

A multi-scale method is provided for computer graphic simulation of incompressible gases in three-dimensions with resolution variation suitable for perspective cameras and regions of importance. The dynamics is derived from the vorticity equation. Lagrangian particles are created, modified and deleted in a manner that handles advection with buoyancy and viscosity. Boundaries and deformable object collisions are modeled with the source and doublet panel method. The acceleration structure is based on the fast multipole method (FMM), but with a varying size to account for non-uniform sampling.

20 Claims, 27 Drawing Sheets

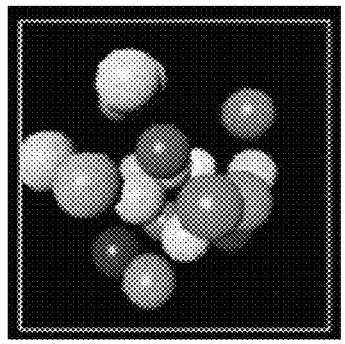
FIG. 6A
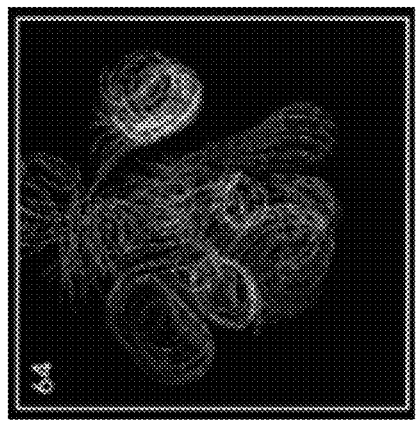
FIG. 6E
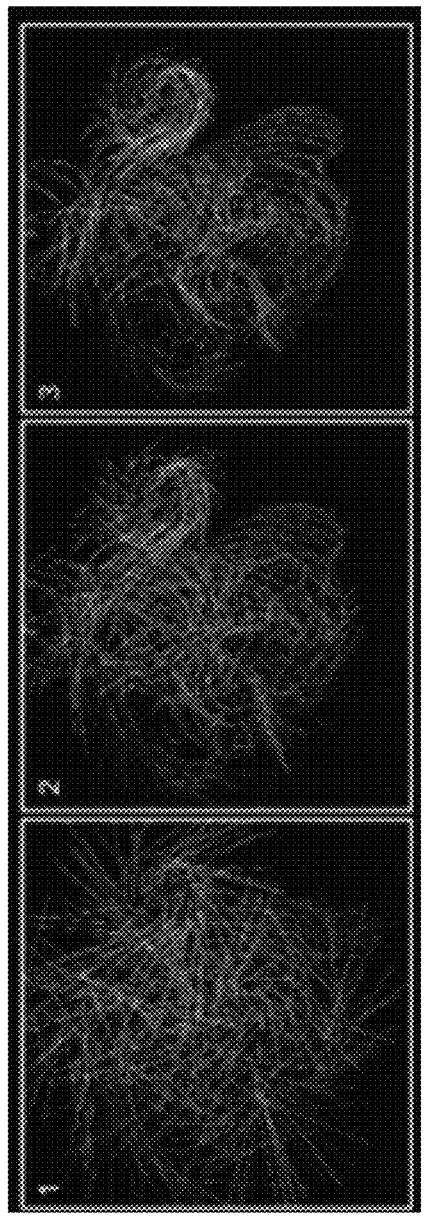
FIG. 6B
FIG. 6C
FIG. 6D
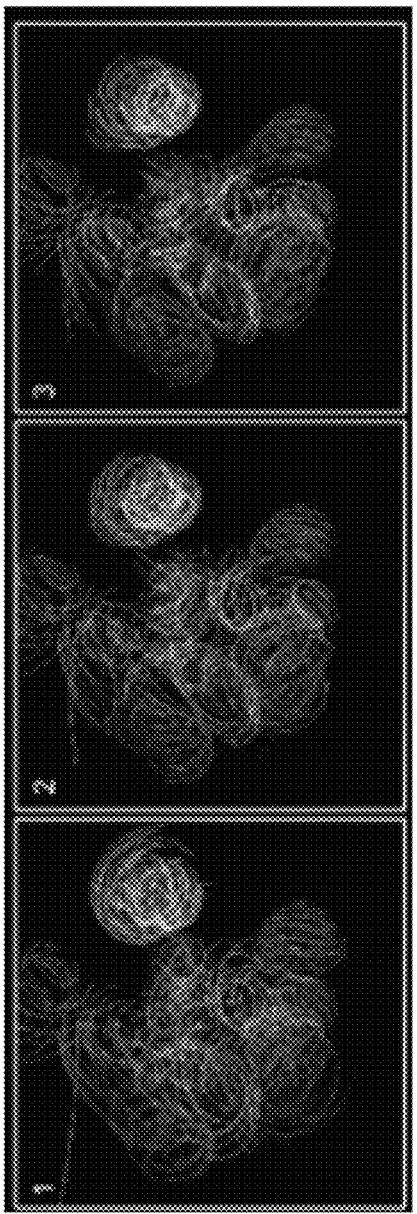
FIG. 6F
FIG. 6G
FIG. 6H

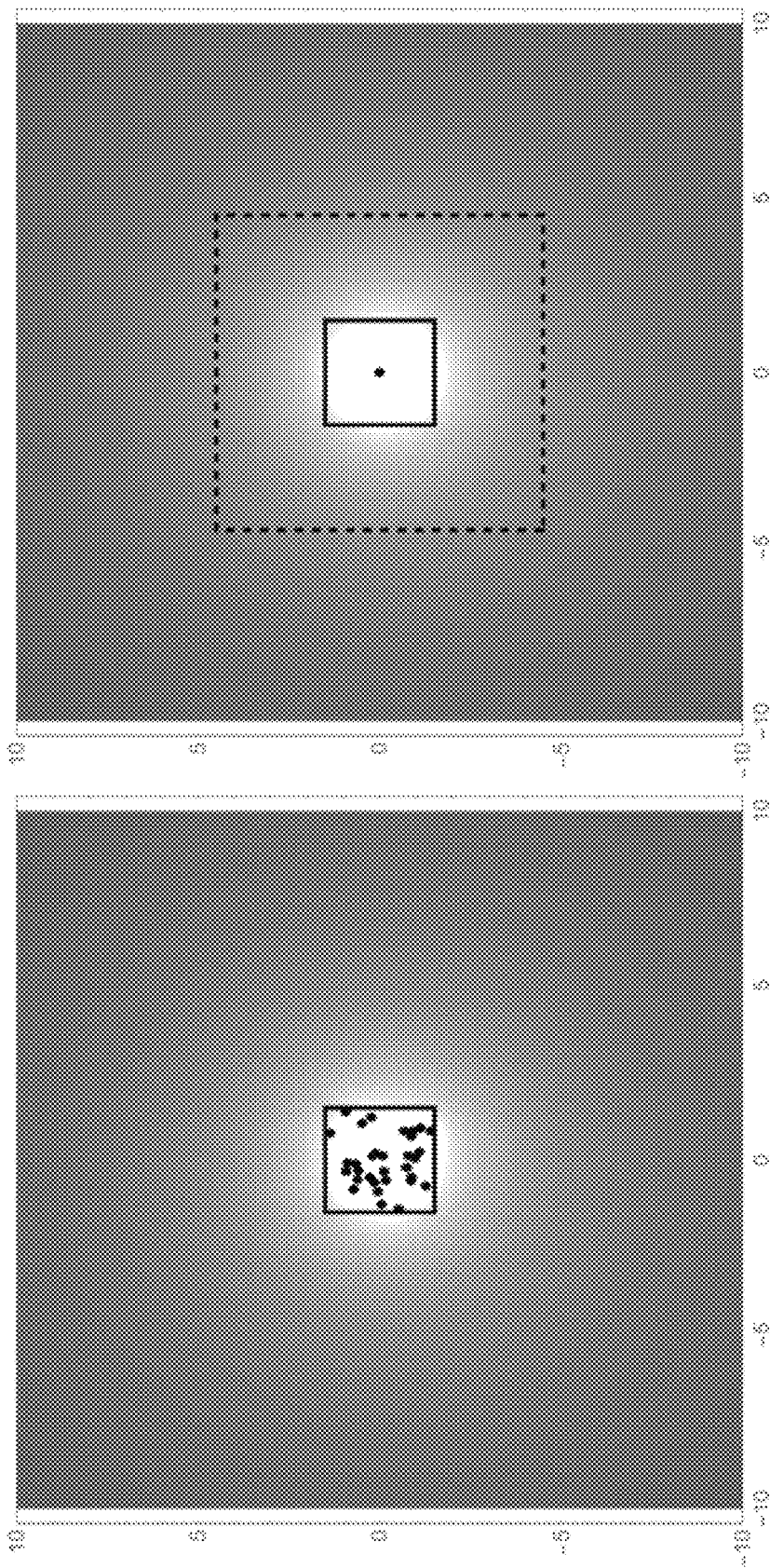

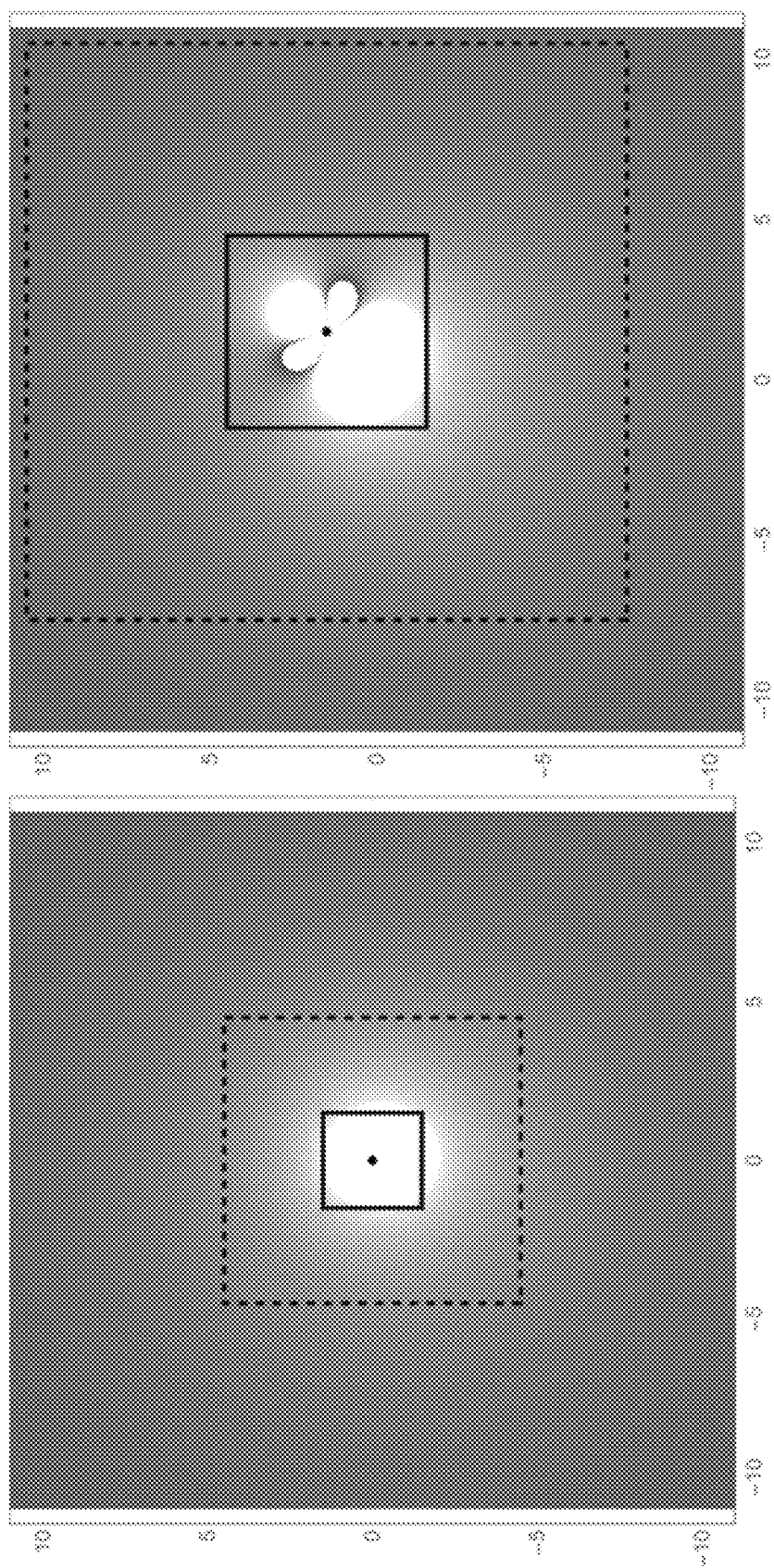

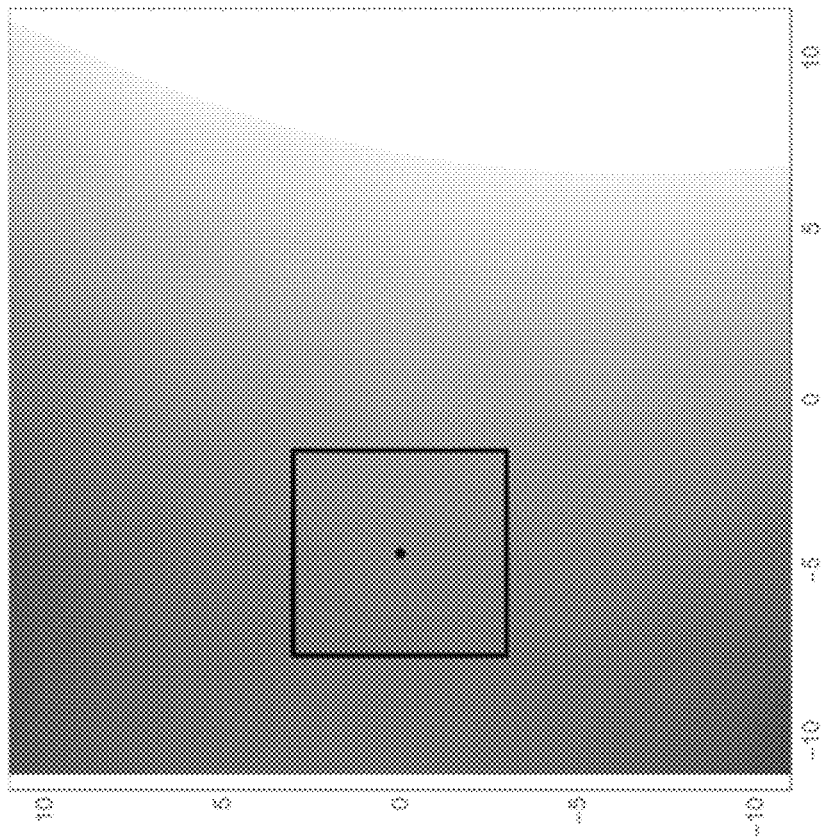
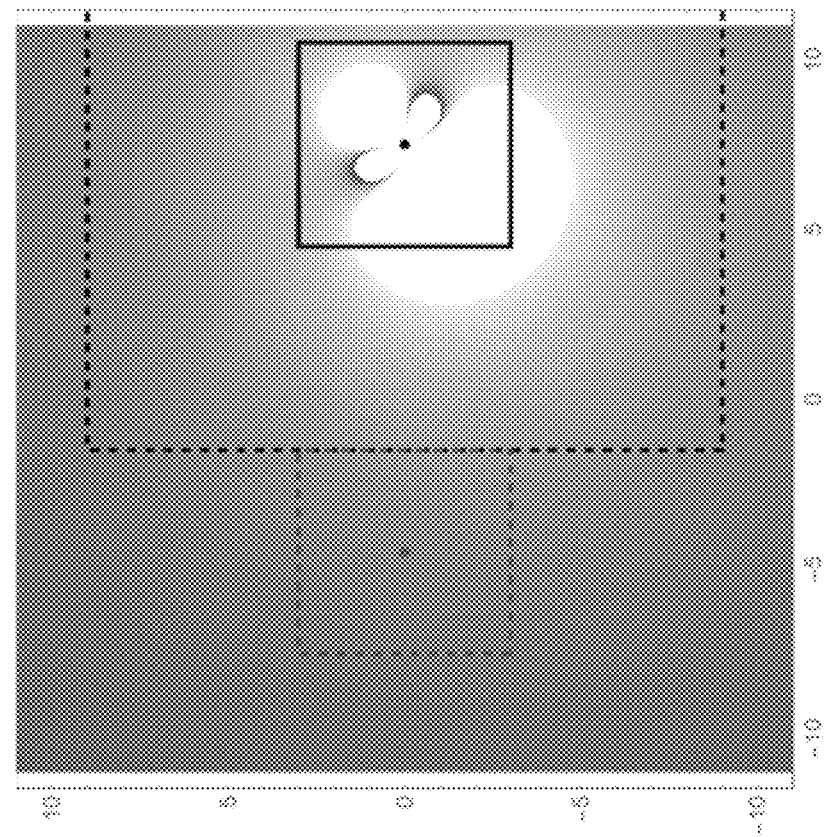
FIG. 12B
FIG. 12A

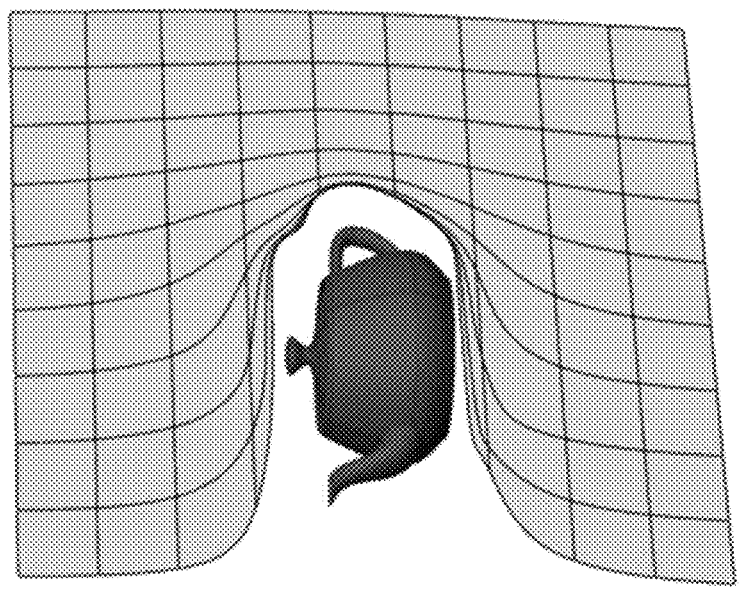
FIG. 14B
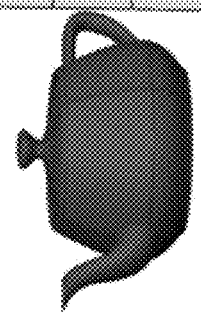
FIG. 14A

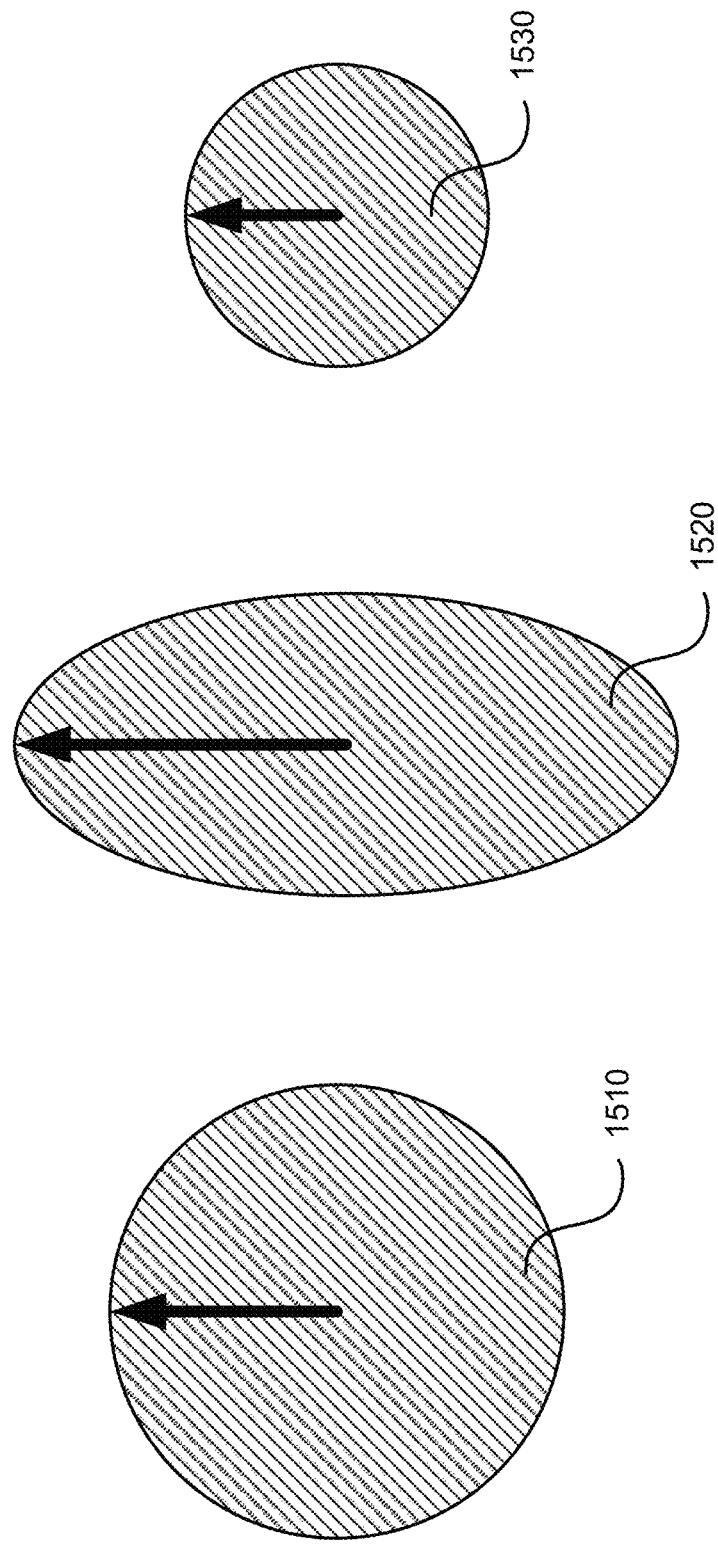

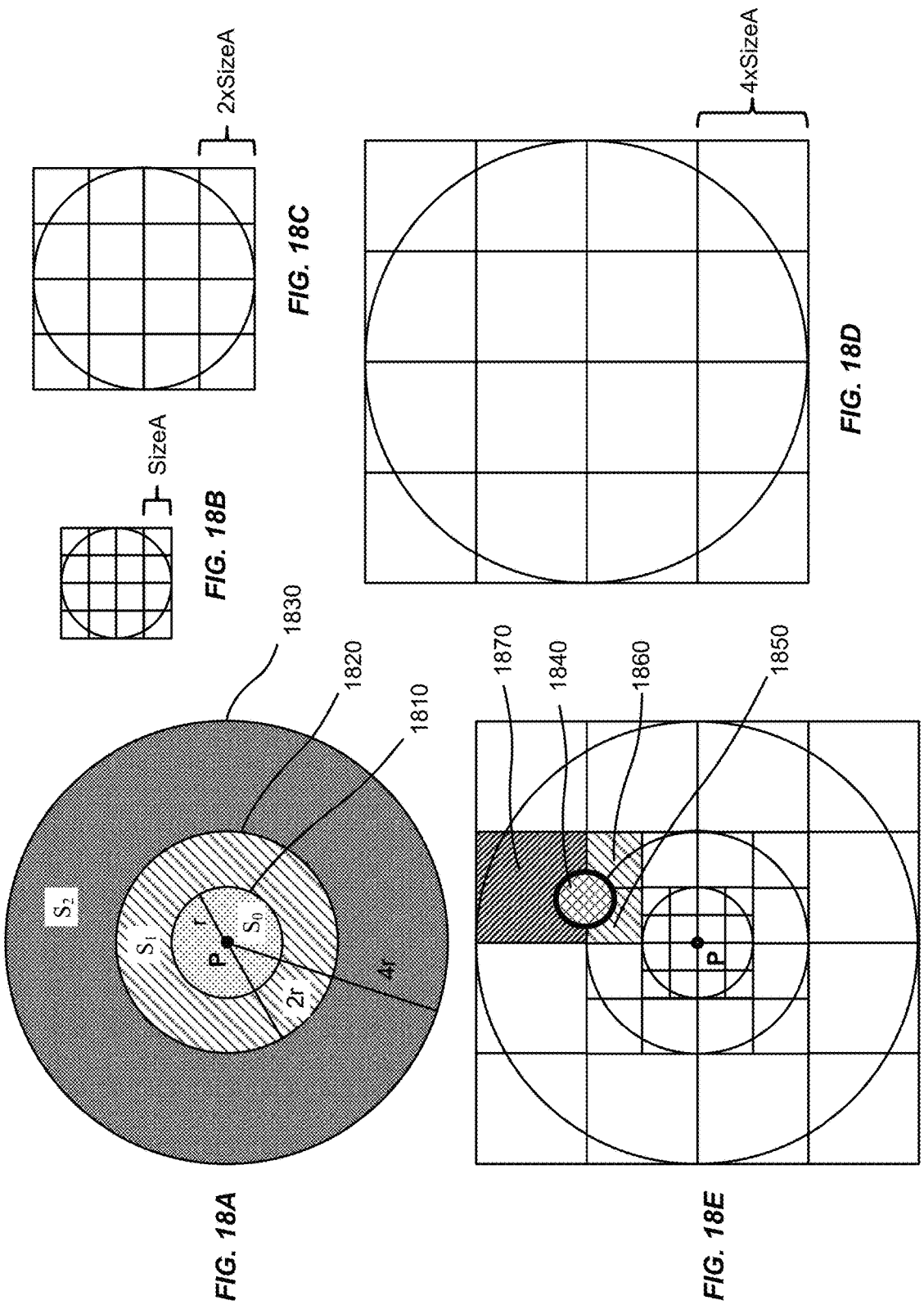

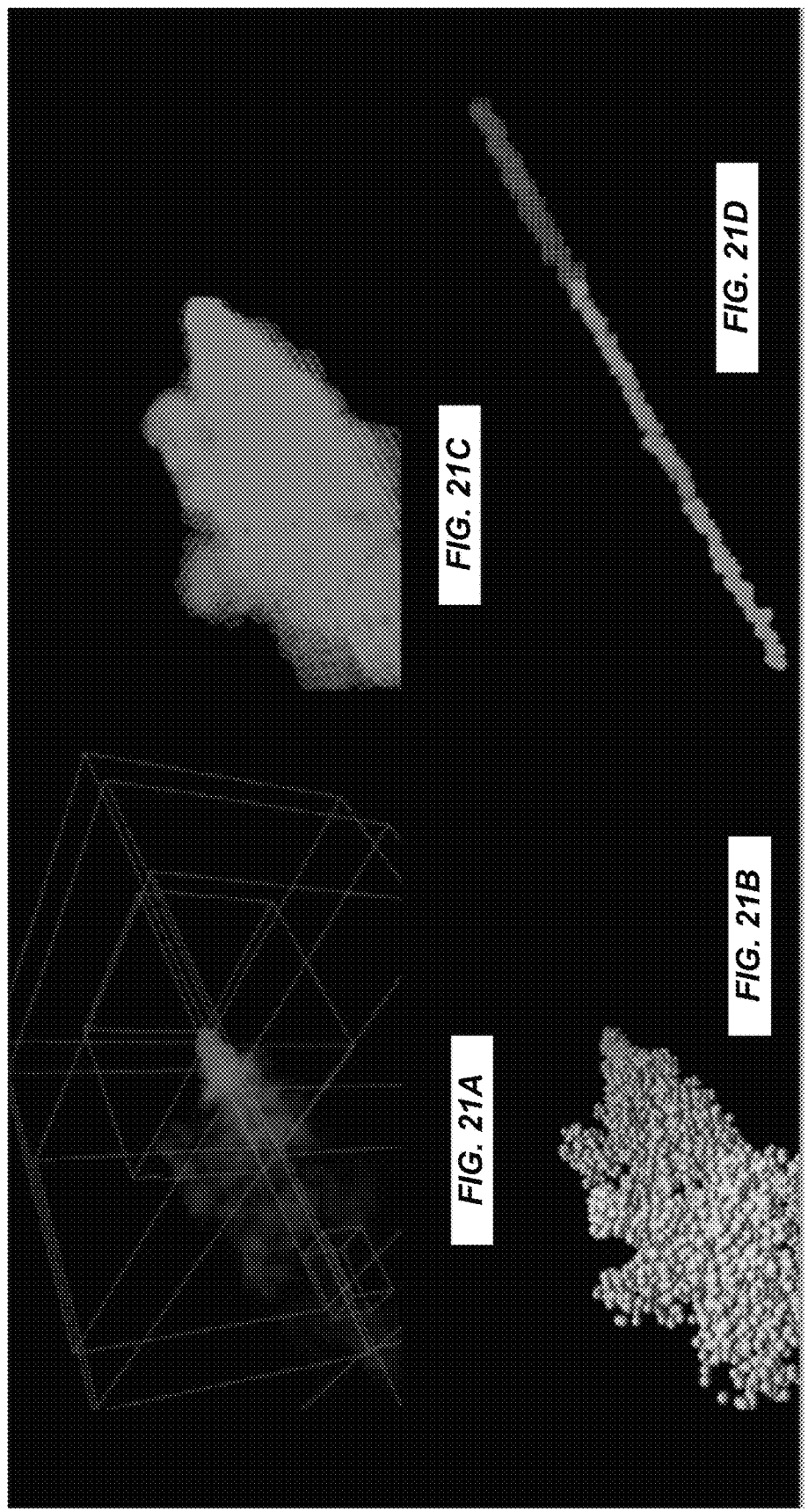

COMPUTER GRAPHIC SYSTEM AND METHOD OF MULTI-SCALE SIMULATION OF SMOKE

CROSS-REFERENCES TO RELATED APPLICATIONS

The present application is a non-provisional application of and claims the benefit and priority under 35 U.S.C. 119(e) of U.S. Provisional Application No. 62/440,067, filed Dec. 29, 2016 entitled "MULTI-SCALE VORTICLE FLUID IMPROVEMENTS," the entire content of which is incorporated herein by reference for all purposes.

BACKGROUND

Modeling the visual detail of a moving gas can be a laborious task. The ability to control sampling can vary from method to method. Foster and Metaxas [1997] solve the Navier-Stokes equation in a uniformly voxelized grid and further propose a popular unconditionally stable model. De Witt et al. [2012] represent the velocity using the Laplacian eigenvectors as a basis for incompressible flow. The Navier-Stokes equation can also be solved in a Lagrangian frame of reference with Smoothed Particle Hydrodynamics (SPH) [Gingold and Monaghan 1977], or with a Vortex Method, obtained by taking the curl of the Navier-Stokes equation [Cottet and Koumoutsakos 2000]. Vortex Methods can store data on points [Park and Kim 2005], curves [Angelidis et al. 2006b; Weissmann and Pinkall 2010], or surfaces [Brochu et al. 2012], and can be solved with an integral, with a grid [Couet et al. 1981], or both [Zhang and Bridson 2014]. Some original approaches don't use the Navier-Stokes equation [Elcott et al. 2007], but use Kelvin's theorem. Chern et al. [2016] solve the Schrodinger equation in a grid.

To model different characteristics at different resolutions, multiple approaches can be combined and applied to a selective range of scales: Selle et al. [2005] advect vorticity carried by points and advect vorticity carried by sheets. Kim et al. [2008] advect procedurally generated detail. Pfaff et al. [2009] and Kim et al. [2012] show that the region of changing scale is located near boundaries, varying density and temperature.

In the methods that compute pressure explicitly, the boundary condition can be met as part of computing the pressure. For the boundary condition of Vortex Methods, a harmonic field may be needed, and the source and doublet panel method can be the method of choice. Panel methods are well researched in aerodynamics. An introduction of panel methods is provided by Erickson [1990]. Both the source and the doublet term may be required. Using only the source term may not prevent the flow from passing through cup-shaped colliders, as opposed to spheroid colliders for which the doublet contribution is very small. This may be the case of the single layer potential of Zhang and Bridson [2014]. Using only the doublet term may not account for colliders with changing volume, since the doublet term is not capable of generating or consuming volume. Park and Kim [2005] use vorticle panels, which also do not handle cup-shaped colliders. Also, vorticle panels may not generate or consume volume by themselves, and may induce a rotational field.

Therefore, there is a need for improved methods of computer graphic simulation of an incompressible gas.

SUMMARY

Embodiments of the present invention provide a multi-scale method for computer graphic simulation of incompressible gases in three-dimensions with resolution variation suitable for perspective cameras and regions of importance. The dynamics may be derived from the vorticity equation. Lagrangian particles may be created, modified and deleted in a manner that handles advection with buoyancy and viscosity. Boundaries and deformable object collisions may be modeled with the source and doublet panel method. The acceleration structure may be based on the fast multipole method (FMM), but with a varying size to account for non-uniform sampling. Because the dynamics of the method is voxel free, one can freely specify the voxel resolution of the output density and velocity while keeping the main shapes and timing.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 6A illustrates 20 near vorticles that may induce a vector field.

FIGS. 6B-6E show pathlines induced by the near vorticles illustrated in FIG. 6A during one time step, for increasing numbers of time substeps using straight segment lines, from 1 time substep to 3 time substeps (FIGS. 6B-6D), and to 64 time substeps (FIG. 6E), according to some embodiments of the present invention.

FIGS. 6F-6H show pathlines induced by the near vorticles in FIG. 6A for increasing numbers of time substeps, using twists constructed using the Lie group SE(3), from 1 time substep to 3 time substeps (FIGS. 6F-6H), according to some embodiments of the present invention.

FIGS. 10A-10B illustrate how individual vorticles inside the box (FIG. 10A) are transformed into far coefficients relative to the box's center (FIG. 10B) for evaluations outside of the 26 neighboring cells shown with a dashed line according to some embodiments of the present invention.

FIGS. 11A-11B illustrate how the far field of a cell (FIG. 11A) is translated to the parent cell (FIG. 11B) according to some embodiments of the present invention.

FIGS. 12A-12B illustrate how, to evaluate the far field of a cell inside the dashed red line (FIG. 12A), the far field is transformed into a near field (FIG. 12B) according to some embodiments of the present invention.

FIGS. 14A-14B illustrate an initial position of a boundary object (e.g., a tea pot) moving into points (the lattice) (FIG. 14A), and how the harmonic field may warp the space in an incompressible and irrotational manner with a slip boundary (FIG. 14B) according to some embodiments of the present invention.

FIGS. 15A-15C illustrate a first vorticle (FIG. 15A) is stretched into a second vorticle (FIG. 15B), where the mean energy is preserved while the enstrophy changes, and the second vorticle is then resampled in an unstretched third vorticle (FIG. 15C) with the same mean energy and enstrophy as the second vorticle, according to some embodiments of the present invention.

FIGS. 18A-18E illustrate schematically a method of forming density voxel grids according to some embodiments of the present invention.

FIGS. 21A-21D illustrate an example of a simulator that may take advantage of a camera frustum according to some embodiments of the present invention.

DETAILED DESCRIPTION

Embodiments of the present invention provide a multi-scale method for computer graphic simulation of incompressible gases in three-dimensions with resolution variation suitable for perspective cameras and regions of importance. The dynamics may be derived from the vorticity equation. Lagrangian particles may be created, modified and deleted in a manner that handles advection with buoyancy and viscosity. Boundaries and deformable object collisions may be modeled with the source and doublet panel method. The acceleration structure may be based on the fast multipole method (FMM), but with a varying size to account for non-uniform sampling. Because the dynamics of the method is voxel free, one can freely specify the voxel resolution of the output density and velocity while keeping the main shapes and timing.

The FMM was developed by Geengard and Rokhlin [1987] to solve the N-body problem in linear complexity. An introduction of the FMM is provided by Ying [2012]. Unlike hybrid methods, the methods disclosed herein can handle all ranges of scales in one model. Unlike SPH where small and large scales cannot overlap, the samples in these methods can overlap for all scales. Unlike grid-based methods that have a uniform sampling for the finest resolution, these methods can handle a sparse structure for all scales. Embodiments may provide: (1) a hierarchical and sparse method for free flow advection; (2) a hierarchical and sparse method for boundaries; (3) an unconditionally stable method for vorticity stretching; and (4) a new model for buoyancy.

Figure 1B:
FIGS. 1A-1B show a computer graphic renderings of a smoke trail that stretches from near the camera (FIG. 1A) to the horizon (FIG. 1B), using a single simulation according to some embodiments of the present invention.
Figure 1A:
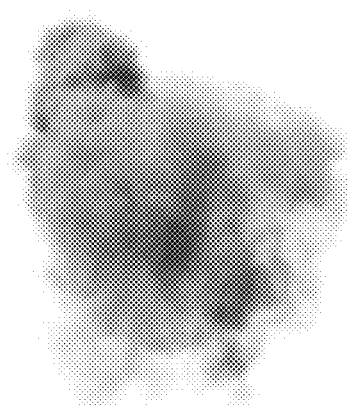

FIGS. 1A-1B show a computer graphic renderings of a smoke trail that stretches from near the camera (FIG. 1A) to the horizon (FIG. 1B), using a single simulation according to some embodiments of the present invention.

A. Dynamic Model

To obtain the equation of dynamics, the curl operator may be applied to the following form of the Navier-Stokes equation of a Newtonian fluid:

$$\rho \frac{d\vec{u}}{dt} = \mu \nabla^2 \vec{u} + \rho \vec{F} - \nabla p \tag{1}$$

where $\vec{u}$ is velocity, t is time, $\rho$ is density, $\mu$ is viscosity, $\vec{F}$ is external force, and p is pressure.

Assuming that $\mu$ is constant, dividing both sides of Eq. (1) by $\rho$, replacing $$\frac{\mu}{\rho}$$

with v, and use the identity $\nabla \rho / \rho = \nabla \log(\rho)$, then the following equation may be obtained:

$$\frac{d\vec{\omega}}{dt} = (\vec{\omega} \cdot \nabla)\vec{u} + \nu\nabla^2\vec{\omega} + \nabla\log(\rho) \times \left(\vec{F} - \frac{d\vec{u}}{dt}\right) + \nabla \times \vec{F}, \quad (2)$$

where the vorticity $\vec{\omega}$ is the curl of the velocity $\vec{u}$. This is the complete equation, it includes boundaries and all forces. Eq. (2) means that the vorticity $\vec{\omega}$ evolves over time by advecting particles carrying $\vec{\omega}$, and by stretching $\vec{\omega}$ according to the velocity $\vec{u}$, with kinematic viscosity ν, buoyancy and boundary interaction specified by density ρ and external force $\vec{F}$:

$$\vec{F}(p) = \begin{cases} \vec{g} + \vec{e} & \text{if } p \text{ outside solid objects} \\ \vec{f} & \text{otherwise} \end{cases}, \quad (3)$$

where $\vec{g}$ is the constant for gravity, $\vec{e}$ is a set of user defined external forces, and $\vec{f}$ is the acceleration at the objects' boundaries, suitable for deformable objects. The term "advecting" may refer to "moving" (e.g., particles). Solving $\vec{\omega}$ with Eq. (2) does not involve the pressure term. Instead, the velocity $\vec{u}$ is obtained from $\vec{\omega}$ in two parts: an advected field $\vec{v}$ derived from $\vec{\omega}$, and a harmonic field $\vec{h}$ derived from $\vec{v}$ at the boundaries:

$$\vec{u} = \vec{v} + \vec{h} \quad (4)$$

The fields $\vec{v}$ and $\vec{h}$ satisfy the following identities:

$$\nabla \cdot \vec{v} = 0 \quad \nabla \cdot \vec{h} = 0 \quad \nabla \times \vec{h} = 0 \quad (5)$$

B. Advected Field

The advected field $\vec{v}$ is the purely rotational and dynamic portion of $\vec{u}$ that can be computed directly from $\vec{\omega}$. It is defined with the Biot-Savart law:

$$\vec{v}(p) = \frac{1}{4\pi} \int_{x \in R^3} \frac{\vec{\omega}(x) \times (p-x)}{\|p-x\|^3} dx \quad (6)$$

Eq. (6) may mean that $\vec{v}$ is induced by a continuum of weighted rotations singular at p=x. To remove the singularity, a discrete overlapping partitioning may be used, where each element i is a vorticle. A vorticle may also be referred to as a vortex particle or a vortex blob.

A vorticle may be defined by an integrable vorticity field $\vec{\omega}_i$ centered at $p_i$:

$$\vec{v}(p) = \frac{1}{4\pi} \int_{x \in R^3} \frac{\vec{\omega}(x) \times (p-x)}{\|p-x\|^3} dx = \Sigma_i \vec{v}_i(p - p_i). \quad (7)$$

A motivation to use particles instead of a topologically connected structure, such as filaments, may be to avoid the rapid entanglement occurring around objects and other filaments. A vorticle i may be associated with a vorticity field $\vec{\omega}_i$, a velocity field $\vec{v}_i$ and a stream field $\vec{\psi}_i$. The following explicit expressions may be chosen for the stream field $\vec{\psi}_i$, the velocity field $\vec{v}_i$, and the vorticity field $\vec{\omega}_i$, using size $r_i$ and rotation strength $\vec{w}_i$:

$$\xi_i(l) = \frac{1}{\sqrt{r_i^2 + l^2}},$$

$$\vec{\psi}_i(\vec{x}) = \xi_i(\|\vec{x}\|)\vec{w}_i$$

$$\vec{v}_i(\vec{x}) = \xi_i(\|\vec{x}\|)^3 \vec{w}_i \times \vec{x}$$

$$\vec{\omega}_i(\vec{x}) = \xi_i(\|\vec{x}\|)^3(2\vec{w}_i - 3\xi_i(\|\vec{x}\|)^2 \vec{x} \times (\vec{w}_i \times \vec{x})) \quad (8)$$

Figure 2C:
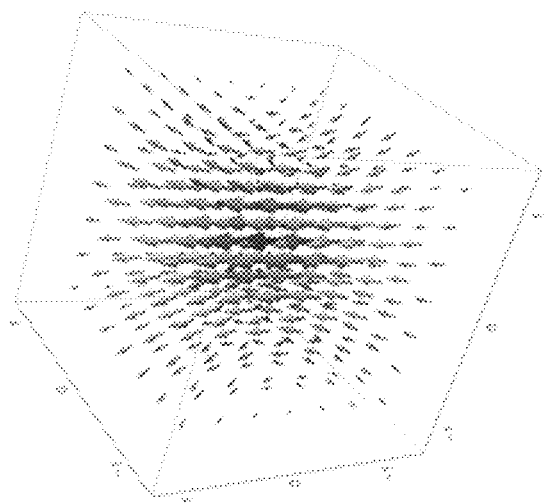
FIGS. 2A-2C illustrate the fields of a vorticle: stream field (FIG. 2A), velocity field (FIG. 2B), and vorticity field (FIG. 2C), according to some embodiments of the present invention.
Figure 2B:
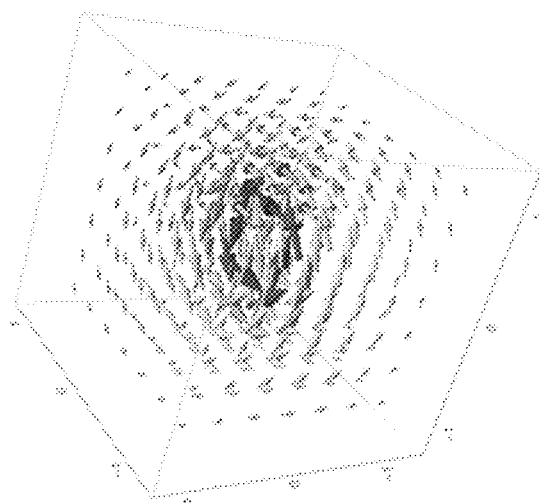
Figure 2A:
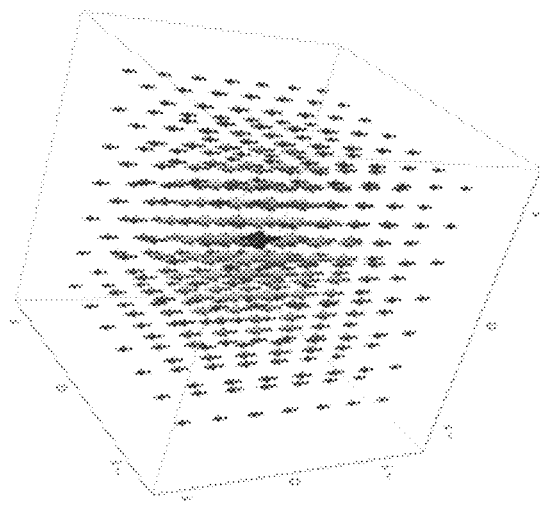

FIGS. 2A-2C illustrate the fields of a vorticle: stream field (FIG. 2A), velocity field (FIG. 2B), and vorticity field (FIG. 2C) according to some embodiments, where $\vec{w}_i$ is up. The fields shown in FIGS. 2A-2C satisfy the following identities:

$$\nabla \times \vec{\psi}_i = \vec{v}_i, \quad \nabla \times \vec{v}_i = \vec{\omega}_i, \quad \nabla \cdot \vec{v}_i = 0 \quad \nabla \cdot \vec{\omega}_i = 0.$$

These functions are chosen because they are non-singular since $r_i > 0$, they are smooth across $\vec{x} = 0$, and because the vorticle's rotation strength $\vec{w}_i$ is asymptotic to its vorticity $\vec{\omega}_i$ when decreasing $r_i$. Also, a vorticle's mean energy $E_i$ can have a closed form:

$$E_i = \frac{1}{2} \int \|\vec{v}_i(\vec{x})\|^2 d\vec{x} = \frac{\pi^2 \|\vec{w}_i\|^2}{4r_i}, \quad (9)$$

which may be convenient for splitting a vorticle emitter's energy E among N emitted vorticles:

$$\vec{w}_i = \frac{2}{\pi}\sqrt{\frac{Er_i}{N}} X. \quad (10)$$

The variable X is a random vector on the unit sphere, or a normalized curl of an input field. A set of vorticles induces a stream field $\vec{\psi}$, an advected field $\vec{v}$ and a vorticity field $\vec{\omega}$:

$$\vec{\psi}(p) = \Sigma \vec{\psi}_i(p - p_i)$$

$$\vec{v}(p) = \Sigma \vec{v}_i(p - p_i)$$

$$\vec{\omega}(p) = \Sigma \vec{\omega}_i(p - p_i) \quad (11)$$

Therefore the following identities hold true by construction:

$$\nabla \times \vec{\psi} = \vec{v} \quad \nabla \times \vec{v} = \vec{\omega} \quad \nabla \cdot \vec{v} = 0 \quad \nabla \cdot \vec{\omega} = 0$$

Multi-Scale Fast Multipole Method (FMM)

The cost of evaluating $\vec{v}$ at every vorticle center $p_i$ directly with Eq. (11) scales quadratically with the number of vorticles, and may be prohibitive for large numbers of vorticles. The fast multipole method (FMM) may provide a way to evaluate $\vec{v}(p)$ using only the near cells of p in an octree. The FMM is a numerical technique that was developed to speed up the calculation of long-ranged forces in a N-body problem. It accomplishes this by using a multipole expansion, which allows one to group sources that lie close together and treat them as if they are a single source.

Figure 3:
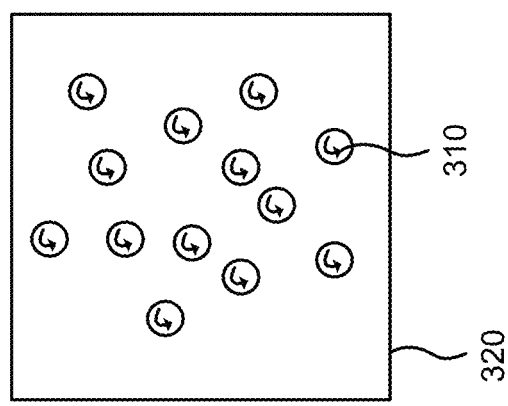
FIG. 3 illustrates schematically a group of vorticles that are relatively well separated from a target point p.

FIG. 3 illustrates schematically a group of vorticles 310 that are relatively well separated from a target point p. According to an FMM method in some embodiments, when sufficiently far away from p, the group of vorticles 310 may be approximated as a single source centered on a cell 320.

Figures 4A, 4B, 4C:
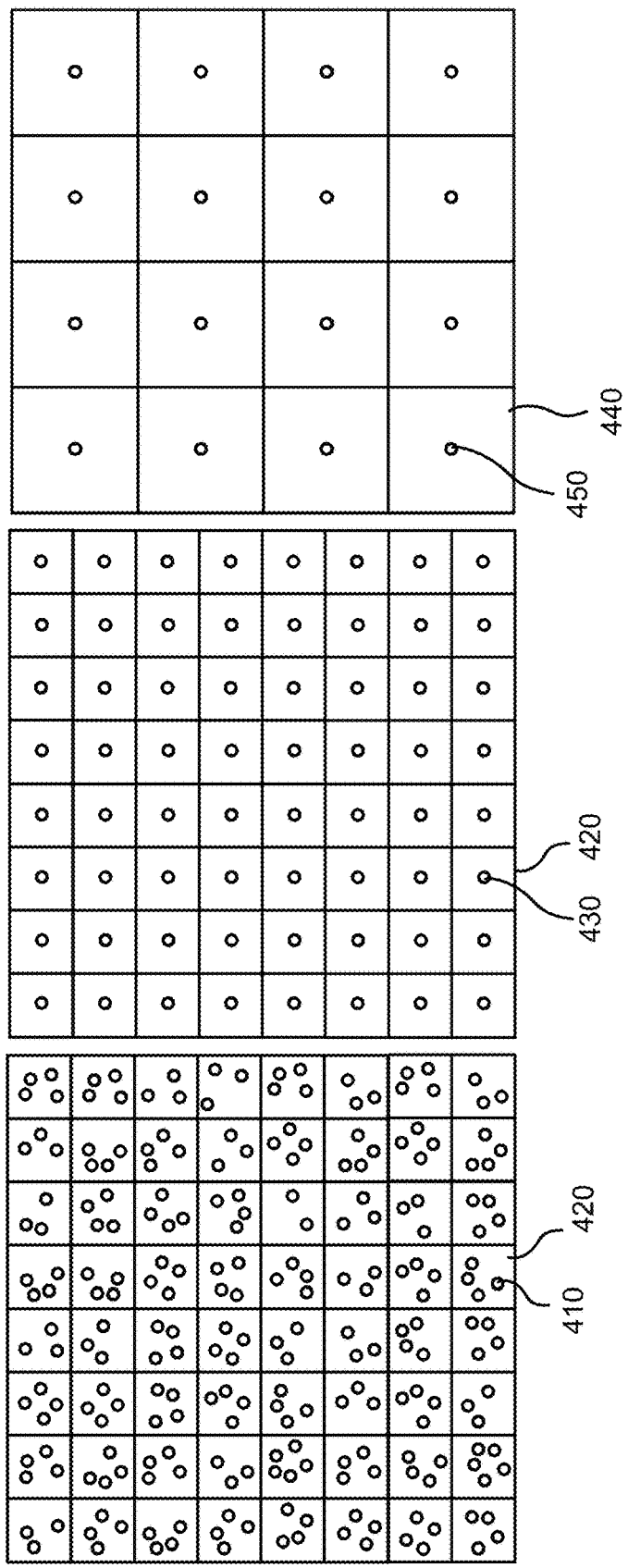
FIGS. 4A-4C and 5 illustrate a fast multipole Method (FMM) of evaluating velocity field of a plurality of vorticles according to some embodiments of the present invention.
Figure 5:
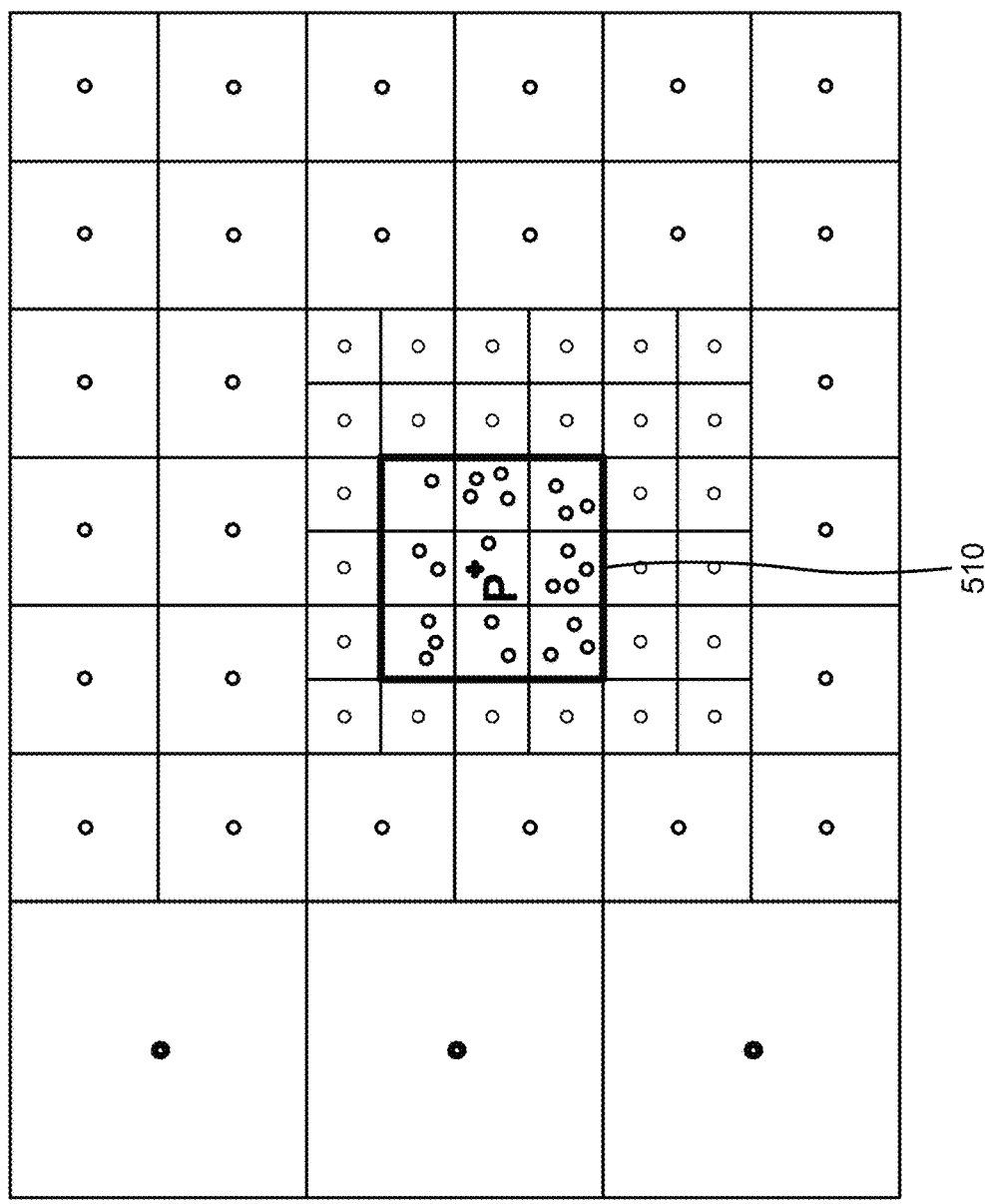

FIGS. 4A-4C and 5 illustrate schematically an FMM method of evaluating velocity field of a plurality of vorticles according to some embodiments. Assume that vorticles 410 are approximately uniformly distributed in a three-dimensional space, as illustrated in FIG. 4A. The three-dimensional space may be divided into cubical cells 420. For a target point located sufficiently far away from a cell 420, the vorticles 410 inside the cell 420 may be approximated as a single source 430 positioned at the center of the cell 420, as illustrated in FIG. 4B.

An octree cell structure may be constructed to include a plurality of octree levels. Traversing the octree up to a parent level, eight nearest neighbor child cells 420 (e.g., four in the plane of the paper and four in a plane below the plane of the paper) may be approximated as a single source 450 positioned at the center of the parent cell 440, as illustrated in FIG. 4C. This process can continue to the next parent level in a similar fashion.

In some embodiments, a cell that contains the camera position p and the cells that are direct neighbors of that cell may be referred to as near cells. All other cells may be referred to as far cells. For instance, in the example illustrated in FIG. 5, the cells included in the thick-outlined box 510 surrounding the camera position p may be referred to as near cells, and the cells outside the thick-outlined box 510 may be referred to as far cells. In some embodiments, the vorticles in the cell and in the 1-cell ring of p may be referred to as near vorticles, and all other vorticles may be referred to as far vorticles. Note that the octree may store vorticles of different sizes, and there are potentially near and far vorticles at multiple levels.

The advected field may be split into near and far fields:

$$\vec{v} = \vec{v}_{near} + \vec{v}_{far}. \quad (12)$$

1. Near Advected Field

The near advected field may be evaluated by summing the velocity fields of the near vorticles, in the cell and 1-cell ring across all levels:

$$\vec{v}_{near}(p) = \sum_{i \in near(p)} \vec{v}_i(p - p_i) \quad (13)$$

The near field, however, can have a very large mean energy, especially near user defined vorticle emitters. Also, if $r_i$ approaches 0, then $\vec{v}_i(p_i)$ becomes infinite. For the simulation to be tolerant of any input, an advection method that handles the most extremely coiled trajectory in a single time step may be used. For that, the velocity may be replaced with a displacement constructed from the union of twists, similar to the method of Angelidis et al. [2006a]. A twist is an element of the Lie group SE(3). A twist may be constructed by combining the rotations induced by vorticles. Lie group of twists with vorticles may be used because it is known that the motion is derived from rotations. The rotations may be expressed in the Lie algebra se(3), and summed. An exponential map may be used to obtain the twist in SE(3). The following may be obtained:

$$\vec{k}_0 = \Delta_t \sum_{i \in near(p)} \vec{\xi}_i(p - p_i)^2 \vec{\psi}_i(p - p_i) \quad (14)$$

-continued $$\vec{k}_1 = \Delta_t \sum_{i \in near(p)} \vec{v}_i(p - p_i)$$

$$\vec{v}_{near}(p) =$$

$$\frac{1}{\Delta_t}\left(\vec{k}_1 + \vec{k}_0 \times \left(\frac{\|\vec{k}_0\| - \sin(\|\vec{k}_0\|)}{\|\vec{k}_0\|^3}\vec{k}_0 \times \vec{k}_1 + \frac{1 - \cos(\|\vec{k}_0\|)}{\|\vec{k}_0\|^2}\vec{k}_1\right)\right)$$

This method may underestimate the length of the trajectory, but converges when decreasing the time step $\Delta_t$ and guarantees stability. It is observed that strong vorticles induce extremely coiled pathlines in a single time step similar to the pathlines integrated with tiny steps, and also that a small number of vorticles placed on a ring moves along a straight and stable trajectory.

FIG. 6A illustrates 20 near vorticles that may induce a vector field. FIGS. 6B-6E show pathlines induced by the near vorticles illustrated in FIG. 6A during one time step, for increasing numbers of time substeps using straight segment lines (referred to as linear time steps), from 1 time substep to 3 time substeps (FIGS. 6B-6D), and to 64 time substeps (FIG. 6E), according to some embodiments of the present invention. Points are scattered with random colors. As illustrated, the quality of the advection increases rather slowly when taking linear time steps. FIGS. 6F-6H show pathlines induced by the near vorticles in FIG. 6A for increasing numbers of time substeps, using twists constructed using the Lie group SE(3), from 1 time substep to 3 time substeps (FIGS. 6F-6H), according to some embodiments of the present invention. As illustrated, using the Lie group of twists, thousands of rotations can be done in a single time step.

2. Far Advected Field

The far advected field's near expansion may be defined using the near coefficients $\vec{\kappa}_{lmn}$ of the deepest cell containing p:

$$\vec{v}_{far}(p) = \Sigma_{l=0}^{lmax} \Sigma_{m=-l}^{l} \Sigma_{n=1}^{nmax} \nabla(Y_{lm}(p)\|p\|^n) \times \vec{\kappa}_{lmn} \quad (15)$$

The function $Y_{lm}(p)$ denotes the real spherical harmonics:

$$K_{lm} = \sqrt{\frac{(2l+1)(l-|m|)!}{4\pi(l+|m|)!}} \quad (16)$$

$$Y_{lm}(p) = K_{lm}P_{l,|m|}(\cos(\phi))\begin{cases} \sqrt{2}\cos(m\theta) & \text{if } m > 0 \\ 1 & \text{if } m = 0 \\ \sqrt{2}\sin(-m\theta) & \text{if } m < 0 \end{cases}$$

The function $P_{lm}$ denotes the associated Legendre polynomials, with Cartesian coordinates mapping to spherical coordinates as $$(\theta, \phi, r) = \left(\text{atan2}(p_y, p_x), a\cos\left(\frac{p_z}{\|p\|}\right), \|p\|\right).$$

The first few basis functions are given in Appendix 2.

Figure 7C:
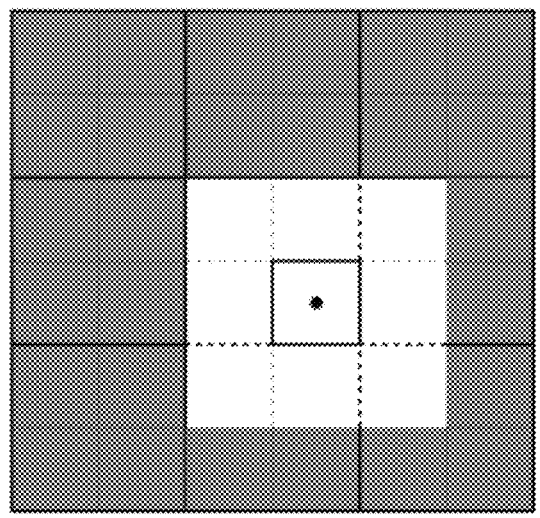
FIGS. 7A-7C illustrate the three main steps of a fast multipole method (FMM) that may be used to compute the near coefficients of a far advected field's near expansion according to some embodiments of the present invention.
Figure 7B:
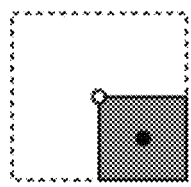
Figure 7A:
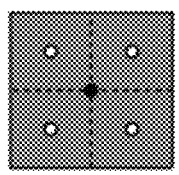

FIGS. 7A-7C illustrate the three main steps of the FMM that may be used to compute the near coefficients $\vec{\kappa}_{lmn}$. First, an octree can be built where the near coefficients $\vec{\kappa}_{lmn}$ of all cells are initialized to 0. Level 0 denotes the octree's root. The 189 cells that are children of the parent's neighbors but not direct neighbors may be referred to as far interacting cells. A cell's far coefficient may be computed by translating the 8 children's far coefficient (FIG. 7A). A cell's near coefficient may be computed by translating the parent's near coefficient (FIG. 7B), and transforming the 189 far interacting cells' far coefficient (FIG. 7C).

Figure 8:
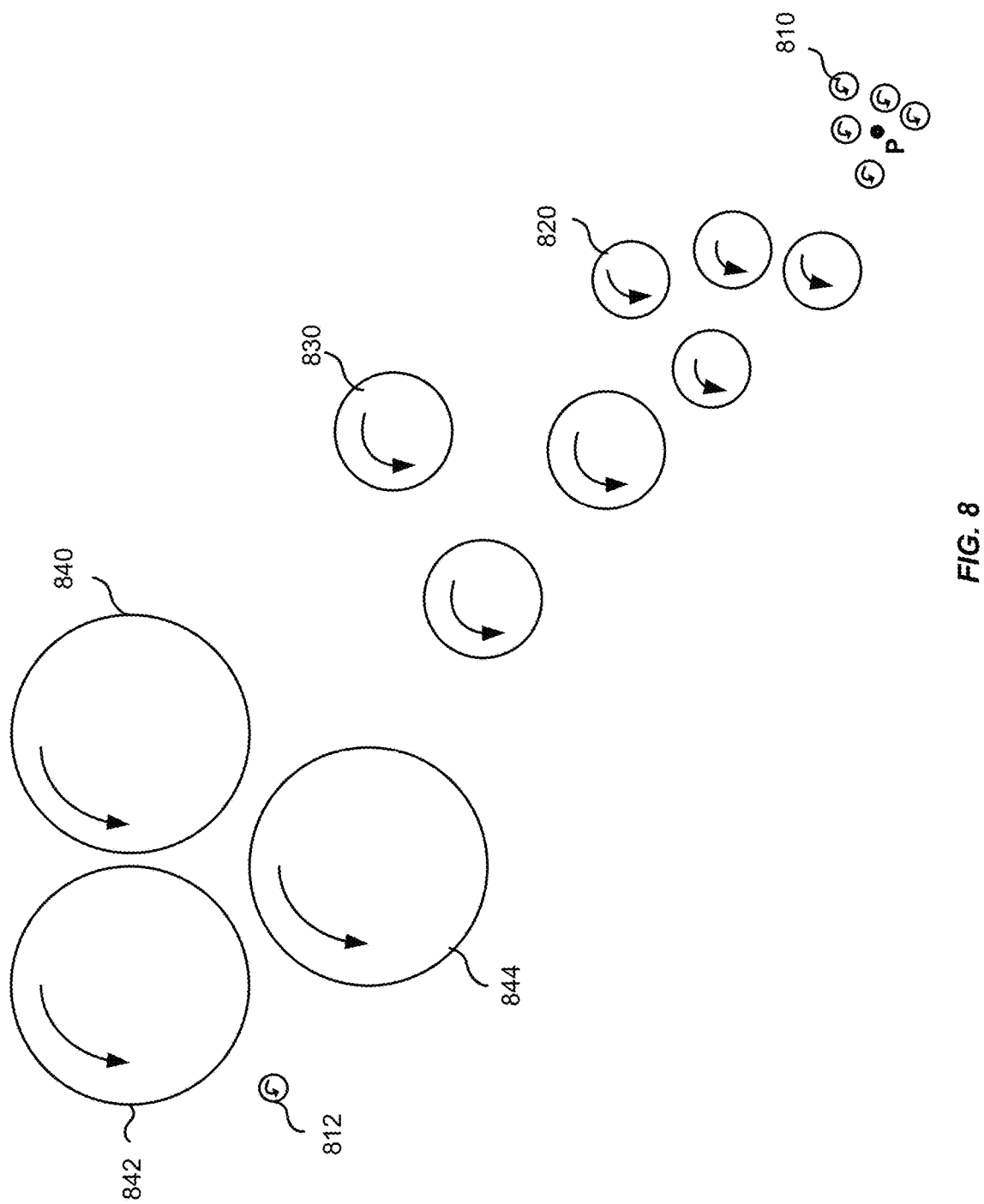
FIG. 8 illustrates schematically a plurality of vorticles of various sizes that may be generated in a virtual space surrounding a camera located at p according to some embodiments of the present invention.

To make the algorithm multiscale, vorticles of various sizes $r_i$ may be generated in a three-dimensional space according to some embodiments, as illustrated in FIG. 8. For examples, the vorticles may include small vorticles 810 and 812, medium vorticles 820, medium large vorticles 830, and large vorticles 840, 842, and 844. In FIG. 8, the point p denotes the camera position. In some embodiments, the size of each vorticle may increase as the distance from the vorticle to the camera position p increases. In some other embodiments, vorticles of various sizes may occupy a same spatial region. For instance, in the example illustrated in FIG. 8, the small vorticle 812 may be located next to the large vorticles 842 and 844.

The vorticles may be stored in the internal cells of size $$a = 2^{\left\lceil \frac{\log r_i}{\log 2} \right\rceil}.$$

Figure 9:
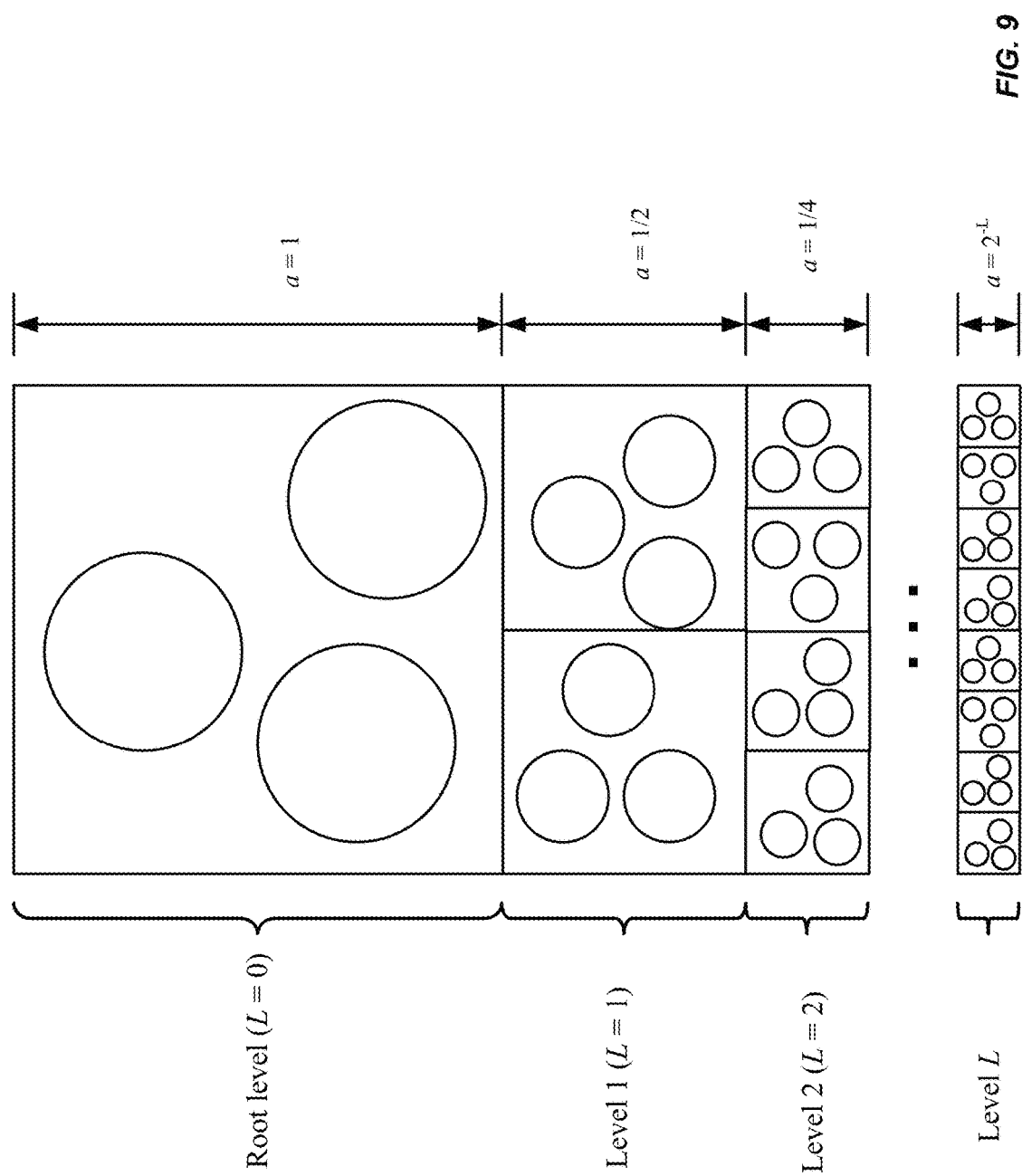
FIG. 9 illustrates an exemplary octree cell structure for storing vorticles according to some embodiments of the present invention.

FIG. 9 illustrates an exemplary cell structure. In some embodiments, the cell size a may be expressed as $a=2^{-L}$, where $$L = \frac{\log r_i}{\log 2}$$

is the level in an octree. When traversing up the octree from a child cell to a parent cell (i.e., from lower level L to higher level L−1), larger vorticles may be collected.

According to some embodiments, the steps in an FMNI method may include:

(1) Compute the far coefficients $\vec{\mu}_{lmn}$ of all cells with vorticles, as described further below and illustrated in FIGS. 10A-10B. The far interacting cells may also be allocated all the way to the root, so that steps (2) and (3) may propagate valid coefficients to the deepest cell, to cover all positions with the octree.

(2) Traverse the tree from the leaves to the root level 0, translating and accumulating the children's far coefficients $\vec{\mu}_{lmn}$ into the parent's far coefficient $\vec{\mu}_{l'm'n'}$, as described further below and illustrated in FIGS. 11A-11B.

(3) Traverse the tree from the root level 0 to the leaves: first, the parent's near coefficient is translated, as described further below and illustrated in FIGS. 12A-12B; second, the far interacting cells' far coefficient is transformed, as described further below and illustrated in FIGS. 13A-137B. Each far interacting cell's set of coefficients $\vec{\kappa}_{lmn}$ is added to the set of coefficients stored in the current cell.

(4) After step (3), the coefficients at the leaves represent all far vorticles are then used in Eq. (15).

a) Vorticle Far Coefficients

The far advected field may be decomposed around the origin using the far coefficients $\vec{\mu}_{lmn}$:

$$\vec{v}_{far}(p) = \sum_{l=0}^{l_{max}} \sum_{m=-l}^{l} \sum_{n=1}^{n_{max}} \nabla \left( Y_{lm}(p) \frac{1}{\|p\|^n} \right) \times \vec{\mu}_{lmn} \quad (17)$$

Unlike a traditional expansion, an advantage of this expansion may be that it includes the vorticles' size. To compute the far coefficients $\vec{\mu}_{lmn}$, a far expansion of a single vorticle's stream function may be made as:

$$\vec{\psi}_i(p - p_i) = \vec{w}_i \xi_i(\|p\|) \sum_k P_k \left( \frac{p \cdot p_i}{\|p\|\|p_i\|}, \tau_i(\|p\|) \right) \frac{\|p_i\|^k}{\|p\|^k} \quad (18)$$

This can be achieved by identifying the terms of a Taylor expansion near $\varepsilon=0$ of $\xi_i(\|p-p_i\|)=\xi_i(\|p\|)(1+\tau_i(\|p\|)\varepsilon)^{-1/2}$, where $$\tau_i(l) = \frac{1}{1 + r_i^2/l^2},$$

and where $P_k(z, \tau)$ is a modified Legendre polynomial, that is, a Legendre polynomial where the ith non-zero coefficient of the largest power of z is multiplied by $\tau_i^{k-i}$. The first few are:

$$P_0(\alpha, \tau) = 1 \quad (19)$$
$$P_1(\alpha, \tau) = \alpha\tau$$
$$P_2(\alpha, \tau) = -\frac{\tau}{2} + \frac{3\alpha^2\tau^2}{2}$$

This modified Legendre decomposition may be projected on the Legendre polynomials:

$$\vec{\psi}_i(p - p_i) = \vec{w}_i \sum_l P_l \left( \frac{p \cdot p_i}{\|p\|\|p_i\|} \right) B_l(\|p\|, \|p_i\|) \text{ where:} \quad (20)$$

$$B_l(r, d_i) = \xi_i(r) \sum_{k=l}^{\infty} \beta_{kl}(\tau_i(r)) \frac{d_i^k}{r^k} \quad (21)$$

$$\beta_{kl}(\tau) = \int_{-1}^{1} \frac{2l+1}{2} P_l(\alpha) P_k(\alpha, \tau) d\alpha$$

A series expansion in 1/r may then be perform to obtain the radial coefficients $b_{ln}$:

$$B_l = \sum_{n=1}^{\infty} b_{ln} \frac{1}{r^n} \quad (22)$$

Finally, the Legendre polynomial may be projected on the spherical harmonics to obtain the spherical coefficients $y_{lm}$:

$$y_{lm} = \int_{\theta=0}^{2\pi} \int_{\phi=0}^{\pi} P_l \left( \frac{p_{r\theta\phi} \cdot p_i}{\|p_i\|} \right) Y_{lm}(\theta, \phi) d\theta d\phi \quad (23)$$

Thus the far coefficients $\vec{\mu}_{lmn}$ of one vorticle is assembled from the radial coefficient, the spherical coefficient, and the vorticle's rotation strength $\vec{w}_i$:

$$\vec{\mu}_{lmn} = y_{lm} b_{ln} \vec{w}_i \quad (24)$$

The first few far coefficients are given in Appendix 3. The far field of multiple vorticles may be obtained simply by summing the coefficients of each vorticle.

FIGS. 10A-10B illustrates how individual vorticles inside the box (FIG. 10A) are transformed into far coefficients relative to the box's center (FIG. 10B) for evaluations outside of the 26 neighboring cells shown with a dashed line. This reduction of complexity to a basis of constant size makes this method scalable. For evaluating $\vec{v}$ outside of the octree, the far expansion of Eq. (17) is used at the root.

b) Far Coefficients Translation

FIGS. 11A-11B illustrates how the far field of a cell (FIG. 11A) is translated to the parent cell (FIG. 11B). The matching area is outlined in red. The 26 neighboring cells are shown with a dashed line. To compute the parent's far coefficients $\vec{\mu}'_{l'm'n'}$ from child coefficients $\vec{\mu}_{lmn}$ relative to offset location c, a series expansion of $\vec{\psi}_{far}(p+c)$ in $1/r$ can be made and projected on the translated basis $Y_{l'm'}$. The first few are given in Appendix 4.

Since the relative spatial configuration between parent and children nodes are repeated in the octree, the translation coefficients can be precomputed, and the translation becomes a mere sum of weighted vectors. This is also the case for all other coefficients.

c) Far-to-Near Coefficients Transform

FIGS. 12A-12B illustrate how, to evaluate the far field of a cell inside the dashed red line (FIG. 12A), the far field is transformed into a near field (FIG. 12B). For far interacting cells, the far expansion coefficients $\vec{\mu}_{lmn}$ are transformed into the near expansion coefficients $\vec{\kappa}_{l'm'n'}$. To compute the near coefficients $\vec{\kappa}_{l'm'n'}$ of the translated far coefficient $\vec{\mu}_{lmn}$ to a new location c, a series expansion of $\vec{\psi}_{far}(p+c)$ in r may be made and projected on the translated basis $Y_{l'm'}$ to obtain the coefficient of the translated field. Since some of the far coefficients are zero, they simplify, and the first few are given in Appendix 5.

d) Near Coefficients Translation

The coefficients from parent nodes $\vec{\kappa}_{lmn}$ can be propagated to the coefficient of children nodes $\vec{\kappa}'_{l'm'n'}$, by translating the parent's coefficient to each child's center, and adding the coefficient. To compute the coefficients $\vec{\kappa}'_{l'm'n'}$ of the translated coefficient $\vec{\kappa}_{lmn}$ to a new location c, a series expansion of $\vec{\psi}_{near}(p+c)$ in r can be made and projected on the translated basis $Y_{l'm'}$ to obtain the coefficient of the translated field. They simplify and the first few are given in Appendix 6.

Figure 13B:
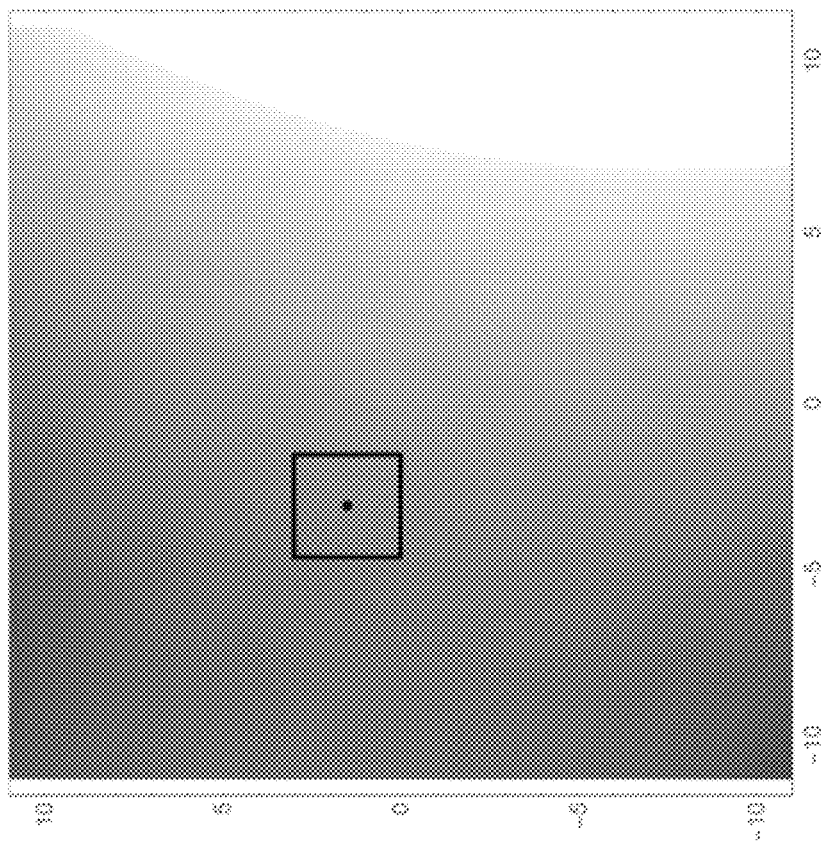
FIGS. 13A-13B illustrate how the near field of a cell (FIG. 13A) is translated to a child cell (FIG. 13B) according to some embodiments of the present invention.
Figure 13A:
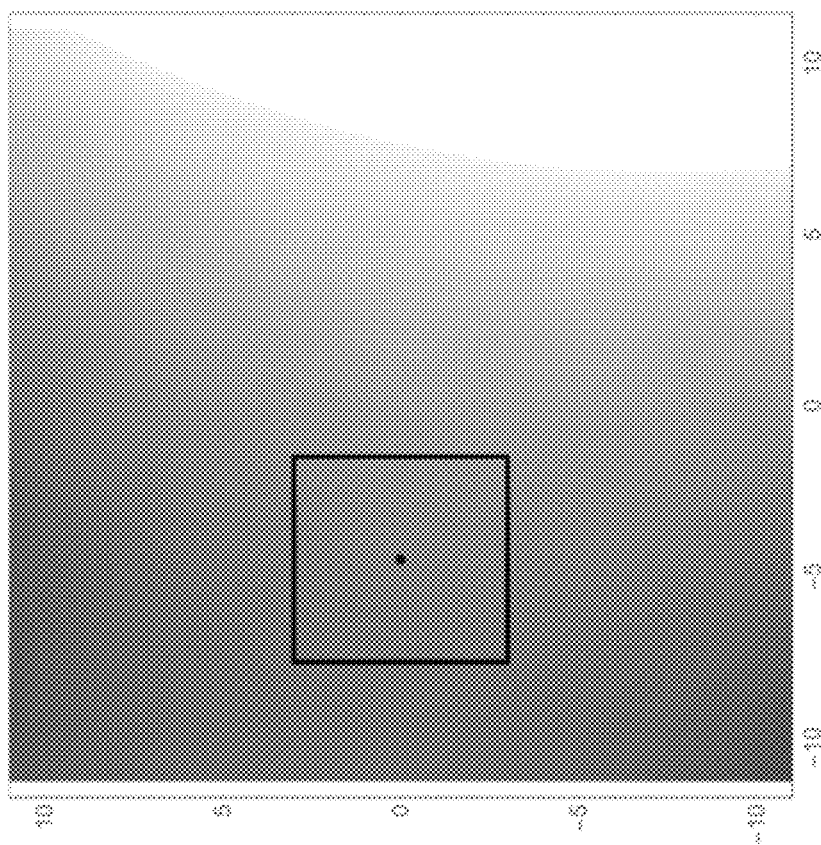

FIGS. 13A-13B illustrate how the near field of a cell (FIG. 13A) is translated to a child cell (FIG. 13B).

C. Harmonic Field

The harmonic field $\vec{h}$ in Eq. (4) can be computed using the source and doublet panel method. In contrast with the coupling of grid based solvers, which solve for both pressure and boundaries simultaneously in a volume domain, the source and doublet panel method solves the boundaries' degrees of freedom on a surface domain, with a solution smoothly defined between the boundaries and infinity. Given a manifold surface defined by n triangle panels $\delta\Omega_j$ with normal $\vec{n}_j$ pointing outside, field $\vec{h}$ is defined as:

$$\vec{h} = \Sigma_j \sigma_j \nabla S_j + \mu_j \nabla D_j. \qquad (25)$$

Each triangle induces a source panel field $S_j$ and a doublet panel field $D_j$, defined by surface integrals:

$$S_j(p) = \int \int_{\delta\Omega_j} \frac{1}{\|p-x\|} dx \qquad (26)$$

$$D_j(p) = -\int \int_{\delta\Omega_j} \vec{n}_j \cdot \frac{p-x}{\|p-x\|^3} dx$$

The gradients of the source and the doublet are both irrotational and incompressible, and therefore $\nabla \cdot \vec{h} = 0$ and $\nabla \times \vec{h} = 0$. To find $\sigma_j$ and $\mu_j$ such that field $\vec{h}$ cancels field $\vec{v}$ across all boundaries, the linear system of the direct approach can be solved by placing a control point $p_i$ at the center of each panel. This produces a linear system of 2n equations with 2n variables:

$$\begin{cases} 0 = \sum_j \sigma_j S_j(p_i) + \mu_j D_j(p_i) \\ \vec{n}_i \cdot (\vec{s}(p_i) - \vec{v}(p_i)) = \sum_j \sigma_j \vec{n}_i \cdot \nabla S_j(p_i) + \mu_j \vec{n}_i \cdot \nabla D_j(p_i) \end{cases} \qquad (27)$$

where $\vec{s}(p_i)$ the velocity at the center of panel i. If the boundary isn't moving, then $\vec{s}(p_i) = 0$. For numerical evaluations, analytical integrals for $S_j$ and $\nabla S_j$, $D_j$ and $\nabla D_j$ may be used, provided in Appendices 9 and 10.

For evaluating the harmonic field $\vec{h}$, the harmonic field in near and far fields may be split:

$$\vec{h} = \vec{h}_{near} + \vec{h}_{far}. \qquad (28)$$

The panels may be stored in an octree structure similar to the one used for the advected field. Note that this can be a second octree, since vorticles sample space between colliders, whereas the panels sample the surface of the colliders, and there is generally no cell correlation between the two.

1. Near Harmonic Field

The near harmonic field may be evaluated directly by summing the harmonic fields of the near panels, in the cell and 1-cell ring across all levels, in a manner similar to Eq. (13):

$$\vec{h}_{near}(p) = \sum_{j \in near(p)} \sigma_j \nabla S_j(p) + \mu_j \nabla D_j(p) \qquad (29)$$

FIGS. 14A-14B illustrate an initial position of a boundary object (e.g., a tea pot) moving into points (the lattice) (FIG. 14A), and how the harmonic field may warp the space in an incompressible and irrotational manner with a slip boundary (FIG. 14B).

2. Far Harmonic Field

The far harmonic field is similar to the far advected field, but instead of the curl of a field with vector coefficients, it is the gradient of a field with scalar coefficients. The near harmonic coefficients $\kappa_{lmn}$ can be computed using the same FMNI algorithm, but only with 1-dimensional coefficients, and with samples on the surface:

$$\vec{h}_{far}(p) = \Sigma_{l=0}^{lmax} \Sigma_{m=-l}^{l} \Sigma_{n=1}^{nmax} \kappa_{lmn} \nabla (Y_{lm}(p)\|p\|^n) \qquad (30)$$

Eq. (30) is similar to Eq. (15). To derive the far coefficients, each source and doublet panel of area $a_j$ may be approximated with a point:

$$\vec{h}_{far} = \quad (31)$$

$$\nabla\left(\sum_j a_j \sigma_j \frac{1}{\|p - x_j\|} + \frac{a_j \mu_j}{2\varepsilon}\left(\frac{1}{\|p - (x_j - \varepsilon \vec{n}_j)\|} - \frac{1}{\|p - (x_j + \varepsilon \vec{n}_j)\|}\right)\right),$$

where the source panel is converted to a point with area $a_j$ and the coefficients $y_{lm}$ and $b_{ln}$ are a special case of Eq. (24) with $r_j=0$. For the source located at $x_j$:

$$\mu_{lmn} = a_j \sigma_j y_{lm} b_{ln} \quad (32)$$

The doublet produces two sources, located at $x_j - \varepsilon \vec{n}_j$ and at $x_j + \varepsilon \vec{n}_j$, with far coefficients:

$$\mu_{lmn} = \frac{a_j \mu_j}{2\varepsilon} y_{lm} b_{ln} \quad (33)$$

$$\mu_{lmn} = -\frac{a_j \mu_j}{2\varepsilon} y_{lm} b_{ln}.$$

The coefficients $y_{lm}$ and $b_{ln}$ are also the ones of Eq. (24). If the surface is undersampled, the discretization error can manifest itself visually as weak currents leaking in or out of boundaries, usually far from the control points and near panel edges. This issue can be reduced for inward leakage by imposing a no-through condition per point, and for outward leakage by using the maximum principle: the magnitude of the harmonic field in the entire space is bound by the harmonic field's value on the surface. Near the surface, it may be assumed that $$\vec{n}_i \cdot \vec{u}(p) <= \operatorname{argmax}(\vec{n}_i \cdot (\vec{s}(p_i) - \vec{v}(p_i))).$$

D. Stretching

While the previous sections focus on computing $(\nabla \times)^{-1} \vec{\omega}$, the following sections focus on the dynamic terms in the right-hand side of Eq. (2). The term $(\vec{\omega} \cdot \nabla)\vec{v}$ in Eq. (2) models the stretching of vorticity, and is responsible for changing the vorticle orientation as well as introducing increasingly high frequency velocities by transferring large scale eddies to smaller scale eddies [Frisch and Kolmogorov 1995]. This term does not have an explicit analogue in Eq. (1), and comes from the expansion into partial derivatives of the acceleration's curl. It is the change of vorticity by the velocity gradient. Stretching may be measured assuming that $\vec{w}_i$ and $\vec{\omega}(p_i)$ have the same direction, which is true for an isolated vorticle, or when $r_i \to 0$. As the approach taken by Zhang and Bridson [2014], two points may be displaced on either side of $p_i$. Reducing this measurement to two points may be a valid approach because the flow is incompressible, and it can be safely assumed that a stretch along $\vec{w}_i$ is accompanied by a corresponding squash on the plane perpendicular to $\vec{w}_i$. After one time step, $\vec{\omega}_i(p_i)$ becomes $\vec{\omega}'_i(p_i)$:

$$\vec{\omega}_i(p_i) = 2r_i^{-3/2} \vec{w}_i \quad (34)$$

$$\vec{\omega}'_i(p'_i) = 2r_i^{-3/2}\left(\vec{w}_i + \frac{\Delta_i \|\vec{w}_i\|}{r_i}(\vec{u}(q_1) - \vec{u}(q_0))\right)$$

$$q_0 = p_i - \frac{r_i \vec{w}_i}{2\|\vec{w}_i\|}$$

$$q_1 = p_i + \frac{r_i \vec{w}_i}{2\|\vec{w}_i\|}$$

To apply this measure of stretching to a vorticle, closed-form formulas may be developed for the ellipsoidal fields of a vorticle under uniform stretching:

$$\vec{v}_i(\vec{x}, s) = s \xi_i(\|\sigma(\vec{x}, s)\|)^3 \vec{w}_i \times \vec{x}$$

$$\vec{\omega}_i(\vec{x}, s) = s \xi_i(\|\sigma(\vec{x}, s)\|)^3 (2\vec{w}_i - 3\xi_i(\|\sigma(\vec{x}, s)\|)^2 \sigma(\vec{x}, s^2) \times (\vec{w}_i \times \vec{x})), \quad (35)$$

where $$\sigma(\vec{x}, s) = \frac{1}{\|\vec{w}_i\|^2}(s^{-4/5}(\vec{x} \cdot \vec{w}_i)\vec{w}_i + s^{7/10}(\vec{w}_i \times \vec{x}) \times \vec{w}_i).$$

When the stretching factor increases, it stretches $\vec{\omega}_i$ by a factor $s$ along $\vec{w}_i$, and squashes $\vec{\omega}_i$ by $\sqrt{1/s}$ along any direction perpendicular to $\vec{w}_i$, in accordance with the deformation induced by an incompressible flow:

$$\frac{\vec{\omega}_i(\vec{x}, s) \cdot \vec{w}_i}{\vec{\omega}_i(\sigma(\vec{x}, s)) \cdot \vec{w}_i} = s \quad (36)$$

$$\frac{\vec{\omega}_i(\vec{x}, s) \cdot (p \times \vec{w}_i)}{\vec{\omega}_i(\sigma(\vec{x}, s)) \cdot (p \times \vec{w}_i)} = \sqrt{1/s}.$$

The rotation part of stretching may be applied to $\vec{w}_i$, and the scale part to $s_i$, and obtain a stretched vorticle:

$$r'_i = r_i \quad (37)$$

$$\vec{w}'_i = \|\vec{w}_i\| \frac{\vec{\omega}'_i(p_i)}{\|\vec{\omega}'_i(p'_i)\|} \quad (38)$$

$$s'_i = \frac{\|\vec{\omega}'_i(p'_i)\|}{\|\vec{\omega}_i(p_i)\|} \quad (39)$$

The stretchable vorticle may then be unstretched in a manner that preserves both $E_i$ and the enstrophy $\Omega_i$ of the stretched vorticle. Preserving enstrophy is a local way to reduce as much as possible the disruption of this step over the vorticity dynamics.

$$\Omega_i = \frac{1}{2}\int \vec{\omega}_i^2 dx = \frac{3\pi^2(1 + 4s_i'^3)}{64 r_i'^3 s_i'^{8/5}} \|\vec{w}'_i\|^2. \quad (40)$$

The stretching factor is restored to 1, and the resulting vorticle is unstretched:

$$r''_i = r_i s_i'^{4/5}\left(\frac{5}{1 + 4s_i'^3}\right)^{1/2} \quad (41)$$

$$\vec{w}''_i = \sqrt{\frac{r''_i}{r_i}} \|\vec{w}_i\| \frac{\vec{w}'_i(p'_i)}{\|\vec{w}'_i(p'_i)\|}$$

This can be an important new insight: when a vorticle's stretching factor is greater than 1, its strength must be reduced so that the mean vorticity and enstrophy can be preserved. Limit resolutions may also be specified with a lower threshold $r_{min}$ and upper threshold $r_{max}$ on the vorticle size $r_i$. This limit resolution loses enstrophy, but does not lose energy because of Eq. (9). Thus Eq. (34), Eq. (39), and Eq. (41) can provide a way to apply stable energy preserving stretching to a vorticle. In a real fluid, turbulence approaching the fluid's Kolmogorov length mix with an effective viscosity. When a vorticle is squeezed below $r_{min}$, the stretching may be turned into a higher viscosity coefficient for that vorticle, with the diffusion per vorticle of the next section. This is necessary to remove vorticles with small contribution.

FIGS. 15A-15C illustrate a first vorticle 1510 (FIG. 15A) is stretched into a second vorticle 1520 (FIG. 15B), where the mean energy is preserved while the enstrophy changes; and the second vorticle 1520 is then resampled in an unstretched third vorticle 1530 (FIG. 15C) with the same mean energy and enstrophy as the second vorticle 1520.

E. Viscosity

The term $v\nabla^2 \vec{\omega}$ in Eq. (2) models viscosity. It is the analogue of the viscosity term of Eq. (1), with the difference that $v$ is varying if the density $\rho$ is varying. Since vorticles have a size and aren't singular at their center, a well behaved vorticle derivative that is consistent with the dynamics can be computed:

$$\nabla^2 \vec{\omega}_i(\vec{x}) = 15(\|\vec{x}\|^2 \xi_i^2 - 1)\xi_i^5(2\vec{w}_i - 7\xi_i^2 \vec{x} \times \vec{w}_i \times \vec{x}) \tag{42}$$

This equation may be solved in a multiscale manner with a near and far diffusion in an octree, as discussed above.

$$\frac{d\vec{\omega}_i}{dt} = v\nabla^2 \vec{\omega}_i$$

may be solved more simply, by updating the vorticle enstrophy to match that of $\vec{\omega}_i + \Delta_t v \nabla^2 \vec{\omega}_i$. Since vorticles have no mass, this model disregards the mass of the advected quantity. Its advantage however is in providing users with a viscosity that is spatially tweakable per vorticle, and bound to the dynamics. The linear approximation is only valid when the diffusion $\Delta_i v$ is small enough. Therefore, the diffusion may be clamped to enforce monotonicity. After one time step, the vorticle strength becomes:

$$\vec{w}_i = \begin{cases} \sqrt{1 + \frac{\Delta_t v}{r_i^2}\left(\frac{11025\,\Delta_t v}{256\,r_i^2} - \frac{35}{4}\right)}\,\vec{w}_i & \text{if } \Delta_t v < \frac{32}{315}r_i^2 \\ \frac{\sqrt{5}}{3}\,\vec{w}_i & \text{otherwise} \end{cases} \tag{43}$$

Another limitation of this viscous model is that it does not carry the diffusion of direction from vorticle to vorticle.

F. Buoyancy

When p is outside of solid objects, the term $$\nabla \log(\rho) \times \left(\vec{F} - \frac{d\vec{u}}{dt}\right) + \nabla \times \vec{F} \text{ in Eq. (2)}$$

becomes $$\nabla \log(\rho) \times \left(\vec{g} + \vec{e} - \frac{d\vec{u}}{dt}\right) + \nabla \times \vec{e},$$

and models the vorticity induced by buoyancy. This component may require a varying density in order to have any effect.

New vorticles are produced from the density field $\rho$ releasing potential energy. $\rho$ may be defined with a set of particles carrying density and an ambient density $\rho_A > 0$, so the total density field $\rho$ is strictly greater than 0, as required by Eq. (2):

$$\rho = \rho_A + \Sigma \rho_j. \tag{44}$$

Figure 16:
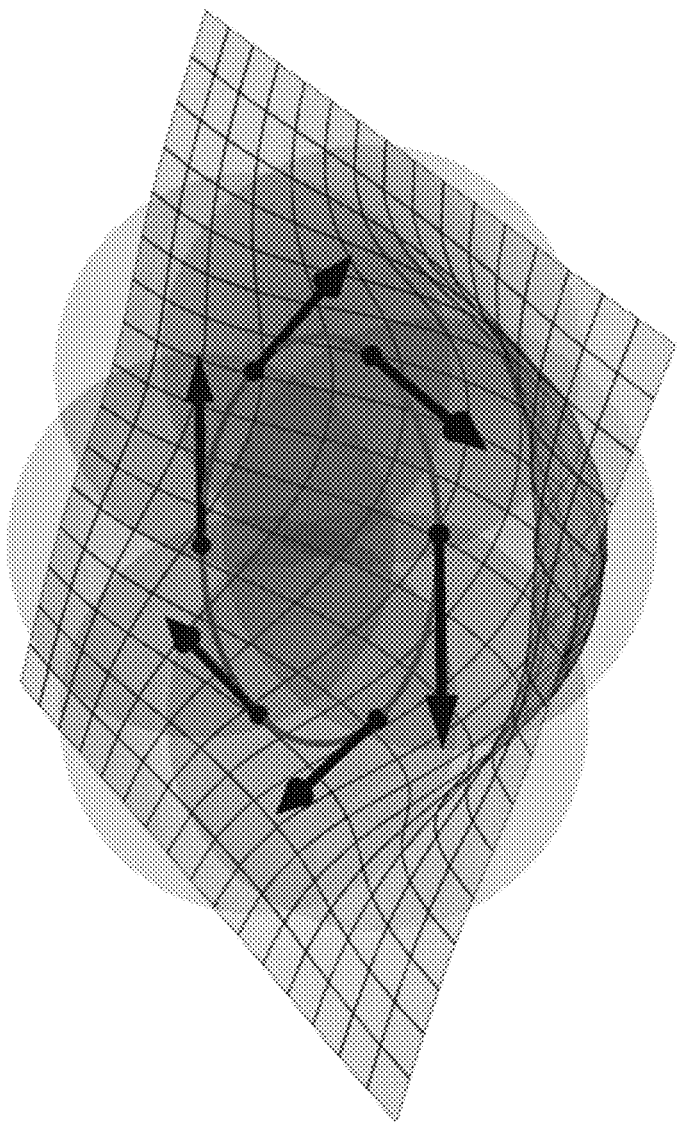
FIG. 16 illustrates a density particle emits a ring of vorticles (red) according to some embodiments of the present invention.

FIG. 16 illustrates a density particle emits a ring of vorticles (red). The ring may be sampled with vorticles of strengths that match the mass of the density particles, as visualized on points (green lattice).

The falloff $\rho_j$ of a density particle j is centered at $x_j$, and defined per Appendix 7 in local coordinates $q_j = p - x_j$ as:

$$\rho_j = m_j \frac{\exp\left(\left(1 + \kappa_1 \frac{q_j q_j}{2r_j^2}\right)^{-\kappa_2}\right) - 1}{e - 1}, \tag{45}$$

where $m_j$ is a multiplier of the particle density field, and $\kappa_j$ is is given in Eq. (55). The newly induced vorticles are located along a ring of diameter $r_j$ perpendicular to $$\vec{g} + \vec{e} - \frac{d\vec{u}}{dt}.$$

Instead of advecting an additional filament representation, the ring with n new vorticles may be discretized, equidistant for simplicity, and where n=2 in practice. Orthogonal unit vectors $\vec{a}$ and $\vec{b}$ may be defined such that $\vec{a} \times \vec{b}$ has the direction of $$\vec{g} + \vec{e} - \frac{d\vec{u}}{dt}.$$

Given n randomly selected samples $\alpha_j$, the new vorticles are in the density particle's local coordinates:

$$x_{\alpha j} = x_j + \frac{r_j}{2}(\cos(\alpha_j)\vec{a} + \sin(\alpha_j)\vec{b}) \tag{46}$$

$$\vec{w}_{\alpha j} =$$

$$r_j\sqrt{r_j}\,\kappa_0 \frac{\pi}{n}\left\|\vec{g} + \vec{e} - \frac{d\vec{u}}{dt}\right\|\frac{\rho_j(x_\alpha) + \frac{m_j}{e-1}}{\rho(x_\alpha)}(-\sin(\alpha_j)\vec{a} + \cos(\alpha_j)\vec{b})$$

$$r_{\alpha j} = r_j$$

To evaluate the acceleration $$\frac{d\vec{u}}{dt},$$

the velocity may be sampled both after and before the advection of the particle, before emission of new vorticles in order to avoid the temporal jolt of the new vorticles.

G. Vorticity Shedding

When p is at the boundary of a solid object, the term $$\nabla \log(\rho) \times \left(\vec{F} - \frac{d\vec{u}}{dt}\right) + \nabla \times \vec{F}$$

in Eq. (2) measures the change of vorticity at the moving object's boundary. This component is absent in inviscid fluids, and always present in real fluids. The viscosity coefficient for vorticity shedding can be specified independently from the viscosity discussed above.

The surface vorticity spreads into the flow by a diffusion proportional to viscosity coefficient v. We show in Appendix 8 that the surface vorticity that satisfies our boundary conditions is $$\left(\vec{f} - \vec{e} - \frac{d\vec{u}}{dt}\right) \times \vec{n}.$$

The vorticity shedding may be the solution to a differential equation with boundary condition:

$$\begin{cases} \frac{d\vec{\omega}}{dt} = \nu \nabla^2 \vec{\omega} \\ \vec{\omega}\Big|_{p \in \delta\Omega} = \Delta_t \left(\vec{f} - \vec{e} - \frac{d\vec{u}}{dt}\right) \times \vec{n} \end{cases} \quad (47)$$

Eq. (47) may be solved by shedding vorticles. The surface may be divided into n panels of area $a_i$ and centroid $x_i$, and emit per panel a vorticle that roughly approximates the heat kernel during a time step $\Delta_t$:

$$\vec{w}_i = a_i \frac{r^{1/2}}{4\pi} \left(\vec{f} - \vec{e} - \frac{d\vec{u}}{dt}\right) \times \vec{n} \quad (48)$$

$$r_i = \sqrt{2} \sqrt{\Delta_t \nu}.$$

$$\left\|\left(\vec{f} - \vec{e} - \frac{d\vec{u}}{dt}\right) \times \vec{n}\right\|$$

normalized over the surface may be used, as a probability distribution function to create samples at the locations that most affect the flow. Note that $\vec{f}$ is the surface acceleration, as opposed to the velocity. To compute the acceleration, Eq. (6) at the previous time may be stored on the surface, and $$\frac{d\vec{u}}{dt} \simeq \frac{\vec{u}(t) - \vec{u}(t - \Delta_t)}{\Delta_t}$$

may be used.

Figure 17A:
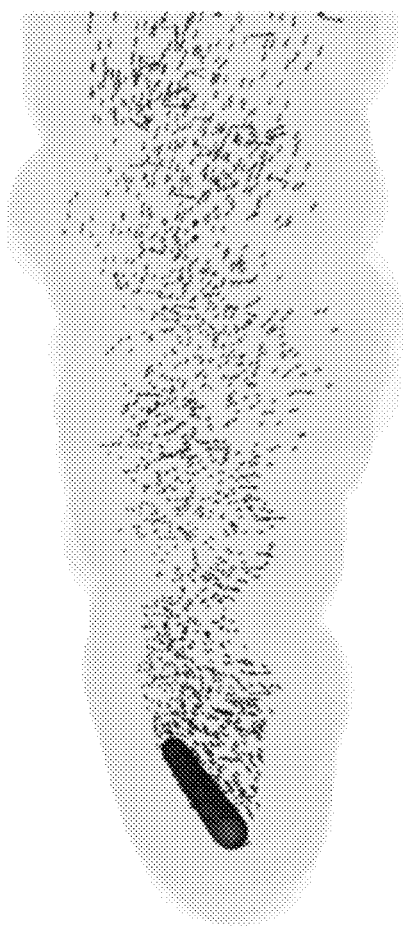
FIG. 17A illustrates a constant flow moves at 10 ms$^{-1}$ with v=0.1 around a static pole of radius 1 (red): the surface sheds vorticles (black arrows), according to some embodiments of the present invention.
Figure 17B:
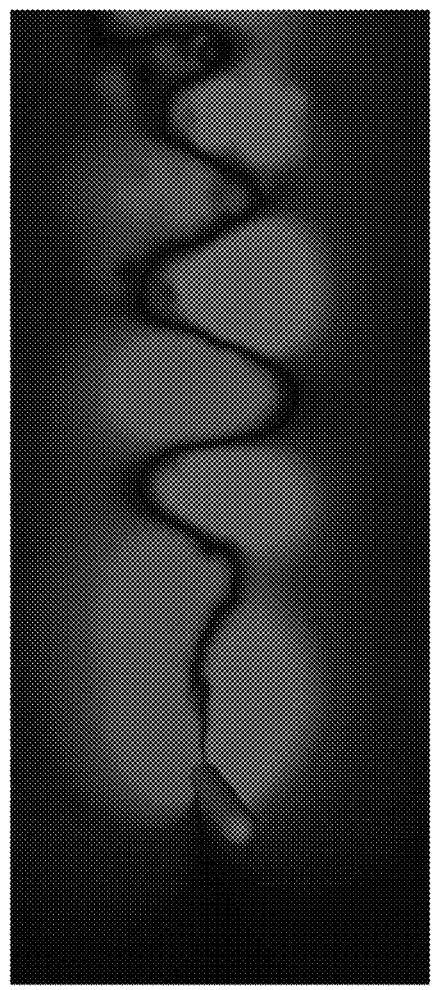
FIG. 17B illustrates a slice of the vorticity induced by the vorticles that reveals the emergent behavior of a von Kármán vortex street according to some embodiments of the present invention.

This may produce the expected behavior as illustrated in FIGS. 17A-17B. FIG. 17A illustrates a constant flow moves at 10 ms$^{-1}$ with v=0.1 around a static pole of radius 1 (red): the surface sheds vorticles (black arrows). FIG. 17B illustrates a slice of the vorticity induced by the vorticles that reveals the emergent behavior of a von Kármán vortex street. Furthermore, users can modify separately shedding induced by surface acceleration $\vec{f}$ and fluid acceleration $$\frac{d\vec{u}}{dt}.$$

Optimization

User emitters, buoyancy, and shedding introduce an increasing number of vorticles in the simulation. To address this rise of complexity, a fusing step may be used. Using the existing octree data structure, similar vorticles in each octree cell may be merged. The extreme fusion case is one vorticle per cell. The fusing method may favor the vorticle of high energy, and equals the combined energy when $\vec{w}_0 = \vec{w}_1$ and $r_0 = r_1$:

$$p = \frac{\sqrt{E_0}\, p_0 + \sqrt{E_1}\, p_1}{\sqrt{E_0} + \sqrt{E_1}}$$

$$r = \frac{\sqrt{E_0}\, r_0 + \sqrt{E_1}\, r_1}{\sqrt{E_0} + \sqrt{E_1}}$$

$$\vec{w} = (r_0/r)^{3/2} \vec{w}_0 + (r_1/r)^{3/2} \vec{w}_1$$

H. Multi-Scale Density Advection

Modern renderers handle volumes in the form of voxel grids. It may therefore be necessary to output the density and velocity in that form. A simple method may be used as a starting point for a full solution, compatible with available volume data structures [Museth 2013; Wrenninge 2016]. According to some embodiments, given a single smoke density emitter, the space may be split into multiple grids: density is emitted in a grid with a resolution based on the position in camera space of the emitter at the times of emission. The velocity is then evaluated in the grid, and used for advecting the density (i.e., "moving" the density). Since all densities share a common velocity field, the dynamics may remain consistent, and multiple density resolutions may overlap in an additive manner.

FIGS. 18A-18E illustrate schematically a method of forming a density grid according to some embodiments. Referring to FIG. 18A, a camera is located at the point p. The three-dimensional space surrounding the camera may be split into a set of regions defined by concentric spheres centered at p. In some embodiments, the radii of the spheres may increase exponentially as $r_j = 2^j \times r$, where r is the radius of the inner-most sphere. A region $S_j$ may be defined as the space located between two consecutive spheres, i.e., a sphere of radius $2^j \times r$ and the next larger sphere of radius $2^{j+1} \times r$. For instance, in the example illustrated in FIG. 18A, the set of regions may include a first region $S_0$ defined by the inner-most sphere 1810 of radius r, a second region $S_1$ located between the inner-most sphere 1810 and the next larger sphere 1820 of radius 2r, and a third region $S_2$ located between the sphere 1820 and the next larger sphere 1830 of radius 4r, and so on and so forth.

In some embodiments, each region $S_j$ may be associated with two voxel grids: a density voxel grid and a velocity voxel grid. The size of the density voxel grid for each region $S_j$ may increase exponentially as $2^j \times \text{SizeA}$. For instance, in the examples illustrated in FIGS. 18B-18D, the first region $S_0$ may be associated with a 4×4 density voxel grid with a grid size of SizeA (FIG. 18B), the second region $S_1$ may be associated with a 4×4 density voxel grid with a grid size of 2×SizeA (FIG. 18C), and the third region $S_2$ may be associated with a 4×4 density voxel grid with a grid size of 4×SizeA (FIG. 18D). FIG. 18E illustrates how the density voxel grids of the various regions $S_0$, $S_1$, and $S_2$ may be tiled to form an overall sparse density voxel grid.

Similarly, the size of the velocity voxel grid for each region $S_j$ may increase exponentially as $2^j \times \text{SizeB}$. In some embodiments, SizeB may be chosen to be greater than SizeA, so that each density voxel is covered by a velocity voxel. For example, SizeB may be chosen to be twice of SizeA as SizeB=2×SizeA. Thus, in the example illustrated in FIGS. 18A-18E, the velocity voxel grid for each region may be a 2×2 grid. The velocity voxel grids of the various regions $S_0$, $S_1$, and $S_2$ may be tiled with each other to form an overall sparse velocity voxel grid.

In some embodiments, as a density emitter overlaps a region, any inactive density voxels in the region that overlap with the emitter may be activated, and densities are added to those density voxels. For instance, in the example illustrated in FIG. 18E, the density emitter 1840 overlaps with a first density voxel 1850 and a second density voxel 1860 in the second region $S_1$, and a third density voxel 1870 in the third region $S_2$. If the first density voxel 1850, the second density voxel 1860, and the third density voxel 1870 are inactive (i.e., have not been activated in a previous frame), they will be activated and densities are added to each one of those density voxels according to the density emitter 1840.

Because the resolution of the density voxel grids may vary from one region to another, two neighboring density voxel grids can have overlapping density voxels. In some embodiments, to find the density at a point in a region with overlapping density voxels, the densities of the overlapping density voxels may be summed by the renderer.

In some embodiments, as a density voxel is activated, a corresponding velocity voxel that covers the density voxel may be activated. Therefore, there is always active velocity voxels covering active density voxels. Each activated velocity voxel is then initialized by computing the velocity induced by the vorticles, using the acceleration octree structure, as discussed above. The velocity voxel grid is then used to advect the density voxel grid to the next frame, using a semi-Lagrangian advection. The term "advect" may refer to "moving" (e.g., the density).

In some embodiments, one or more density voxels may be pre-activated for a next frame using the velocity voxel grid. For example, a density voxel may be deformed using the velocity voxel grid to predict a deformed shape of the density emitter for the next frame. Those inactive density voxels that overlap with the deformed density emitter may be pre-activated.

In some other embodiments, the velocity voxel grid may be optional. Some renders may be capable of rendering sub-frame density, that is, sub-frame density voxel grids that can capture the variation over the course of a single frame.

I. Methods of Computer Graphic Simulation of Smoke

According to some embodiments, methods of simulating smoke in a computer graphic system may include the following steps:

(a) Add emitted vorticles, e.g., by splitting the emitter's energy among vorticles using Eq. (10).
(b) Build the octree of vorticles: store each vorticle in the cell of size $$2^{\left\lceil \frac{\log r_i}{\log 2} \right\rceil},$$

and allocate the far interacting cells, as described above.
(c) Compute the advected field near coefficients, as described above.
(d) Evaluate the advected field $\vec{v}$ at every panel location, using Eq. (12), as described above.
(e) Compute the source and doublet panel coefficients $\sigma_i$ and $\mu_i$ by solving Eq. (27), as described above.

(f) Build the octree of panels: store each panel in the cell of size $$2^{\left\lceil \frac{\log r_i}{\log 2} \right\rceil},$$

and allocate the far interacting cells, as described above.
(g) Compute the harmonic field near coefficients, as described above.
(h) Insert new density in the density voxels.
(i) Allocate velocity voxels and compute velocity field $\vec{u}$ at every voxel.
(j) Advect the density using the velocity voxels.
(k) Compute the velocity field a at every vorticle. Note that this step does not use the velocity voxels, but instead the octree structure.
(l) Advect the vorticles, as described above.
(m) Stretch vorticles, as described above.
(n) Diffuse vorticles, as described above.

Figure 19:
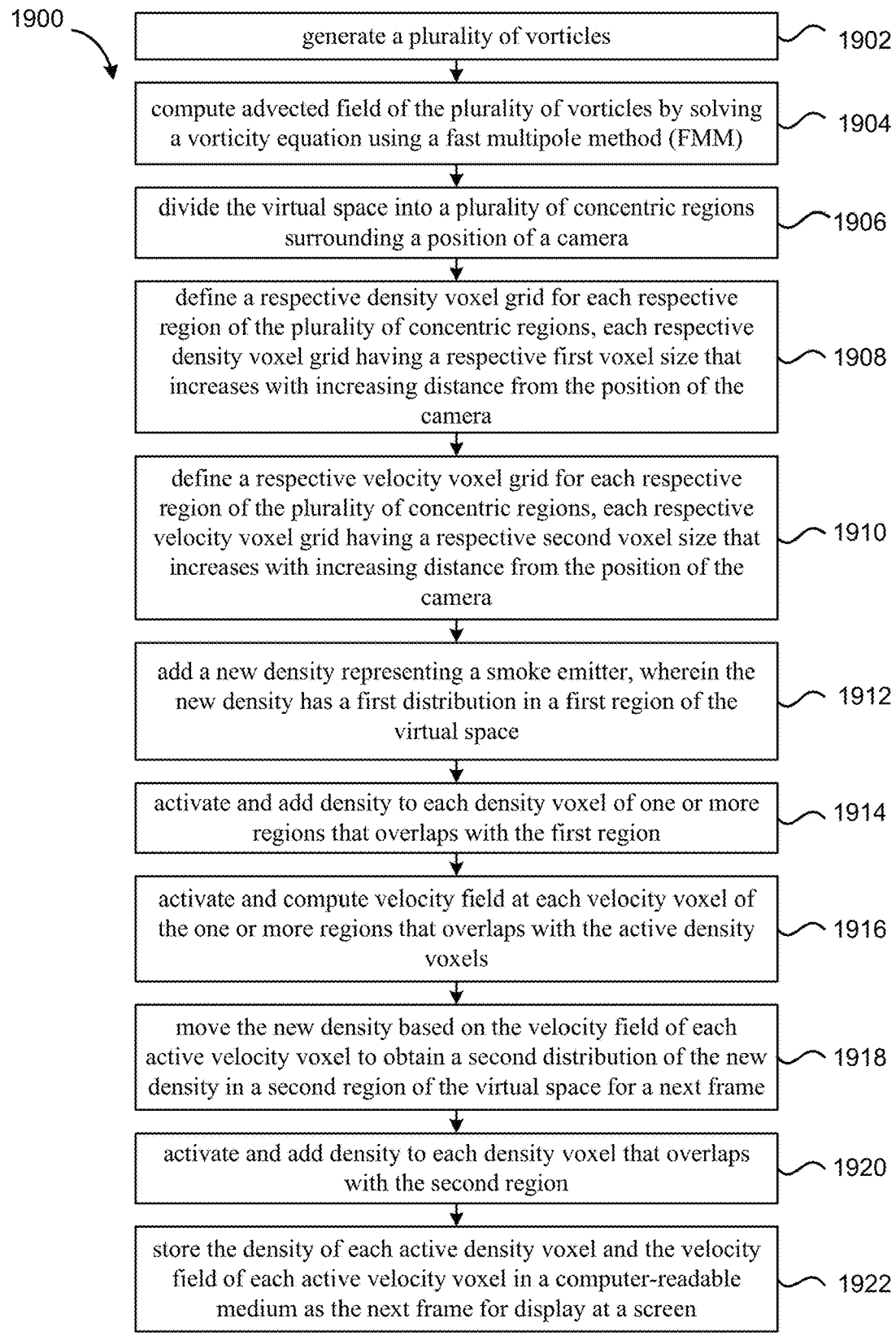
FIG. 19 is a flowchart illustrating a method of computer graphic image processing according to some embodiments of the present invention.

FIG. 19 is a flowchart illustrating a method of computer graphic image processing for generating rendered image frames of incompressible gas corresponding to a camera view of a three-dimensional virtual space according to some embodiments.

At 1902, a plurality of vorticles is generated. Each respective vorticle is centered at a respective position in the virtual space and has a respective spatial size.

At 1904, advected field of the plurality of vorticles is computed by solving a vorticity equation using a fast multipole method (FMM).

At 1906, the virtual space is divided into a plurality of concentric regions surrounding a position of a camera. In some embodiments, the plurality of concentric regions may be defined by a plurality of concentric spheres, and each respective region is located between two consecutive spheres, as discussed above in relation to FIG. 18A. In some other embodiments, the plurality of concentric regions may be defined by a plurality of concentric cubes, rectangular shapes, or the like.

At 1908, a respective density voxel grid is defined for each respective region of the plurality of concentric regions. Each respective density voxel grid may have a respective first voxel size that increases with increasing distance from the position of the camera. In some embodiments, the first voxel size may increase with increasing distance from the position of the camera as an exponential function, as discussed above in relation to FIGS. 18B-18E. In other embodiments, the first voxel size may be constant in various regions.

At 1910, a respective velocity voxel grid is defined for each respective region of the plurality of concentric regions. Each respective velocity voxel grid may have a respective second voxel size that increases with increasing distance from the position of the camera, as discussed above. In some embodiments, the respective second voxel size of each respective velocity voxel grid is greater than the respective first voxel size of the corresponding density voxel grid, as discussed above.

At 1912, a new density representing a smoke emitter is added. the new density has a first distribution in a first region of the virtual space. The first region may overlap with one or more regions of the plurality of concentric regions.

At 1914, each density voxel of the one or more regions that overlaps with the first region is activated, and adding density is added thereto.

At 1916, each velocity voxel of the one or more regions that overlaps with the active density voxels is activated, and velocity field at the velocity voxel is computed.

At 1918, the new density is moved based on the velocity field of each active velocity voxel to obtain a second distribution of the new density in a second region of the virtual space for a next frame.

At 1920, each density voxel that overlaps with the second region is activated, and density is added thereto.

At 1922, the density of each active density voxel and the velocity field of each active velocity voxel is stored in a computer-readable medium as the next frame for display at a screen.

In some embodiments, computing the advected field of the plurality of vorticles using the FMM may include building an octree of vorticles. The octree may include a plurality octree levels. Each respective octree level may have a cell size that is proportional to $2^{-L}$, where L is a level number of the respective octree level. Each respective vorticle of the plurality of vorticles may be stored in a respective cell of a respective octree level having a cell size that is proportional to the spatial size of the respective vorticle. For example, each vorticle may be stored in a cell having a cell size of $$2^{\left\lceil \frac{\log r_i}{\log 2} \right\rceil},$$

where $r_i$ is the spatial size of the respective vorticle. A first cell containing the position of the camera and cells that are direct neighbors of the first cell may be referred to as near cells, and all other cells may be referred to as far cells. The advected field may be computed using the FMM by summing the vorticles stored in each respective far cell.

In some embodiments, velocity field of the plurality of vorticles may be computed, and the plurality of vorticles may be moved to a next frame based on the velocity field using the octree.

J. Examples

Figures 20A, 20B:
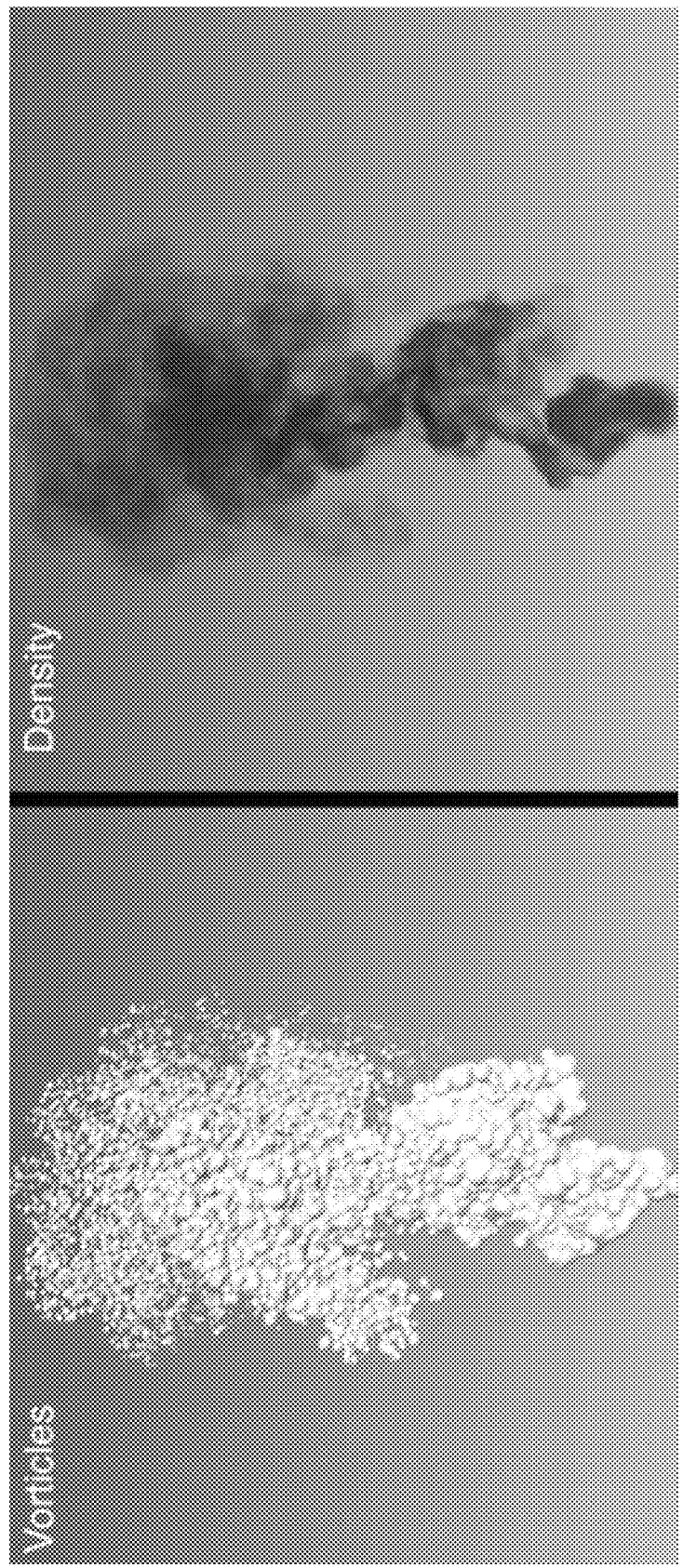
FIGS. 20A-20B illustrate a simulated smoke column according to some embodiments of the present invention.

FIGS. 20A-20B illustrate a smoke column simulated according to some embodiments. FIG. 20A shows the vorticles, and FIG. 20B shows density advected using the vorticles. As illustrated, turbulence size can be explicit. For example, the turbulence may become naturally smaller as the fluid evolves. This can also be controlled artificially. Also, the size of the turbulence can vary from large to small. In fact, the simulation methods disclosed herein can be multiscale and can combine tiny vorticles with very large vorticles in a stable manner. This can be advantageous for sampling fluids in a camera frustum.

FIGS. 21A-21D illustrate an example of a simulator that may take advantage of a camera frustum according to some embodiments. As the smoke emitter moves away from the camera (as shown in FIG. 21A), there are fewer vorticles (as shown in FIG. 21B), and the number of density voxels in the distance may be reduced (as shown in FIG. 21C). FIG. 21D shows a top down view of FIG. 21C, where one may more clearly see that voxels near the camera are smaller than voxels far from the camera.

Figure 22A:
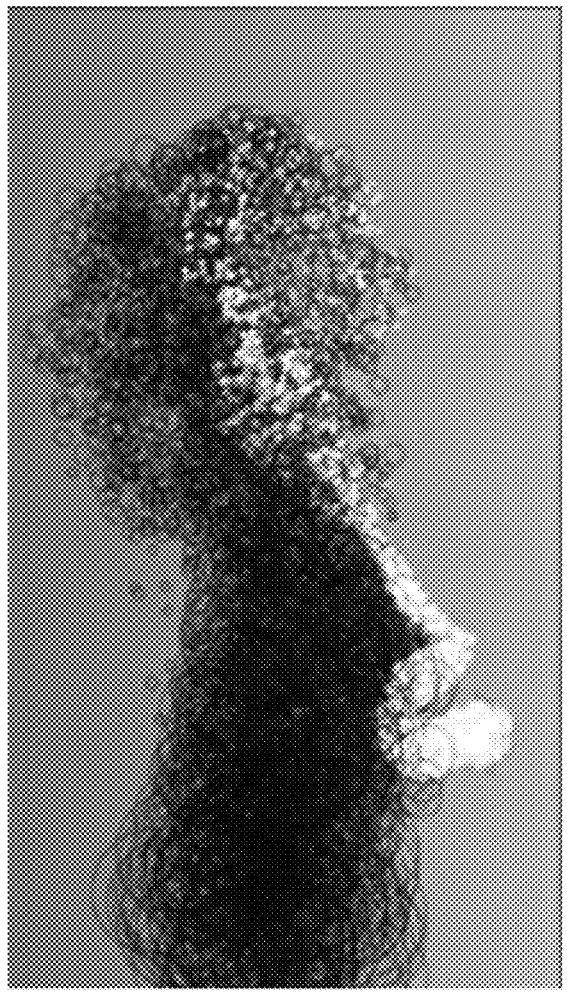
FIG. 22A illustrates how tiny vorticles (shown in white) may interact with large vorticles (shown in black) according to some embodiments of the present invention.
Figure 22B:
FIG. 22B shows the density advected using the vorticles illustrated in FIG. 22A.

FIG. 22A illustrates how tiny vorticles (shown in white) may interact with large vorticles (shown in black) according to some embodiments. FIG. 22B shows the density advected using the vorticles illustrated in FIG. 22A.

Figure 23A:
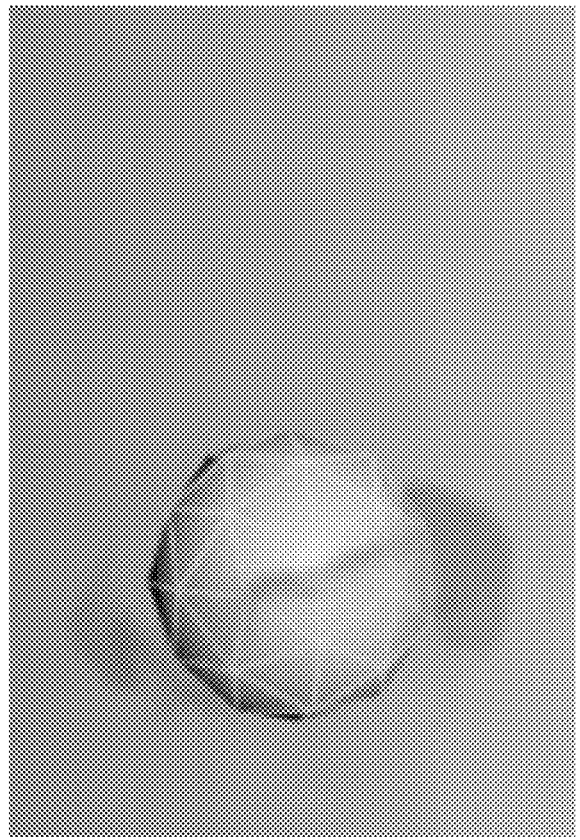
FIGS. 23A-23B illustrate how the harmonic field may play the same role as the pressure term in the classic grid-based Navier-Stokes equation according to some embodiments of the present invention.
Figure 23B:
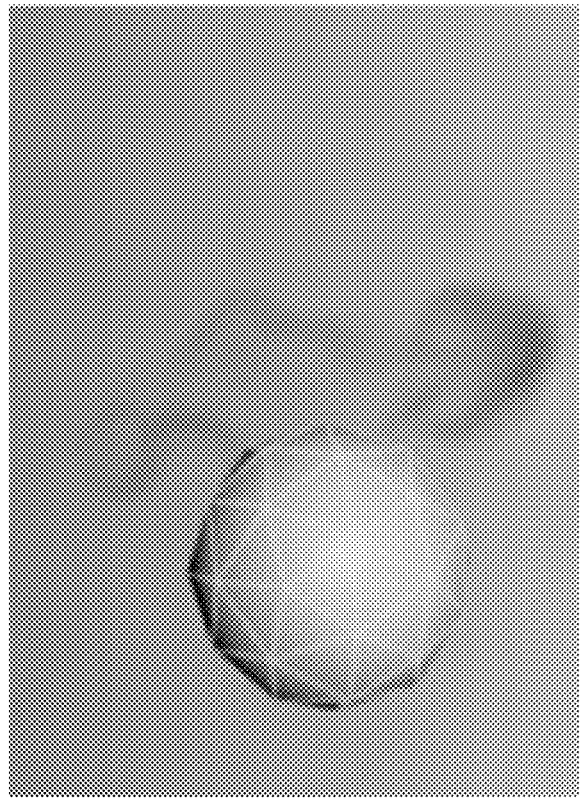

FIGS. 23A-23B illustrate how the harmonic field may play the same role as the pressure term in the classic grid-based Navier-Stokes equation according to some embodiments. The harmonic field may ensure that the flow does not cross boundaries of an object. The harmonic field may be computed using the source and doublet panel method as discussed above.

As described above, embodiments of the present invention provide methods of solving the Navier-Stokes' differential equation using spherical harmonics across multiple resolutions. There is no constraint on placing vorticles of arbitrary size. The methods can be very stable with mixed scales. The divergence-free basis functions may produce a field with no divergence by construction. The sampling resolution of density, dynamics and boundary condition may be decoupled from each other, and each can be sampled adaptively. The panel method may be further improved by filtering the advected field with a filter size proportional to the panel size. Vorticles that carry a volume of vorticity can be advected, as opposed to regularizing a point vorticity. This may lead to stable and energy preserving stretching. The stretching model may be further improved by splitting stretched vorticles along the stretching directions, which would be closer to the physical phenomenon that spreads turbulence along stretched features. It may also be advantageous to vary the multipole expansion across scale for better control of the error. Additional stability may be achieved by integrating twists instead of velocity. Also, the model for buoyancy, which may play a key role in gas motion, is proposed for producing more lively smokes and pyroclastic effects. The methods may provide the full set of features expected from a gas simulation, and can be an important tool for making visual effects in computer graphic simulation.

K. Computer Systems

Figure 24:
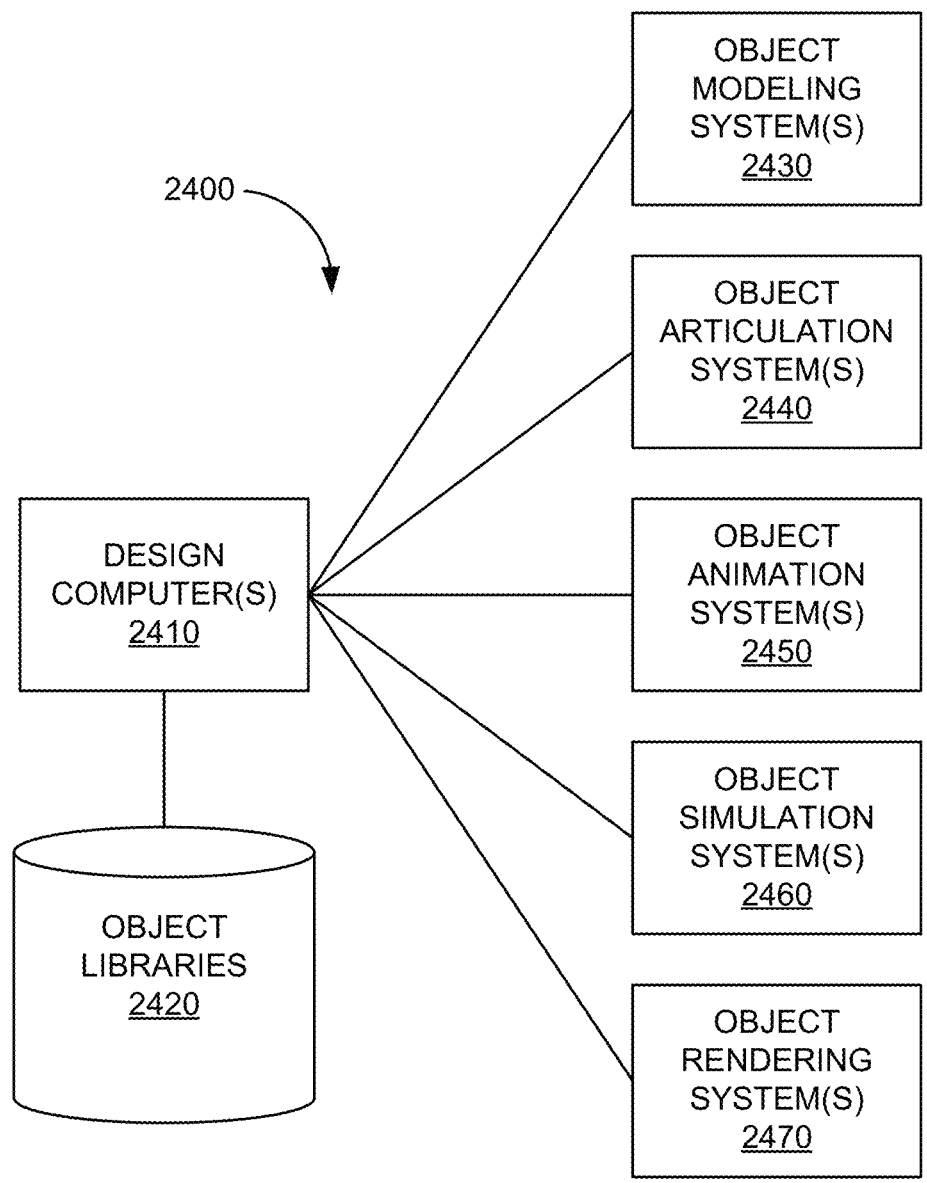
FIG. 24 is a simplified block diagram of a system for creating computer graphics imagery (CGI) and computer-aided animation that may implement or incorporate various embodiments of the present invention.

FIG. 24 is a simplified block diagram of system 2400 for creating computer graphics imagery (CGI) and computer-aided animation that may implement or incorporate various embodiments. In this example, system 2400 can include one or more design computers 2410, object library 2420, one or more object modeler systems 2430, one or more object articulation systems 2440, one or more object animation systems 2450, one or more object simulation systems 2460, and one or more object rendering systems 2470. Any of the systems 2430-870 may be invoked by or used directly by a user of the one or more design computers 2410 and/or automatically invoked by or used by one or more processes associated with the one or more design computers 2410. Any of the elements of system 2400 can include hardware and/or software elements configured for specific functions.

The one or more design computers 2410 can include hardware and software elements configured for designing CGI and assisting with computer-aided animation. Each of the one or more design computers 2410 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 2410 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 2410 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 2410 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 2410 acting as an animator may employ one or more systems or tools to specify motion and position of one or more objects over time to produce an animation.

Object library 2420 can include elements configured for storing and accessing information related to objects used by the one or more design computers 2410 during the various stages of a production process to produce CGI and animation. Some examples of object library 2420 can include a file, a database, or other storage devices and mechanisms. Object library 2420 may be locally accessible to the one or more design computers 2410 or hosted by one or more external computer systems.

Some examples of information stored in object library 2420 can include an object itself, metadata, object geometry, object topology, rigging, control data, animation data, animation cues, simulation data, texture data, lighting data, shader code, or the like. An object stored in object library 2420 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 2430 can include hardware and/or software elements configured for modeling one or more objects. Modeling can include the creating, sculpting, and editing of an object. In various embodiments, the one or more object modeling systems 2430 may be configured to generated a model to include a description of the shape of an object. The one or more object modeling systems 2430 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 2430 may further generate model data (e.g., 2D and 3D model data) for use by other elements of system 2400 or that can be stored in object library 2420. The one or more object modeling systems 2430 may be configured to allow a user to associate additional information, metadata, color, lighting, rigging, controls, or the like, with all or a portion of the generated model data.

The one or more object articulation systems 2440 can include hardware and/or software elements configured to articulating one or more computer-generated objects. Articulation can include the building or creation of rigs, the rigging of an object, and the editing of rigging. In various embodiments, the one or more articulation systems 2440 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 2440 may further generate articulation data (e.g., data associated with controls or animations variables) for use by other elements of system 2400 or that can be stored in object library 2420. The one or more object articulation systems 2440 may be configured to allow a user to associate additional information, metadata, color, lighting, rigging, controls, or the like, with all or a portion of the generated articulation data.

The one or more object animation systems 2450 can include hardware and/or software elements configured for animating one or more computer-generated objects. Animation can include the specification of motion and position of an object over time. The one or more object animation systems 2450 may be invoked by or used directly by a user of the one or more design computers 2410 and/or automatically invoked by or used by one or more processes associated with the one or more design computers 2410.

In various embodiments, the one or more animation systems 2450 may be configured to enable users to manipulate controls or animation variables or utilized character rigging to specify one or more key frames of animation sequence. The one or more animation systems 2450 generate intermediary frames based on the one or more key frames. In some embodiments, the one or more animation systems 2450 may be configured to enable users to specify animation cues, paths, or the like according to one or more predefined sequences. The one or more animation systems 2450 generate frames of the animation based on the animation cues or paths. In further embodiments, the one or more animation systems 2450 may be configured to enable users to define animations using one or more animation languages, morphs, deformations, or the like.

The one or more object animations systems 2450 may further generate animation data (e.g., inputs associated with controls or animations variables) for use by other elements of system 2400 or that can be stored in object library 2420. The one or more object animations systems 2450 may be configured to allow a user to associate additional information, metadata, color, lighting, rigging, controls, or the like, with all or a portion of the generated animation data.

The one or more object simulation systems 2460 can include hardware and/or software elements configured for simulating one or more computer-generated objects. Simulation can include determining motion and position of an object over time in response to one or more simulated forces or conditions. The one or more object simulation systems 2460 may be invoked by or used directly by a user of the one or more design computers 2410 and/or automatically invoked by or used by one or more processes associated with the one or more design computers 2410.

In various embodiments, the one or more object simulation systems 2460 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 2460 may be used to simulate the behavior of objects, such as hair, fur, and cloth, in response to a physics model and/or animation of one or more characters and objects within a computer-generated scene.

The one or more object simulation systems 2460 may further generate simulation data (e.g., motion and position of an object over time) for use by other elements of system 2400 or that can be stored in object library 2420. The generated simulation data may be combined with or used in addition to animation data generated by the one or more object animation systems 2450. The one or more object simulation systems 2460 may be configured to allow a user to associate additional information, metadata, color, lighting, rigging, controls, or the like, with all or a portion of the generated simulation data.

The one or more object rendering systems 2470 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 2470 may be invoked by or used directly by a user of the one or more design computers 2410 and/or automatically invoked by or used by one or more processes associated with the one or more design computers 2410. One example of a software program embodied as the one or more object rendering systems 2470 can include PhotoRealistic RenderMan, or PRMan, produced by Pixar Animations Studios of Emeryville, Calif.

In various embodiments, the one or more object rendering systems 2470 can be configured to render one or more objects to produce one or more computer-generated images or a set of images over time that provide an animation. The one or more object rendering systems 2470 may generate digital images or raster graphics images.

In various embodiments, a rendered image can be understood in terms of a number of visible features. Some examples of visible features that may be considered by the one or more object rendering systems 2470 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 2470 may further render images (e.g., motion and position of an object over time) for use by other elements of system 2400 or that can be stored in object library 2420. The one or more object rendering systems 2470 may be configured to allow a user to associate additional information or metadata with all or a portion of the rendered image.

Figure 25:
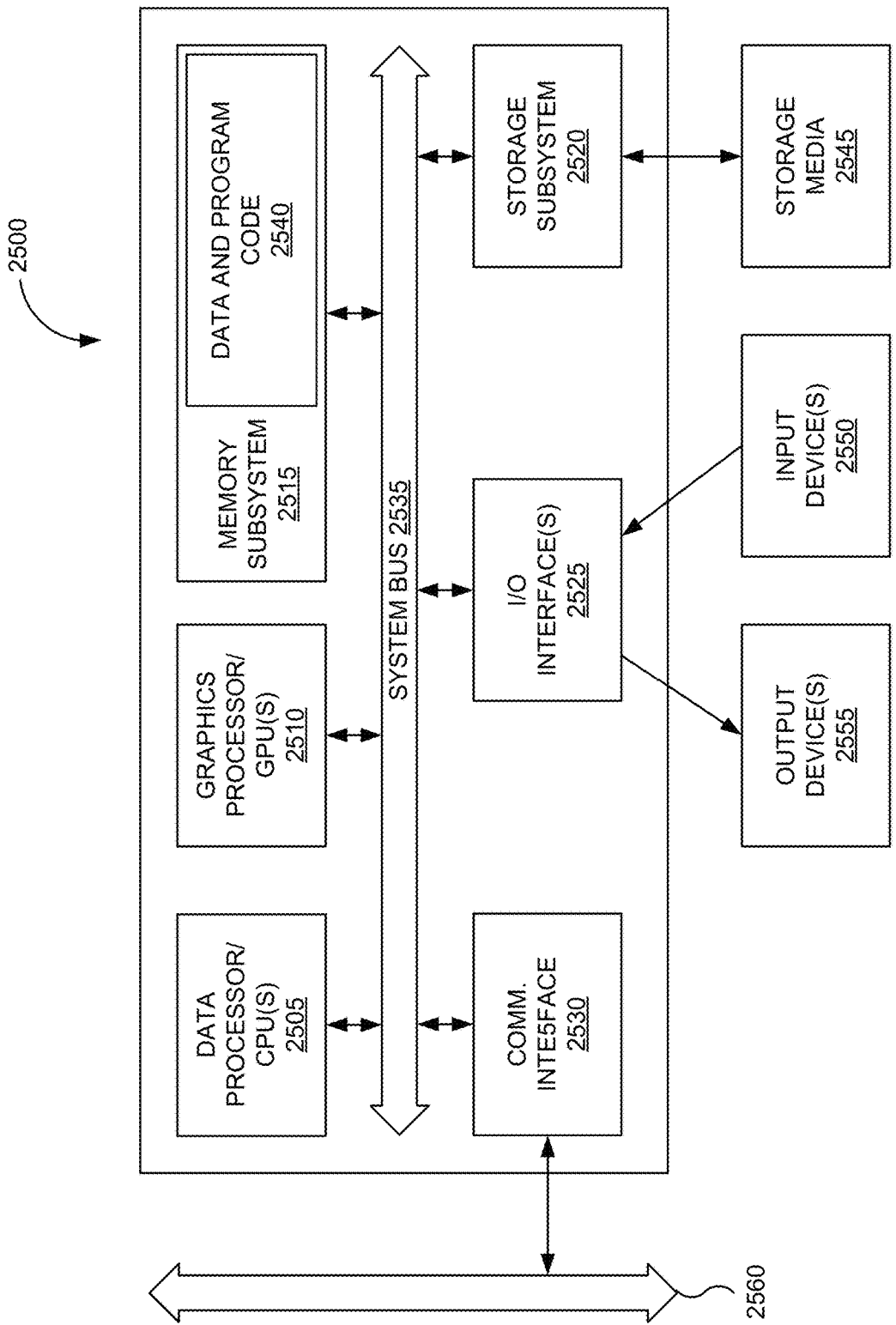
FIG. 25 is a block diagram of a computer system or information processing device that may incorporate an embodiment, be incorporated into an embodiment, or be used to practice any of the innovations, embodiments, and/or examples found within this disclosure.

FIG. 25 is a block diagram of computer system 2500. FIG. 25 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 2500 and any of its components or subsystems can include hardware and/or software elements configured for performing methods described herein.

Computer system 2500 may include familiar computer components, such as one or more one or more data processors or central processing units (CPUs) 2505, one or more graphics processors or graphical processing units (GPUs) 2510, memory subsystem 2515, storage subsystem 2520, one or more input/output (I/O) interfaces 2525, communications interface 2530, or the like. Computer system 2500 can include system bus 2535 interconnecting the above components and providing functionality, such connectivity and inter-device communication The one or more data processors or central processing units (CPUs) 2505 can execute logic or program code or for providing application-specific functionality. Some examples of CPU(s) 2505 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 2510 can execute logic or program code associated with graphics or for providing graphics-specific functionality. GPUs 2510 may include any conventional graphics processing unit, such as those provided by conventional video cards. In various embodiments, GPUs 2510 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 2510 may include any number of registers, logic units, arithmetic units, caches, memory interfaces, or the like.

Memory subsystem 2515 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 2515 can include data and program code 2540.

Storage subsystem 2520 can also store information using machine-readable articles, information storage devices, or computer-readable storage media. Storage subsystem 2520 may store information using storage media 2545. Some examples of storage media 2545 used by storage subsystem 2520 can include floppy disks, hard disks, optical storage media such as CD-ROMS, DVDs and bar codes, removable storage devices, networked storage devices, or the like. In some embodiments, all or part of data and program code 2540 may be stored using storage subsystem 2520.

The one or more input/output (I/O) interfaces 2525 can perform I/O operations. One or more input devices 2550 and/or one or more output devices 2555 may be communicatively coupled to the one or more I/O interfaces 2525. The one or more input devices 2550 can receive information from one or more sources for computer system 2500. Some examples of the one or more input devices 2550 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 2550 may allow a user of computer system 2500 to interact with one or more non-graphical or graphical user interfaces to enter a comment, select objects, icons, text, user interface widgets, or other user interface elements that appear on a monitor/display device via a command, a click of a button, or the like.

The one or more output devices 2555 can output information to one or more destinations for computer system 2500. Some examples of the one or more output devices 2555 can include a printer, a fax, a feedback device for a mouse or joystick, external storage systems, a monitor or other display device, a communications interface appropriately configured as a transceiver, or the like. The one or more output devices 2555 may allow a user of computer system 2500 to view objects, icons, text, user interface widgets, or other user interface elements. A display device or monitor may be used with computer system 2500 and can include hardware and/or software elements configured for displaying information.

Communications interface 2530 can perform communications operations, including sending and receiving data. Some examples of communications interface 2530 may include a network communications interface (e.g. Ethernet, Wi-Fi, etc.). For example, communications interface 2530 may be coupled to communications network/external bus 2560, such as a computer network, a USB hub, or the like. A computer system can include a plurality of the same components or subsystems, e.g., connected together by communications interface 2530 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 2500 may also include one or more applications (e.g., software components or functions) to be executed by a processor to execute, perform, or otherwise implement techniques disclosed herein. These applications may be embodied as data and program code 2540. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 2515 and/or storage subsystem 2520.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

L. References

Alexis Angelidis, Marie-Paule Cani, Geoff Wyvill, and Scott King. 2006a. Swirlingsweepers: constant volume modeling. *Graphical Models (GMOD)* 68, 4 (July 2006). Special issue on PG'04.

Alexis Angelidis, Fabrice Neyret, Karan Singh, and Derek Nowrouzezahrai. 2006b. A Controllable, Fast and Stable Basis for Vortex Based Smoke Simulation. In *Proceedings of the 2006 ACM SIGGRAPH/Eurographics Symposium on Computer Animation*. Eurographics Association, 25-32.

Rutherford Aris. 2012. *Vectors, Tensors and the Basic Equations of Fluid Mechanics*. Dover Publications.

J. Thomas Beale and Andrew Majda. 1982. Vortex methods I: Convergence in three dimensions. *Math. Comp.* 39 (July 1982), 1-27.

Tyson Brochu, Todd Keeler, and Robert Bridson. 2012. Linear-time Smoke Animation with Vortex Sheet Meshes. In *Proceedings of the ACM SIGGRAPH/Eurographics Symposium on Computer Animation*. Eurographics Association, 87-95.

Michael J. Carley. 2012. Analytical Formulae for Potential Integrals on Triangles. *Journal of Applied Mechanics* 80, 4 (October 2012).

Albert Chern, Felix Knoppel, Ulrich Pinkall, Peter Schroder, and Steffen Weißmann. 2016. Schrödinger's Smoke. *ACM Trans. Graph.* 35, 4, Article 77 (July 2016), 13 pages.

Georges-Henri. Cottet and Petros D. Koumoutsakos. 2000. *Vortex Methods: Theory and Practice*. Cambridge University Press.

Benoit Couet, Oscar Buneman, and Anthony Leonard. 1981. Simulation of three-dimensional incompressible flows with a vortex-in-cell method. *J. Comput. Phys.* 39 (February 1981), 305-328.

Tyler de Witt, Christian Lessig, and Eugene Fiume. 2012. Fluid Simulation Using Laplacian Eigenfunctions. *ACM Trans. Graph.* 31, 1, Article 10 (February 2012), 11 pages.

Sharif Elcott, Yiying Tong, Eva Kanso, Peter Schröder, and Mathieu Desbrun. 2007. Stable, Circulation-preserving, Simplicial Fluids. *ACM Trans. Graph.* 26, 1, Article 4 (January 2007), 12 pages.

Larry L. Erickson. 1990. *Panel methods: An introduction*. Technical Report. NASA Ames Research Center.

Nick Foster and Dimitris Metaxas. 1997. Modeling the Motion of a Hot, Turbulent Gas. In *Proceedings of the 24th Annual Conference on Computer Graphics and Interactive Techniques (SIGGRAPH '97)*. ACM Press/Addison-Wesley Publishing Co., 181-188.

Uriel Frisch and A. N. Kolmogorov. 1995. *Turbulence: The Legacy of Andrei N. Kolmogorov*. Cambridge University Press.

Robert A. Gingold and Joe J. Monaghan. 1977. Smoothed particle hydrodynamics—Theory and application to non-spherical stars. *Monthly Notices of the Royal Astronomical Society* 181 (November 1977), 375-389.

Leslie Greengard and Vladimir Rokhlin. 1987. A Fast Algorithm for Particle Simulations. *J. Comput. Phys.* 73, 2 (December 1987), 325-348.

Doyub Kim, Seung Woo Lee, Oh-Young Song, and Ko Hyeong-Seok. 2012. Baroclinic Turbulence with Varying Density and Temperature. *IEEE Transactions on Visualization and Computer Graphics* 18 (2012), 1488-1495.

Theodore Kim, Nils Thürey, Doug James, and Markus Gross. 2008. Wavelet Turbulence for Fluid Simulation. *ACM Trans. Graph.* 27, 3, Article 50 (August 2008), 6 pages.

Ken Museth. 2013. VDB: High-resolution Sparse Volumes with Dynamic Topology. *ACM Trans. Graph.* 32, 3 (July 2013).

Sang Il Park and Myoung Jun Kim. 2005. Vortex Fluid for Gaseous Phenomena. In *Proceedings of the 2005 ACM SIGGRAPH/Eurographics Symposium on Computer Animation (SCA '05)*. ACM, 261-270.

Tobias Pfaff, Nils Thuerey, and Markus Gross. 2012. Lagrangian Vortex Sheets for Animating Fluids. *ACM Trans. Graph.* 31, 4, Article 112 (July 2012), 8 pages.

Tobias Pfaff, Nils Thuerey, Andrew Selle, and Markus Gross. 2009. Synthetic Turbulence Using Artificial Boundary Layers. *ACM Trans. Graph.* 28, 5, Article 121 (December 2009), 10 pages.

Andrew Selle, Nick Rasmussen, and Ronald Fedkiw. 2005. A Vortex Particle Method for Smoke, Water and Explosions. In *ACM SIGGRAPH 2005 Papers (SIGGRAPH '05)*. ACM, 910-914.

Tarun Kumar Sheel. 2011. Acceleration of Vortex Methods Calculation Using FMM and MDGRAPE-3. *Progress In Electromagnetics Research B* 27 (2011), 327-348.

SideFX. 2016. Houdini 15.5. (May 2016). https://www.sidefx.com

Jos Stam. 1999. Stable Fluids. In *Proceedings of the 26th Annual Conference on Computer Graphics and Interactive Techniques (SIGGRAPH '99)*. ACM Press/Addison-Wesley Publishing Co., 121-128.

Adriaan van Oosterom. 2011. Closed-form analytical expressions for the potential fields generated by triangular monolayers with linearly distributed source strength. *Medical & Biological Engineering & Computing (MBEC)* 50, 1 (October 2011), 1-9.

Adriaan van Oosterom and Jan Strackee. 1983. The solid angle of a plane triangle (*IEEE Transactions on Biomedial Engineering*), Vol. 30. IEEE, 125-126.

SteffenWeissmann and Ulrich Pinkall. 2010. Filament-based Smoke with Vortex Shedding and Variational Reconnection. *ACM Trans. Graph.* 29, 4, Article 115 (July 2010), 12 pages.

Magnus Wrenninge. 2016. Efficient Rendering of Volumetric Motion Blur Using Temporally Unstructured Volumes. *Journal of Computer Graphics Techniques (JCGT)* 5, 1 (January 2016).

Lexing Ying. 2012. A pedestrian introduction to fast multipole methods. *Science China Mathematics* 55, 5 (2012), 1043-1051.

Xinxin Zhang and Robert Bridson. 2014. A PPPM Fast Summation Method for Fluids and Beyond. *ACM Trans. Graph.* 33, 6 (November 2014).

APPENDIX 1

Nomenclature

| | | | |
|---|---|---|---|
| $t$ | time | $\Delta_t$ | time step |
| $p$ | position | $p_i$ | vorticle center |
| $\vec{u}$ | velocity field | $\vec{h}$ | harmonic field |
| $\vec{\psi}$ | stream field | $\vec{\psi}_i$ | vorticle stream field |
| $\vec{v}$ | advected field | $\vec{v}_i$ | vorticle velocity field |
| $\vec{\omega}$ | vorticity field | $\vec{\omega}_i$ | vorticle vorticity field |
| $\vec{w}_i$ | vorticle strength | $r_i$ | vorticle size |
| $s_i$ | vorticle stretching factor | $E_i$ | vorticle mean energy |
| $\Omega_i$ | vorticle enstrophy | $\rho$ | density field |
| $\rho_A$ | ambient density field | $\rho_j$ | particle density field |
| $m_j$ | particle density multiplier | $\vec{s}$ | solid objects velocity |
| $\vec{f}$ | solid objects acceleration | $v$ | kinematic viscosity |
| $\vec{g}$ | gravity | $\vec{e}$ | user external forces |
| $Y_{lm}$ | real spherical harmonics | $P_{lm}$ | Legendre polynomial |
| $\bar{\mu}_{lmn}$ | far vector coefficient | $\bar{\kappa}_{lmn}$ | near vector coefficient |
| $\mu_{lmn}$ | far scalar coefficient | $\kappa_{lmn}$ | near scalar coefficient |
| $y_{lm}$ | spherical coefficient | $b_{ln}$ | radial coefficient |

-continued

| | | | |
|---|---|---|---|
| $\delta\Omega$ | boundary surface | $\delta\Omega_j$ | triangle surface |
| $\sigma_j$ | source coefficient | $\mu_j$ | doublet coefficient |
| $S_j$ | source field | $D_j$ | doublet field |

APPENDIX 2

Field Basis Functions

The first few basis functions are of the form $\|p\|^n (n\vec{a}_{lm} + \vec{b}_{lm})$, and are given in Cartesian coordinates:

$$\nabla(Y_{0,0}(p)\|p\|^n) = \frac{\|p\|^n}{\|p\|^2}\sqrt{\frac{1}{4\pi}}(np)$$

$$\nabla(Y_{1,-1}(p)\|p\|^n) = \frac{\|p\|^n}{\|p\|^3}\sqrt{\frac{3}{4\pi}}(-np_y p + p_y p - \|p\|^2\vec{y})$$

$$\nabla(Y_{1,0}(p)\|p\|^n) = \frac{\|p\|^n}{\|p\|^3}\sqrt{\frac{3}{4\pi}}(np_z p - p_z p + \|p\|^2\vec{z})$$

$$\nabla(Y_{1,1}(p)\|p\|^n) = \frac{\|p\|^n}{\|p\|^3}\sqrt{\frac{3}{4\pi}}(-np_x p + p_x p - \|p\|^2\vec{x})$$

$$\nabla(Y_{2,-2}(p)\|p\|^n) = \frac{\|p\|^n}{\|p\|^4}\sqrt{\frac{15}{4\pi}}(np_x p_y p + \|p\|^2(p_y\vec{x} + p_x\vec{y}) - 2p_x p_y p)$$

$$\nabla(Y_{2,-1}(p)\|p\|^n) = \frac{\|p\|^n}{\|p\|^4}\sqrt{\frac{15}{4\pi}}(-np_y p_z p + 2p_y p_z p - \|p\|^2(p_z\vec{y} + p_y\vec{z}))$$

$$\nabla(Y_{2,0}(p)\|p\|^n) = \frac{\|p\|^n}{\|p\|^4}\sqrt{\frac{5}{16\pi}}(-n(3p_z^2 - \|p\|^2)p + 6p_z(p_z p - \|p\|^2\vec{z}))$$

$$\nabla(Y_{2,1}(p)\|p\|^n) = \frac{\|p\|^n}{\|p\|^4}\sqrt{\frac{15}{4\pi}}(np_z p_x p + \|p\|^2(p_x\vec{z} + p_z\vec{x}) - 2p_z p_x p)$$

$$\nabla(Y_{2,2}(p)\|p\|^n) = \frac{\|p\|^n}{\|p\|^4}\sqrt{\frac{15}{4\pi}}\left(n\frac{p_x^2 - p_y^2}{2}p + \|p\|^2(p_x\vec{x} - p_z\vec{y}) + (p_y^2 - p_x^2)p\right)$$

APPENDIX 3

First Vorticle to Far Coefficient

The far radial coefficients $b_{ln}$ multiply the radial part of the basis:

$$B_l = \sum_{n=1}^{\infty} b_{ln}\frac{1}{r^n} \quad (49)$$

For a cell centered a c, and $d_i = \|p_i - c\|$, the first few far radial coefficients $b_{ln}$ are:

$$B_0(r, d_i) = \frac{1}{r} - \frac{r_i^2}{2r^3} + \frac{-4d_i^2 r_i^2 + 3r_i^4}{8r^5} + O\left(\frac{1}{r^7}\right) \quad (50)$$

$$B_1(r, d_i) = \frac{d_i}{r^2} - \frac{3d_i r_i^2}{2r^4} - \frac{3d_i(4d_i^2 r_i^2 - 5r_i^4)}{8r^6} + O\left(\frac{1}{r^7}\right)$$

$$B_2(r, d_i) = \frac{d_i^2}{r^3} - \frac{5d_i^2 r_i^2}{2r^5} + O\left(\frac{1}{r^7}\right)$$

The first few spherical coefficients are:

$$y_{0,0} = \sqrt{4\pi} \quad (51)$$

$$y_{1,-1} = -\sqrt{\frac{4\pi}{3}}\frac{p_{iy}}{\|p_i\|}$$

$$y_{1,0} = \sqrt{\frac{4\pi}{3}}\frac{p_{iz}}{\|p_i\|}$$

$$y_{1,1} = -\sqrt{\frac{4\pi}{3}}\frac{p_{ix}}{\|p_i\|}$$

$$y_{2,-2} = \sqrt{\frac{12\pi}{5}}\frac{p_{ix}p_{iy}}{\|p_i\|^2}$$

$$y_{2,-1} = -\sqrt{\frac{12\pi}{5}}\frac{p_{iy}p_{iz}}{\|p_i\|^2}$$

$$y_{2,0} = -\sqrt{\frac{\pi}{5}}\left(1 - 3\frac{p_{iz}^2}{\|p_i\|^2}\right)$$

$$y_{2,1} = -\sqrt{\frac{12\pi}{5}}\frac{p_{ix}p_{iz}}{\|p_i\|^2}$$

$$y_{2,2} = \sqrt{\frac{3\pi}{5}}\frac{(p_{ix}^2 - p_{iy}^2)}{\|p_i\|^2}$$

APPENDIX 4

First Far Coefficient Translation
The first few coefficients:

$$\vec{\mu}'_{0,0,1} = \vec{\mu}_{0,0,1}$$

$$\vec{\mu}'_{0,0,2} = 0$$

$$\vec{\mu}'_{0,0,3} = \vec{\mu}_{0,0,3}$$

$$\vec{\mu}'_{1,-1,1} = 0$$

$$\vec{\mu}'_{1,-1,2} = \vec{\mu}_{1,-1,2} + \sqrt{\frac{1}{3}}c_y\vec{\mu}_{0,0,1}$$

$$\vec{\mu}'_{1,-1,3} = 0$$

$$\vec{\mu}'_{1,0,1} = 0$$

$$\vec{\mu}'_{1,0,2} = \vec{\mu}'_{1,0,2} - \sqrt{\frac{1}{3}}c_z\vec{\mu}_{0,0,1}$$

$$\vec{\mu}'_{1,0,3} = 0$$

$$\vec{\mu}'_{1,1,1} = 0$$

$$\vec{\mu}'_{1,1,2} = \vec{\mu}_{1,1,2} + \sqrt{\frac{1}{3}}c_x\vec{\mu}_{0,0,1}$$

$$\vec{\mu}'_{1,1,3} = 0$$

$$\vec{\mu}'_{2,-2,1} = 0$$

$$\vec{\mu}'_{2,-2,2} = 0$$

$$\vec{\mu}'_{2,-2,3} = \vec{\mu}'_{2,-2,3} + \sqrt{\frac{3}{5}}c_x c_y\vec{\mu}_{0,0,1} + \sqrt{\frac{9}{5}}c_x\vec{\mu}_{1,-1,2} + \sqrt{\frac{9}{5}}c_y\vec{\mu}_{1,1,2}$$

$$\vec{\mu}'_{2,-1,1} = 0$$

$$\vec{\mu}'_{2,-1,2} = 0$$

$$\vec{\mu}'_{2,-1,3} = \vec{\mu}'_{2,-1,3} - \sqrt{\frac{3}{5}}c_y c_z\vec{\mu}_{0,0,1} - \sqrt{\frac{9}{5}}c_z\vec{\mu}_{1,-1,2} + \sqrt{\frac{9}{5}}c_y\vec{\mu}_{1,0,2}$$

-continued $$\vec{\mu}'_{2,0,1} = 0$$

$$\vec{\mu}'_{2,0,2} = 0$$

$$\vec{\mu}'_{2,0,3} = \vec{\mu}'_{2,0,3} - \sqrt{\frac{1}{20}}(c_x^2 + c_y^2 - 2c_z^2)\vec{\mu}_{0,0,1} -$$

$$\sqrt{\frac{3}{5}} c_y \vec{\mu}_{1,-1,2} - \sqrt{\frac{12}{5}} c_z \vec{\mu}_{1,0,2} - \sqrt{\frac{3}{5}} c_x \vec{\mu}_{1,1,2}$$

$$\vec{\mu}'_{2,1,1} = 0$$

$$\vec{\mu}'_{2,1,2} = 0$$

$$\vec{\mu}'_{2,1,3} = \vec{\mu}_{2,1,3} - \sqrt{\frac{3}{5}} c_x c_z \vec{\mu}_{0,0,1} + \sqrt{\frac{9}{5}} c_x \vec{\mu}_{1,0,2} - \sqrt{\frac{9}{5}} c_z \vec{\mu}_{1,1,2}$$

$$\vec{\mu}'_{2,2,1} = 0$$

$$\vec{\mu}'_{2,2,2} = 0$$

$$\vec{\mu}'_{2,2,3} = \vec{\mu}'_{2,2,3} + \sqrt{\frac{3}{20}}(c_x^2 - c_y^2)\vec{\mu}_{0,0,1} - \sqrt{\frac{9}{5}} c_y \vec{\mu}_{1,-1,2} + \sqrt{\frac{9}{5}} c_x \vec{\mu}_{1,1,2}$$

APPENDIX 5

First Far to Near Coefficient Transformation

The coefficients transforms simplify, and are precomputed and stored before running the simulation. This optimization is worth it since there is at most 189 far interacting cells.

$$\vec{\kappa}'_{0,0,0} = \frac{1}{\|c\|}\vec{\mu}_{0,0,1} + \frac{1}{\|c\|^3}\vec{\mu}_{0,0,3} - \sqrt{3}\frac{c_y}{\|c\|^3}\vec{\mu}_{1,-1,2} + \sqrt{3}\frac{c_z}{\|c\|^3}\vec{\mu}_{1,0,2} -$$

$$\sqrt{3}\frac{c_x}{\|c\|^3}\vec{\mu}_{1,1,2} - \sqrt{\frac{5}{4}}\frac{\|c\|^2 - 3c_z^2}{\|c\|^5}\vec{\mu}_{2,0,3} + \sqrt{15}\frac{c_x c_y}{\|c\|^5}\vec{\mu}_{2,-2,3} -$$

$$\sqrt{15}\frac{c_y c_z}{\|c\|^5}\vec{\mu}_{2,-1,3} - \sqrt{15}\frac{c_x c_z}{\|c\|^5}\vec{\mu}_{2,1,3} + \sqrt{\frac{15}{4}}\frac{c_x^2 - c_y^2}{\|c\|^5}\vec{\mu}_{2,2,3}$$

$$\vec{\kappa}'_{0,0,1} = 0$$

$$\vec{\kappa}'_{0,0,2} = \frac{1}{\|c\|^5}\vec{\mu}_{0,0,3}$$

$$\vec{\kappa}'_{0,0,3} = 0$$

$$\vec{\kappa}'_{1,-1,0} = 0$$

$$\vec{\kappa}'_{1,-1,1} = \sqrt{\frac{1}{3}}\frac{c_y}{\|c\|^3}\vec{\mu}_{0,0,1} + \sqrt{3}\frac{c_y}{\|c\|^5}\vec{\mu}_{0,0,3} + \frac{\|c\|^2 - 3c_y^2}{\|c\|^5}\vec{\mu}_{1,-1,2} +$$

$$3\frac{c_y c_z}{\|c\|^5}\vec{\mu}_{1,0,2} - 3\frac{c_x c_y}{\|c\|^5}\vec{\mu}_{1,1,2} - \sqrt{5}\frac{c_x(\|c\|^2 - 5c_y^2)}{\|c\|^7}\vec{\mu}_{2,-2,3} +$$

$$\sqrt{5}\frac{c_z(\|c\|^2 - 5c_y^2)}{\|c\|^7}\vec{\mu}_{2,-1,3} - \sqrt{\frac{15}{4}}\frac{c_y(\|c\|^2 - 5c_z^2)}{\|c\|^7}\vec{\mu}_{2,0,3} -$$

$$\sqrt{125}\frac{c_x c_y c_z}{\|c\|^7}\vec{\mu}_{2,1,3} + \sqrt{\frac{5}{4}}\frac{c_y(2\|c\|^2 + 5(c_x^2 - c_y^2))}{\|c\|^7}\vec{\mu}_{2,2,3}$$

$$\vec{\kappa}'_{1,-1,2} = 0$$

$$\vec{\kappa}'_{1,-1,3} = \sqrt{3}\frac{c_y}{\|c\|^7}\vec{\mu}_{0,0,3}$$

$$\vec{\kappa}'_{1,0,0} = 0$$

$$\vec{\kappa}'_{1,0,1} = -\sqrt{\frac{1}{3}}\frac{c_z}{\|c\|^3}\vec{\mu}_{0,0,1} - \sqrt{3}\frac{c_z}{\|c\|^5}\vec{\mu}_{0,0,3} + 3\frac{c_y c_z}{\|c\|^5}\vec{\mu}_{1,-1,2} +$$

$$\frac{\|c\|^2 - 3c_z^2}{\|c\|^5}\vec{\mu}_{1,0,2} + 3\frac{c_x c_z}{\|c\|^5}\vec{\mu}_{1,1,2} - \sqrt{125}\frac{c_x c_y c_z}{\|c\|^7}\vec{\mu}_{2,-2,3} -$$

$$\sqrt{5}\frac{c_y(\|c\|^2 - 5c_z^2)}{\|c\|^7}\vec{\mu}_{2,-1,3} + \sqrt{\frac{15}{4}}\frac{c_z(3\|c\|^2 - 5c_z^2)}{\|c\|^7}\vec{\mu}_{2,0,3} -$$

$$\sqrt{5}\frac{c_x(\|c\|^2 - 5c_z^2)}{\|c\|^7}\vec{\mu}_{2,1,3} - \sqrt{\frac{125}{4}}\frac{c_z(c_x^2 - c_y^2)}{\|c\|^7}\vec{\mu}_{2,2,3}$$

$$\vec{\kappa}'_{1,0,2} = 0$$

$$\vec{\kappa}'_{1,0,3} = -\sqrt{3}\frac{c_z}{\|c\|^7}\vec{\mu}_{0,0,3}$$

$$\vec{\kappa}'_{1,1,0} = 0$$

$$\vec{\kappa}'_{1,1,1} = -\sqrt{\frac{1}{3}}\frac{c_x}{\|c\|^3}\vec{\mu}_{0,0,1} + \sqrt{3}\frac{c_x}{\|c\|^5}\vec{\mu}_{0,0,3} - 3\frac{c_x c_z}{\|c\|^5}\vec{\mu}_{1,-1,2} +$$

$$3\frac{c_x c_z}{\|c\|^5}\vec{\mu}_{1,0,2} + \frac{\|c\|^2 - 3c_x^2}{\|c\|^5}\vec{\mu}_{1,1,2} - \sqrt{5}\frac{c_y(\|c\|^2 - 5c_x^2)}{\|c\|^7}\vec{\mu}_{2,-2,3} -$$

$$\sqrt{125}\frac{c_x c_y c_z}{\|c\|^7}\vec{\mu}_{2,-1,3} - \sqrt{\frac{15}{4}}\frac{c_x(\|c\|^2 - 5c_z^2)}{\|c\|^7}\vec{\mu}_{2,0,3} +$$

$$\sqrt{5}\frac{c_z(\|c\|^2 - 5c_x^2)}{\|c\|^7}\vec{\mu}_{2,1,3} + \sqrt{\frac{5}{4}}\frac{c_x(-2\|c\|^2 + 5(c_x^2 - c_y^2))}{\|c\|^7}\vec{\mu}_{2,2,3}$$

$$\vec{\kappa}'_{1,1,2} = 0$$

$$\vec{\kappa}'_{1,1,3} = \sqrt{3}\frac{c_x}{\|c\|^7}\vec{\mu}_{0,0,3}$$

$$\vec{k}_{2,-2,0} = 0$$

$$\vec{k}_{2,-2,1} = 0$$

$$\vec{k}_{2,-2,2} = \sqrt{\frac{3}{5}}\frac{c_x c_y}{\|c\|^5}\vec{\mu}_{0,0,1} + \sqrt{15}\frac{c_x c_y}{\|c\|^7}\vec{\mu}_{0,0,3} +$$

$$\sqrt{\frac{9}{5}}\frac{c_x(\|c\|^2 - 5c_y^2)}{\|c\|^7}\vec{\mu}_{1,-1,2} + \sqrt{45}\frac{c_x c_y c_z}{\|c\|^7}\vec{\mu}_{1,0,2} +$$

$$\sqrt{\frac{9}{5}}\frac{c_y(\|c\|^2 - 5c_x^2)}{\|c\|^7}\vec{\mu}_{1,1,2} + \frac{-4\|c\|^4 + 5c_z^2\|c\|^2 + 35c_x^2 c_y^2}{\|c\|^9}\vec{\mu}_{2,-2,3} +$$

$$5\frac{c_x c_z(\|c\|^2 - 7c_y^2)}{\|c\|^9}\vec{\mu}_{2,-1,3}\sqrt{\frac{75}{4}}\frac{c_x c_y(\|c\|^2 - 7c_z^2)}{\|c\|^9}\vec{\mu}_{2,0,3} +$$

$$5\frac{c_y c_z(\|c\|^2 - 7c_x^2)}{\|c\|^9}\vec{\mu}_{2,1,3} + \frac{35}{2}\frac{c_x c_y(c_x^2 - c_y^2)}{\|c\|^9}\vec{\mu}_{2,2,3}$$

$$\vec{k}_{2,-2,3} = 0$$

$$\vec{k}_{2,-1,0} = 0$$

$$\vec{k}_{2,-1,1} = 0$$

$$\vec{k}_{2,-1,2} = \sqrt{\frac{3}{5}}\frac{c_y c_z}{\|c\|^5}\vec{\mu}_{0,0,1} - \sqrt{15}\frac{c_y c_z}{/\|c\|^7}\vec{\mu}_{0,0,3} -$$

$$\sqrt{\frac{9}{5}}\frac{c_z(\|c\|^2 - 5c_y^2)}{\|c\|^7}\vec{\mu}_{1,-1,2} + \sqrt{\frac{9}{5}}\frac{c_y(\|c\|^2 - 5c_z^2)}{\|c\|^7}\vec{\mu}_{1,0,2} +$$

$$\sqrt{45}\frac{c_x c_y c_z}{\|c\|^7}\vec{\mu}_{1,1,2} + 5\frac{c_x c_z(\|c\|^2 - 7c_y^2)}{\|c\|^9}\vec{\mu}_{2,-2,3} +$$

$$\frac{-4\|c\|^4 + 5c_x^2\|c\|^2 + 35c_y^2 c_z^2}{\|c\|^9}\vec{\mu}_{2,-1,3}\sqrt{\frac{75}{4}}\frac{c_y c_z(3\|c\|^2 - 7c_z^2)}{\|c\|^9}\vec{\mu}_{2,1,3} -$$

$$5\frac{c_x c_y(\|c\|^2 - 7c_z^2)}{\|c\|^9}\vec{\mu}_{2,-1,3}\frac{5}{2}\frac{c_y c_z(-2\|c\|^2 - 7(c_x^2 - c_y^2))}{\|c\|^9}\vec{\mu}_{2,-2,3}$$

$$\vec{k}_{2,-1,3} = 0$$

$$\vec{k}_{2,0,0} = 0$$

-continued $$\vec{k}_{2,0,1} = 0$$

$$\vec{k}'_{2,0,2} = -\sqrt{\frac{1}{20}} \frac{\|c\|^2 - 3c_z^2}{\|c\|^5} \vec{\mu}_{0,0,1} - \sqrt{\frac{5}{4}} \frac{\|c\|^2 - 3c_z^2}{\|c\|^7} \vec{\mu}_{0,0,3} +$$

$$\sqrt{\frac{27}{20}} \frac{c_y(\|c\|^2 - 5c_z^2)}{\|c\|^7} \vec{\mu}_{1,-1,2} + \sqrt{\frac{27}{20}} \frac{c_z(-3\|c\|^2 + 5c_z^2)}{\|c\|^7} \vec{\mu}_{1,0,2} +$$

$$\sqrt{\frac{27}{20}} \frac{c_x(\|c\|^2 - 5c_z^2)}{\|c\|^7} \vec{\mu}_{1,1,2} - \sqrt{\frac{75}{4}} \frac{c_x c_y(\|c\|^2 - 7c_z^2)}{\|c\|^9} \vec{\mu}_{2,-2,3} +$$

$$\sqrt{\frac{75}{4}} \frac{c_y c_z(3\|c\|^2 - 7c_z^2)}{\|c\|^9} \vec{\mu}_{2,-1,3} \frac{3}{4} \frac{3\|c\|^4 - 30\|c\|^2 c_z^2 + 35 c_z^4}{\|c\|^9} \vec{\mu}_{2,0,3} +$$

$$\sqrt{\frac{75}{4}} \frac{c_x c_z(3\|c\|^2 - 7c_z^2)}{\|c\|^9} \vec{\mu}_{2,1,3} - \sqrt{\frac{75}{16}} \frac{(c_x^2 - c_y^2)(\|c\|^2 - 7c_z^2)}{\|c\|^9} \vec{\mu}_{2,2,3}$$

$$\vec{k}'_{2,0,3} = 0$$
$$\vec{k}'_{2,1,0} = 0$$
$$\vec{k}'_{2,1,1} = 0$$

$$\vec{k}'_{2,1,2} = -\sqrt{\frac{3}{5}} \frac{c_x c_z}{\|c\|^5} \vec{\mu}_{0,0,1} - \sqrt{15} \frac{c_x c_z}{\|c\|^7} \vec{\mu}_{0,0,3} +$$

$$\sqrt{45} \frac{c_x c_y c_z}{\|c\|^7} \vec{\mu}_{1,-1,2} + \sqrt{\frac{9}{5}} \frac{c_x(\|c\|^2 - 5c_z^2)}{\|c\|^7} \vec{\mu}_{1,0,2} -$$

$$\sqrt{\frac{9}{5}} \frac{c_z(\|c\|^2 - 5c_x^2)}{\|c\|^7} \vec{\mu}_{1,1,2} + 5 \frac{c_y c_z(\|c\|^2 - 7c_x^2)}{\|c\|^9} \vec{\mu}_{2,-2,3} -$$

$$5 \frac{c_x c_y(\|c\|^2 - 7c_z^2)}{\|c\|^9} \vec{\mu}_{2,-1,3} + \sqrt{\frac{75}{4}} \frac{c_x c_z(3\|c\|^2 - 7c_z^2)}{\|c\|^9} \vec{\mu}_{2,0,3} +$$

$$\frac{-4\|c\|^4 + 5(c_y^2\|c\|^2 + 7c_x^2 c_z^2)}{\|c\|^9} \vec{\mu}_{2,1,3} + \frac{5}{2} \frac{c_x c_z(2\|c\|^2 - 7(c_x^2 - c_y^2))}{\|c\|^9} \vec{\mu}_{2,2,3}$$

$$\vec{k}_{2,-1,3} = 0$$
$$\vec{k}_{2,2,0} = 0$$
$$\vec{k}_{2,2,1} = 0$$

$$\vec{k}'_{2,2,2} = \sqrt{\frac{3}{20}} \frac{c_x^2 - c_y^2}{\|c\|^5} \vec{\mu}_{0,0,1} +$$

$$\sqrt{\frac{15}{4}} \frac{c_x^2 - c_y^2}{\|c\|^7} \vec{\mu}_{0,0,3} + \sqrt{\frac{9}{20}} \frac{c_y(-2\|c\|^2 - 5(c_x^2 - c_y^2))}{\|c\|^7} \vec{\mu}_{1,-1,2} +$$

$$\sqrt{\frac{45}{4}} \frac{(c_x^2 - c_y^2)c_z}{\|c\|^7} \vec{\mu}_{1,0,2} + \sqrt{\frac{9}{20}} \frac{c_x(2\|c\|^2 - 5(c_x^2 - c_y^2))}{\|c\|^7} \vec{\mu}_{1,1,2} +$$

$$\frac{35}{2} \frac{c_x c_y(c_x^2 - c_y^2)}{\|c\|^9} \vec{\mu}_{2,-2,3} + \frac{5}{2} \frac{c_y c_x(-2\|c\|^2 - 7(c_x^2 - c_y^2))}{\|c\|^9} \vec{\mu}_{2,-1,3} -$$

$$\sqrt{\frac{75}{16}} \frac{(c_x^2 - c_y^2)(\|c\|^2 - 7c_z^2)}{\|c\|^9} \vec{\mu}_{2,0,3} + \frac{5}{2} \frac{x c_z(-2\|c\|^2 - 7(c_x^2 - c_y^2))}{\|c\|^9} \vec{\mu}_{2,1,3} +$$

$$\frac{1}{4} \frac{19\|c\|^4 - 50\|c\|^2 c_x^2 c_y^2 + 35(c_z^4)}{\|c\|^9} \vec{\mu}_{2,2,3}$$

$$\vec{k}'_{2,2,3} = 0$$

APPENDIX 6

First Near Coefficient Translation
The coefficients simplify, and the first few are:

$$\vec{k}'_{0,0,0} = \vec{k}_{0,0,0} + \|c\|^2 \vec{k}_{0,0,2} - \sqrt{3} c_y \vec{k}_{1,-1,1} -$$

$$\sqrt{3} c_y \|c\|^2 \vec{k}_{1,-1,3} + \sqrt{3} c_z \vec{k}_{1,0,1} + \sqrt{3} c_z \|c\|^2 \vec{k}_{1,0,3} - \sqrt{3} c_x \vec{k}_{1,1,1} -$$

$$\sqrt{3} c_x \|c\|^2 \vec{k}_{1,1,3} + \sqrt{15} c_x c_y \vec{k}_{2,-2,2} - \sqrt{15} c_y c_z \vec{k}_{2,-1,2} -$$

$$\sqrt{\frac{5}{4}} (\|c\|^2 - 3c_z^2) \vec{k}_{2,0,2} - \sqrt{15} c_x c_z \vec{k}_{2,1,2} + \sqrt{\frac{15}{4}} (c_x^2 - c_y^2) \vec{k}_{2,2,2}$$

$$\vec{k}'_{0,0,1} = 0$$

$$\vec{k}'_{0,0,2} = \vec{k}_{0,0,2} - \sqrt{\frac{25}{3}} c_y \vec{k}_{1,-1,3} + \sqrt{\frac{25}{3}} c_z \vec{k}_{1,0,3} - \sqrt{\frac{25}{3}} c_x \vec{k}_{1,1,3}$$

$$\vec{k}'_{0,0,3} = 0$$

$$\vec{k}'_{1,-1,0} = 0$$

$$\vec{k}'_{1,-1,1} = -\sqrt{\frac{4}{3}} c_y \vec{k}_{0,0,2} + \vec{k}_{1,-1,1} + (\|c\|^2 + 2c_y^2) \vec{k}_{1,-1,3} - 2 c_y c_z \vec{k}_{1,0,3} +$$

$$2 c_x c_y \vec{k}_{1,1,3} - \sqrt{5} c_x \vec{k}_{2,-2,2} + \sqrt{5} c_z \vec{k}_{2,-1,2} + \sqrt{\frac{5}{3}} c_y \vec{k}'_{2,0,2} + \sqrt{5} c_y \vec{k}_{2,2,2}$$

$$\vec{k}'_{1,-1,2} = 0$$
$$\vec{k}'_{1,-1,3} = \vec{k}_{1,-1,3}$$
$$\vec{k}'_{1,0,0} = 0$$

$$\vec{k}'_{1,0,1} = \sqrt{\frac{4}{3}} c_z \vec{k}_{0,0,2} - 2 c_y c_z \vec{k}_{1,-1,3} + \vec{k}_{1,0,1} + (\|c\|^2 + 2c_z^2) \vec{k}_{1,0,3} -$$

$$2 c_x c_z \vec{k}_{1,1,3} - \sqrt{5} c_y \vec{k}_{2,-1,2} + \sqrt{\frac{20}{3}} c_z \vec{k}_{2,0,2} - \sqrt{5} c_x \vec{k}_{2,1,2}$$

$$\vec{k}'_{1,0,2} = 0$$
$$\vec{k}'_{1,0,3} = \vec{k}_{1,0,3}$$
$$\vec{k}'_{1,1,0} = 0$$

$$\vec{k}'_{1,1,1} =$$

$$-\sqrt{\frac{4}{3}} c_x \vec{k}_{0,0,2} + 2 c_x c_y \vec{k}_{1,-1,3} - 2 c_x c_z \vec{k}_{1,0,3} + \vec{k}_{1,1,1} + (\|c\|^2 + 2c_x^2) \vec{k}_{1,1,3} -$$

$$\sqrt{5} c_y \vec{k}_{2,-2,2} + \sqrt{\frac{5}{3}} c_x \vec{k}_{2,0,2} + \sqrt{5} c_z \vec{k}_{2,1,2} - \sqrt{5} c_x \vec{k}_{2,2,2}$$

$$\vec{k}'_{1,1,2} = 0$$
$$\vec{k}'_{1,1,3} = \vec{k}_{1,1,3}$$
$$\vec{k}'_{2,-2,0} = 0$$
$$\vec{k}'_{2,-2,1} = 0$$

$$\vec{k}'_{2,-2,2} = -\sqrt{\frac{4}{5}} c_x \vec{k}_{1,-1,3} - \sqrt{\frac{4}{5}} c_y \vec{k}_{1,1,3} + \vec{k}_{2,-2,2}$$

$$\vec{k}'_{2,-2,3} = 0$$
$$\vec{k}'_{2,-1,0} = 0$$
$$\vec{k}'_{2,-1,1} = 0$$

$$\vec{k}'_{2,-1,2} = -\sqrt{\frac{4}{5}} c_z \vec{k}'_{1,-1,3} - \sqrt{\frac{4}{5}} c_y \vec{k}_{1,0,3} + \vec{k}_{2,-1,2}$$

$$\vec{k}'_{2,-1,3} = 0$$
$$\vec{k}'_{2,0,0} = 0$$
$$\vec{k}'_{2,0,1} = 0$$

$$\vec{k}'_{2,0,2} = \sqrt{\frac{4}{15}} c_y \vec{k}_{1,-1,3} - \sqrt{\frac{16}{15}} c_z \vec{k}_{1,0,3} + \sqrt{\frac{4}{15}} c_x \vec{k}_{1,1,3} + \vec{k}_{2,0,2}$$

$$\vec{k}'_{2,0,3} = 0$$
$$\vec{k}'_{2,1,0} = 0$$

-continued $$\vec{\kappa}'_{2,1,1} = 0$$

$$\vec{\kappa}'_{2,1,2} = -\sqrt{\frac{4}{5}} c_x \vec{\kappa}_{1,0,3} + \sqrt{\frac{4}{5}} c_z \vec{\kappa}_{1,1,3} + \vec{\kappa}_{2,1,2}$$

$$\vec{\kappa}'_{2,1,3} = 0$$

$$\vec{\kappa}'_{2,2,0} = 0$$

$$\vec{\kappa}'_{2,2,1} = 0$$

$$\vec{\kappa}'_{2,2,2} = \sqrt{\frac{4}{5}} c_y \vec{\kappa}_{1,-,3} - \sqrt{\frac{4}{5}} c_x \vec{\kappa}_{1,1,3} + \vec{\kappa}_{2,2,2}$$

$$\vec{\kappa}'_{2,2,3} = 0$$

APPENDIX 7

Buoyancy

The vorticity induced by buoyancy can be computed directly by sampling everywhere in $R^3$ the buoyancy term with vorticles. But this laborious integral can be avoided, since buoyancy vorticity is concentrated near places of varying density and where the density gradient and buoyant acceleration are perpendicular. First, a set of vorticles can be associated with a single particle j, which can be generalized to multiple density particles. Let us define a local coordinate system centered at $x_j$ such that $\vec{z}$ is aligned with $$\vec{g} + \vec{e} - \frac{d\vec{u}}{dt}.$$

For a density particle or radius $r_j$, it can be expected that the vorticles induced by buoyancy are concentrated around a ring $\{x_\alpha, \alpha \in 2\pi\}$ of diameter $r_j$, perpendicular to vector unit $\vec{z}$, with an axis $\vec{n}_\alpha$. In local coordinates:

$$x_\alpha = \frac{r_j}{2}(\cos(\alpha), \sin(\alpha), 0) \quad (52)$$

$$\vec{n}_\alpha = (-\sin(\alpha), \cos(\alpha), 0).$$

For a canonical density particle, the following density field may be used:

$$\hat{\rho}_j = \exp\left(\left(1 + \kappa_1 \frac{x \cdot x}{2r_j^2}\right)^{-\kappa_2}\right) \quad (53)$$

The parameters $\kappa_0$, $\kappa_1$ and $\kappa_2$ may be fitted using the following equation:

$$\nabla \log(\hat{\rho}_j) \times \vec{z} = r_j^2 \kappa_0 \nabla \times (\int_\alpha \xi_i (p - x_\alpha)^3 \vec{n}_\alpha \times (p - x_\alpha) d\alpha). \quad (54)$$

The following parameters may be obtained:

$$\kappa_0 = 0.493483 \quad \kappa_1 = 0.572636 \quad \kappa_2 = 3.423340 \quad (55)$$

Figure 26B:
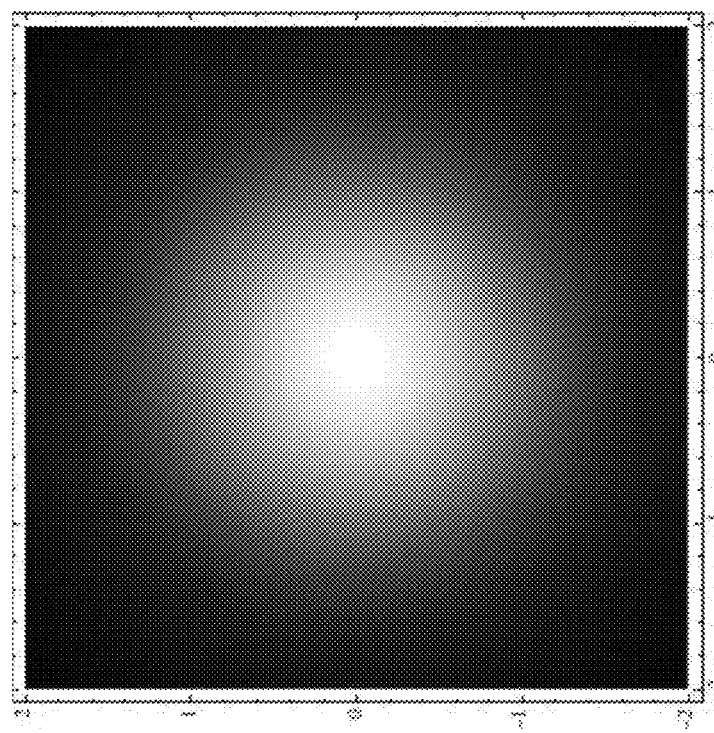
FIG. 26B shows the density field $\rho_j$ for $r_j$=1 and $m_j$=1 according to some embodiments of the present invention.
Figure 26A:
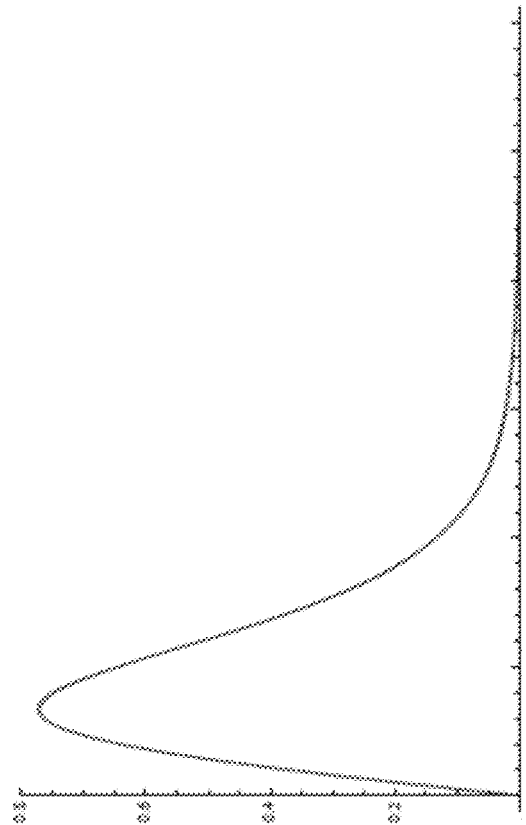
FIG. 26A shows two almost exactly overlapping curves of the largest component of the left (red) and right (blue) side of Eq. (54) according to some embodiments of the present invention.

FIG. 26A shows two almost exactly overlapping curves of the largest component of the left (red) and right (blue) side of Eq. (54) according to some embodiments. FIG. 26B shows the density field $\rho_j$ for $r_j=1$ and $m_j=1$. The density fits the closed form integral with a third decimal accuracy on all 3 vector components.

To generalize to multiple particles, $\hat{\rho}_j$ can be remapped to values in $(0, m_j)$ so that densities can be added, and the field of a single particle density $$\rho_j = m_j \frac{\hat{\rho}_j - 1}{e - 1}$$

can be obtained. Since $$\frac{\nabla \rho}{\rho} \times \vec{z} = \sum \frac{m_j}{e-1} \frac{\hat{\rho}_j}{\rho} \nabla \log(\hat{\rho}_j) \times \vec{z},$$

a set of weights can be obtained that modulate the rotations of the vorticles induced by the density particle j, that accounts for acceleration and multiple particles:

$$\vec{w}_\alpha = r_j^2 \kappa_0 \frac{\pi}{n} \left\| \vec{g} + \vec{e} - \frac{d\vec{u}}{dt} \right\| \frac{m_j}{e-1} \frac{\hat{\rho}_j(x_\alpha)}{\rho(x_\alpha)} \vec{n}_\alpha \quad (56)$$

APPENDIX 8

Boundary Vorticity

The vorticity near the boundary $\delta\Omega$ of a moving object is given by $\nabla\log(\rho)\times(\vec{F}-\vec{a})+\nabla\times\vec{F}$, where $\vec{a}$ is the acceleration near the boundary. To compute this term, one may consider a coordinate system where the half space $z<0$ is inside the solid object, $z=0$ in on the object's surface, and $z>0$ is outside. Using the Heavyside step function H, the nearby density is formally defined as $\rho=H(-z)\rho_0+H(z)\rho_1$, the external forces term is defined as $\vec{F}=H(-z)\vec{f}+H(z)(\vec{g}+\vec{e})$, and the acceleration is $$\vec{a} = H(-z)\vec{f} + H(z)\frac{d\vec{u}}{dt}.$$

Since vorticity is solved for, $\vec{F}$ can be replaced with any $\vec{F}+\vec{G}$ to satisfy the boundary condition as long as $\nabla\times\vec{G}=0$ outside of solid objects. First let us consider the following $\vec{G}$:

$$\vec{G} = H(z)\left(\frac{d\vec{u}}{dt} - \vec{g} - \frac{1}{2}\vec{e}\right) - \frac{1}{2}\vec{e}. \quad (57)$$

Although $$\frac{d\vec{u}}{dt}$$

may have curl, the object surface may be discretized in regions of constant $$\frac{d\vec{u}}{dt}.$$

To prevent the space inside objects from participating to the non-rigid fluid motion, one may set $\rho_0 \to \infty$, thus enforcing $\vec{f}$ inside objects. One may take the limit of the integral of the collision term near the surface, using the following limit to the Heavyside step function $$H(z) = \lim_{t \to \infty} \frac{1}{2} + \frac{1}{\pi}\tan^{-1}(zt),$$

and obtain the surface vorticity:

$$\lim_{\rho_0 \to \infty}\lim_{t \to \infty}\int_{-h}^{h} \nabla\log(\rho)\times\left(\vec{F}+\vec{G}-\frac{d\vec{u}}{dt}\right)+\nabla\times(\vec{F}+\vec{G})dz = \qquad (58)$$

$$(\vec{f}-\vec{e}-\vec{a})\times\vec{n}$$

APPENDIX 9

Source Fields

The source integral of Eq. (26) is given by van Oosterom [2011]. Below are the formula of the source panel field S, and its derivative $\nabla S$, for a triangle defined by $\{p_0, p_1, p_2\}$, using the symbols of Eq. (60):

$$S(p) = \frac{1}{\|\vec{n}\|}\left(\frac{\vec{n}\cdot(\vec{d}_1\times\vec{d}_2)}{e_0}\log\left(\frac{f_0}{g_0}\right) + \frac{\vec{n}\cdot(\vec{d}_2\times\vec{d}_0)}{e_1}\log\left(\frac{f_1}{g_1}\right) + \right. \qquad (59)$$

$$\left. \frac{\vec{n}\cdot(\vec{d}_0\times\vec{d}_1)}{e_2}\log\left(\frac{f_2}{g_2}\right) - 2k_1 a\tan2(k_1,k_0)\right)$$

$$\nabla S(p) = \frac{1}{\|\vec{n}\|}\left((\vec{n}\cdot(\vec{d}_1\times\vec{d}_2))\vec{h}_0 + \frac{(\vec{d}_1-\vec{d}_2)\times\vec{n}}{e_0}\log\left(\frac{f_0}{g_0}\right) + \right.$$

$$(\vec{n}\cdot(\vec{d}_2\times\vec{d}_0))\vec{h}_1 + \frac{(\vec{d}_2-\vec{d}_0)\times\vec{n}}{e_1}\log\left(\frac{f_1}{g_1}\right) + (\vec{n}\cdot(\vec{d}_0\times\vec{d}_1))\vec{h}_2 +$$

$$\left. \frac{(\vec{d}_0-\vec{d}_1)\times\vec{n}}{e_2}\log\left(\frac{f_2}{g_2}\right) + D(p)\vec{n} + k_1\nabla D(p)\right)$$

The symbols above are defined as:

$$\vec{n} = (p_1-p_0)\times(p_2-p_0) \qquad (60)$$

$$\vec{d}_i = p_i - p$$

$$l_i = \|\vec{d}_i\|$$

$$k_0 = l_0 l_1 l_2 + l_0\vec{d}_1\cdot\vec{d}_2 + l_1\vec{d}_2\cdot\vec{d}_0 + l_2\vec{d}_0\cdot\vec{d}_1$$

$$k_1 = (\vec{d}_2\times\vec{d}_1)\cdot\vec{d}_0$$

$$e_i = \|p_j - p_k\|$$

$$f_i = l_j + l_k + e_i$$

$$g_i = l_j + l_k - e_i$$

$$\vec{h}_i = \frac{2}{f_i g_i}\left(\frac{\vec{d}_j}{l_j}+\frac{\vec{d}_k}{l_k}\right)$$

$$j = (i+1)\ \%3$$

$$k = (i+2)\ \%3$$

Figure 27D:
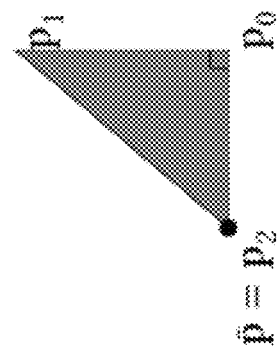
FIGS. 27A-27D illustrate that the integral over any triangle can be decomposed into 6 right-angle triangle integrals according to some embodiments of the present invention.
Figure 27C:
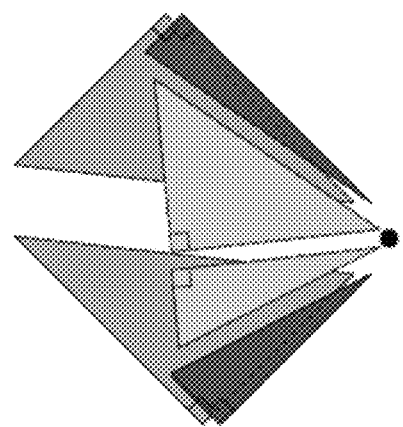
Figure 27B:
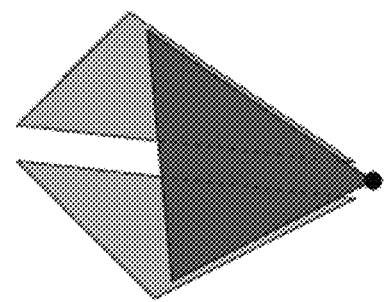
Figure 27A:
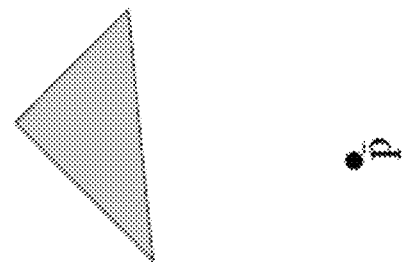

The function $\nabla S(p)$ is numerically unstable when p is aligned with the edges. This corresponds to a situation where some triangles in the decomposition of Carley [2012] are very thin. FIGS. 27A-27D illustrate that the integral over any triangle can be decomposed into 6 right-angle triangle integrals. FIG. 27A shows that point $\bar{p}$ is the projection of the evaluation point p onto the plane of the triangle. FIG. 27B shows that the triangle is split into three signed triangles with a corner at $\bar{p}$. FIG. 27C shows that each triangle is split into two signed right angle triangles. FIG. 27D shows that the integral of a piece is evaluated with $\bar{p}$ as the origin and an axis aligned triangle.

Using this decomposition, the thin triangles may be eliminated. The source field induced at a point p located on the z axis by a triangle with a right angle at $p_0$ lying in the plane z=0 with corner $p_2$ located at the origin is given by:

$$\nabla\tilde{S}(p)_x = \operatorname{arctanh}(k_1/k_2) + k_1 k_7$$

$$\nabla\tilde{S}(p)_y = k_6 - \log(1+k_5) - k_7$$

$$\nabla\tilde{S}(p)_z = a\tan2(k_1(k_2-k_0), k_0 k_1^2 + k_2) \qquad (61)$$

The symbols above are defined as:

$$k_0 = \|p\|/\|p_0\| \qquad (62)$$

$$k_1 = \|p_1 - p_0\|/\|p_0\|$$

$$k_2 = \sqrt{1+k_1^2+k_0^2}$$

$$k_3 = (k_1^2-1)(k_0^2-1)-2$$

$$k_4 = \sqrt{1+k_1^2}$$

$$k_5 = \sqrt{1+k_0^2}$$

$$k_6 = \log(k_0)$$

$$k_7 = (k_6 - \log(k_2+k_4))/k_4$$

APPENDIX 10

Doublet Fields

The doublet integral of Eq. (26) is given by Oosterom and Strackee [1983]. Below are the formula of the doublet panel field D, and its derivative $\nabla D$, for a triangle defined by $\{p_0, p_1, p_2\}$, using the symbols of Eq. (64):

$$D(p) = -2 a\tan2(k_1,k_0) \qquad (63)$$

$$\nabla D(p) = -2\frac{k_0\vec{n} - k_1\vec{k}_2}{k_0^2 + k_1^2}$$

The symbols above are defined as:

$$\vec{n} = (p_1-p_0)\times(p_2-p_0) \qquad (64)$$

$$\vec{d}_i = p_i - p$$

$$l_i = \|\vec{d}_i\|$$

$$k_0 = l_0 l_1 l_2 + l_0\vec{d}_1\cdot\vec{d}_2 + l_1\vec{d}_2\cdot\vec{d}_0 + l_2\vec{d}_0\cdot\vec{d}_1$$

$$k_1 = (\vec{d}_2\times\vec{d}_1)\cdot\vec{d}_0$$

$$\vec{k}_2 = -\left(\frac{l_1 l_2 + \vec{d}_1\cdot\vec{d}_2}{l_0} + l_1 + l_2\right)\vec{d}_0 -$$

$$\left(\frac{l_0 l_2 + \vec{d}_2\cdot\vec{d}_0}{l_1} + l_2 + l_0\right)\vec{d}_1 - \left(\frac{l_0 l_1 + \vec{d}_0\cdot\vec{d}_1}{l_2} + l_0 + l_1\right)\vec{d}_2$$

What is claimed is:

1. A method of computer graphic image processing, wherein a computer system generates rendered image frames of incompressible gas corresponding to a camera view of a three-dimensional virtual space, the method comprising:

generating a plurality of vorticles, each respective vorticle centered at a respective position in the virtual space and having a respective spatial size;

computing advected field of the plurality of vorticles by solving a vorticity equation using a fast multipole method (FMM);

dividing the virtual space into a plurality of concentric regions surrounding a position of a camera;

defining a respective density voxel grid for each respective region of the plurality of concentric regions, each respective density voxel grid having a respective first voxel size that increases with increasing distance from the position of the camera;

defining a respective velocity voxel grid for each respective region of the plurality of concentric regions, each respective velocity voxel grid having a respective second voxel size that increases with increasing distance from the position of the camera;

adding a new density representing a smoke emitter, wherein the new density has a first distribution in a first region of the virtual space, wherein the first region overlaps with one or more density voxels in one or more regions of the plurality of concentric regions;

activating and adding density to each of the one or more density voxels of the one or more regions that overlap with the first region;

activating and computing velocity field at each velocity voxel of the one or more regions that overlaps with the active density voxels;

moving the new density based on the velocity field of each active velocity voxel to obtain a second distribution of the new density in a second region of the virtual space for a next frame;

activating and adding density to each density voxel that overlaps with the second region; and storing the density of each active density voxel and the velocity field of each active velocity voxel in a computer-readable medium as the next frame for display at a screen.

2. The method of claim 1, wherein the respective second voxel size of each respective velocity voxel grid is greater than the respective first voxel size of the corresponding density voxel grid.

3. The method of claim 1, wherein the plurality of concentric regions is defined by a plurality of concentric spheres, each respective region located between two consecutive spheres.

4. The method of claim 1, wherein computing the advected field of the plurality of vorticles using the FMM comprises:

building an octree of vorticles including a plurality octree levels, each respective octree level having a cell size proportional to $2^{-L}$, L being a level number of the respective octree level;

storing each respective vorticle of the plurality of vorticles in a respective cell of a respective octree level having a cell size that is proportional to the spatial size of the respective vorticle;

allocating near cells as a first cell containing the position of the camera and cells that are direct neighbors of the first cell, and far interacting cells as all other cells; and computing the advected field using the FMM by summing the vorticles stored in each respective far cell.

5. The method of claim 4, wherein each respective vorticle is stored in the respective cell having the cell size of $$2^{\frac{\log r_i}{\log 2}},$$

$r_i$ being the spatial size of the respective vorticle.

6. The method of claim 4, further comprising:
computing velocity field of the plurality of vorticles; and
moving the plurality of vorticles to a next frame based on the velocity field using the octree.

7. The method of claim 4, wherein the respective spatial size of each respective vorticle increases with increasing distance between the respective position of the respective vorticle and the position of the camera.

8. The method of claim 1, further comprising:
inputting an object defined by a boundary surface;
dividing the boundary surface into a plurality of panels, each respective panel centered at a respective position and having a respective panel size;
computing advected field at each respective panel using the FMM;
computing a source panel coefficient and a doublet panel coefficient for each respective panel; and
computing harmonic field by solving the vorticity equation using the FMM based on the source panel coefficients and the doublet panel coefficients of the plurality of panels.

9. The method of claim 8, wherein computing the harmonic field using the FMM comprises:
building an octree of panels including a plurality octree levels, each respective octree level having a cell size proportional to $2^{-L}$, L being a level number of the respective octree level;
storing each respective panel of the plurality of panels in a respective cell of a respective octree level having a cell size that is proportional to the spatial size of the respective panel;
allocating near cells as a first cell containing the position of the camera and cells that are direct neighbors of the first cell, and far interacting cells as all other cells; and
computing the harmonic field using the FMM by summing the panels stored in each respective far cell.

10. The method of claim 1, further comprising:
stretching one or more vorticles of the plurality of vorticles by a stretching factor s; and
unstretching the one or more vorticles while preserving an energy and enstrophy of each of the one or more vorticles.

11. A computer product comprising a non-transitory computer readable medium storing a plurality of instructions that when executed control a computer system to generate rendered image frames of incompressible gas corresponding to a camera view of a three-dimensional virtual space, wherein the plurality of instructions comprises:

generating a plurality of vorticles, each respective vorticle centered at a respective position in the virtual space and having a respective spatial size;

computing advected field of the plurality of vorticles by solving a vorticity equation using a fast multipole method (FMM);

dividing the virtual space into a plurality of concentric regions surrounding a position of a camera;

defining a respective density voxel grid for each respective region of the plurality of concentric regions, each respective density voxel grid having a respective first voxel size that increases with increasing distance from the position of the camera;

defining a respective velocity voxel grid for each respective region of the plurality of concentric regions, each respective velocity voxel grid having a respective second voxel size that increases with increasing distance from the position of the camera;

adding a new density representing a smoke emitter, wherein the new density has a first distribution in a first region of the virtual space, wherein the first region overlaps with one or more regions of the plurality of concentric regions;

activating and adding density to each density voxel of the one or more regions that overlaps with the first region;

activating and computing velocity field at each velocity voxel of the one or more regions that overlaps with the active density voxels;

moving the new density based on the velocity field of each active velocity voxel to obtain a second distribution of the new density in a second region of the virtual space for a next frame;

activating and adding density to each density voxel that overlaps with the second region; and storing the density of each active density voxel and the velocity field of each active velocity voxel in a computer-readable medium as the next frame for display at a screen.

12. The computer product of claim 11, wherein the respective second voxel size of each respective velocity voxel grid is greater than the respective first voxel size of the corresponding density voxel grid.

13. The computer product of claim 11, wherein the plurality of concentric regions is defined by a plurality of concentric spheres, each respective region located between two consecutive spheres.

14. The computer product of claim 11, wherein the instructions for computing the advected field of the plurality of vorticles using the FMM comprise:

building an octree of vorticles including a plurality octree levels, each respective octree level having a cell size proportional to $2^{-L}$, L being a level number of the respective octree level;

storing each respective vorticle of the plurality of vorticles in a respective cell of a respective octree level having a cell size that is proportional to the spatial size of the respective vorticle;

allocating near cells as a first cell containing the position of the camera and cells that are direct neighbors of the first cell, and far interacting cells as all other cells; and computing the advected field using the FMM by summing the vorticles stored in each respective far cell.

15. The computer product of claim 14, wherein each respective vorticle is stored in the respective cell having the cell size of $$2^{\frac{\log r_i}{\log 2}},$$

$r_i$ being the spatial size of the respective vorticle.

16. The computer product of claim 14, wherein the plurality of instructions further comprises:

computing velocity field of the plurality of vorticles; and moving the plurality of vorticles to a next frame based on the velocity field using the octree.

17. The computer product of claim 14, wherein the respective spatial size of each respective vorticle increases with increasing distance between the respective position of the respective vorticle and the position of the camera.

18. The computer product of claim 11, wherein the plurality of instructions further comprises:

inputting an object defined by a boundary surface;

dividing the boundary surface into a plurality of panels, each respective panel centered at a respective position and having a respective panel size;

computing advected field at each respective panel using the FMM;

computing a source panel coefficient and a doublet panel coefficient for each respective panel; and computing harmonic field by solving the vorticity equation using the FMM based on the source panel coefficients and the doublet panel coefficients of the plurality of panels.

19. The computer product of claim 18, wherein the instructions for computing the harmonic field using the FMM comprise:

building an octree of panels including a plurality octree levels, each respective octree level having a cell size proportional to $2^{-L}$, L being a level number of the respective octree level;

storing each respective panel of the plurality of panels in a respective cell of a respective octree level having a cell size that is proportional to the spatial size of the respective panel;

allocating near cells as a first cell containing the position of the camera and cells that are direct neighbors of the first cell, and far interacting cells as all other cells; and computing the harmonic field using the FMM by summing the panels stored in each respective far cell.

20. The computer product of claim 11, wherein the plurality of instructions further comprises:

stretching one or more vorticles of the plurality of vorticles by a stretching factor s; and unstretching the one or more vorticles while preserving an energy and enstrophy of each of the one or more vorticles.

* * * * *